US012795122B2

(12) United States Patent
Filippov et al.

(10) Patent No.: US 12,795,122 B2
(45) Date of Patent: Nov. 10, 2026

(54) RESOLUTION-BASED CONTEXT SELECTION FOR VECTOR DIFFERENCE CODING

(71) Applicant: Ofinno, LLC, Reston, VA (US)

(72) Inventors: Alexey Konstantinovich Filippov, Khimki (RU); Vasily Alexeevich Rufitskiy, Vladimir (RU); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/232,479

(22) Filed: Jun. 9, 2025

(65) Prior Publication Data

US 2025/0310546 A1 Oct. 2, 2025

Related U.S. Application Data

(63) Continuation of application No. PCT/US2023/083323, filed on Dec. 11, 2023.
(Continued)

(51) Int. Cl.
*H04N 19/176* (2014.01)
*H04N 19/139* (2014.01)
(Continued)

(52) U.S. Cl.
CPC ......... *H04N 19/176* (2014.11); *H04N 19/139* (2014.11); *H04N 19/196* (2014.11); *H04N 19/521* (2014.11); *H04N 19/53* (2014.11)

(58) Field of Classification Search
CPC .. H04N 19/176; H04N 19/139; H04N 19/196; H04N 19/521; H04N 19/53;
(Continued)

(56) References Cited

U.S. PATENT DOCUMENTS 10,979,732 B2 4/2021 Chen et al.
11,356,693 B2 6/2022 Chien et al.
(Continued)

FOREIGN PATENT DOCUMENTS

WO 2020/192747 A1 10/2020

OTHER PUBLICATIONS

ITU-T H.266; Telecommunication Standardization Sector of ITU; (Aug. 2020); Series H: Audiovisual and Multimedia Systems; Infrastructure of audiovisual services—Coding of moving video; Versatile video coding; Recommendation ITU-T H.266.
(Continued)

*Primary Examiner* — Tung T Vo
(74) *Attorney, Agent, or Firm* — Willis H. Chang; Kavon Nasabzadeh; Jacob L. Mangan

(57) ABSTRACT

A decoder receives, from a video bitstream, a first indication of a resolution of a vector difference for a block. Based on the first indication and a position of a magnitude symbol in a suffix portion of a codeword representing the vector difference to be decoded, a probability model is selected from a plurality of probability models for the magnitude symbol. The decoder arithmetically decodes, from the video bitstream and based on the probability model, a second indication indicating whether the magnitude symbol of the vector difference is equal to a corresponding magnitude symbol of a vector difference predictor. A value of the magnitude symbol of the vector difference is determined based on the second indication and a value of the corresponding magnitude symbol of the vector difference predictor. The block is decoded based on the vector difference represented by the codeword having the magnitude symbol with the determined value.

20 Claims, 28 Drawing Sheets

Related U.S. Application Data

(60) Provisional application No. 63/457,693, filed on Apr. 6, 2023, provisional application No. 63/453,698, filed on Mar. 21, 2023, provisional application No. 63/431,619, filed on Dec. 9, 2022.

(51) Int. Cl.
*H04N 19/196* (2014.01)
*H04N 19/513* (2014.01)
*H04N 19/53* (2014.01)

(58) Field of Classification Search
CPC .... H04N 19/136; H04N 19/184; H04N 19/52; H04N 19/593; H04N 19/70; H04N 19/91; H04N 19/13
USPC .................................................... 375/240.16
See application file for complete search history.

(56) References Cited

U.S. PATENT DOCUMENTS

| | | | | |
|---|---|---|---|---|
| 2012/0093226 | A1 | 4/2012 | Chien et al. | |
| 2013/0271668 | A1* | 10/2013 | Argyropoulos ........ | H04N 19/44 348/720 |
| 2014/0105307 | A1* | 4/2014 | Bandoh ................ | H04N 19/463 375/240.16 |
| 2014/0177707 | A1* | 6/2014 | George .................. | H04N 19/13 375/240.03 |
| 2016/0337662 | A1 | 11/2016 | Pang et al. | |
| 2018/0278951 | A1 | 9/2018 | Seregin et al. | |
| 2022/0150530 | A1 | 5/2022 | Li et al. | |
| 2024/0236330 | A9 | 7/2024 | Li et al. | |

OTHER PUBLICATIONS

International Search Report and Written Opinion of the International Searching Authority mailed Mar. 19, 2024, in International Application No. PCT/US2023/083323.

JVET-AB0170-v2; Joint Video Experts Team (JVET) of ITU-T SG 16 WP 3 and ISO/IEC JTC 1/SC 29; 28th Meeting, Mainz, DE, Oct. 20-28, 2022; Title: Non-EE2: Block Vector Difference Prediction for IBC blocks; Status: Input document to JVET; Purpose: Proposal; Author(s): Alexey Filippov et al.; Source: Ofinno, LLC.

JVET-AA2025; Joint Video Experts Team (JVET) of ITU-T SG 16 WP 3 and ISO/IEC JTC 1/SC 29; 27th Meeting, by teleconference, Jul. 13-22, 2022; Title: Algorithm description of Enhanced Compression Model 6 (ECM 6); Status: Output document of JVET; Purpose: Algorithm description of Enhanced Compression Model 6; Author(s): Muhammed Coban et al.; Source: Editors.

JVET-S2001-vH; Joint Video Experts Team (JVET) of ITU-T SG 16 WP 3 and ISO/IEC JTC 1/SC 29/WG 11; 19th Meeting: by teleconference, Jun. 22-Jul. 1, 2020; Title: Versatile Video Coding (Draft 10); Status: Output document approved by JVET; Purpose: Draft text of video coding specification; Author(s): Benjamin Bross et al.; Source: Editors.

ITU-T H.265; Telecommunication Standardization Sector of ITU; (Feb. 2018); Series H: Audiovisual and Multimedia Systems; Infrastructure of audiovisual services—Coding of moving video; High efficiency video coding; Recommendation ITU-T H.265.

JVET-Z2002; Joint Video Experts Team (JVET) of ITU-T SG 16 WP 3 and ISO/IEC JTC 1/SC 29; 26th Meeting, by teleconference, Apr. 20-29, 2022; Title: Algorithm description for Versatile Video Coding and Test Model 17vVTM17; Status: Output document of JVET; Purpose: Algorithm description for Versatile Video Coding and Test Model 17; Author(s): Adrian Browne et al.; Source: Editors.

* cited by examiner

Example A: Context Condition Equation

Version A: $2^{Bpos} < (^{T}/_{F})$

Version B: $F*2^{Bpos} < T$

Version C: $2^{Bpos} \leq (^{T}/_{F})$ -or- $F*2^{Bpos} \leq T$

Example B: Values of F and T for imv_flag value

| imv_flag | F | F Resolution | T | $(^{T}/_{F})$ |
|---|---|---|---|---|
| 0 | 1 | 1-pel (sample) resolution | 16 | 16 / 1 =16 |
| 1 | 4 | 4-pel (sample) resolution | 16 | 16 / 4 = 4 |

Example C: Context Derivation (Version A: adjust threshold, compare with position)

| imv_flag | F | T | *Bpos* | $(^{T}/_{F})$ | Shift(T) | $2^{Bpos} < (^{T}/_{F})$ | $2^{Bpos} < (^{T}/_{F})$? | Context? |
|---|---|---|---|---|---|---|---|---|
| 0 | 1 | 16 | 0..3 | $^{16}/_{1}$ | T >> 0 | $2^{0..3} < 16$ | True | $Ctx_1$ |
| 0 | 1 | 16 | 4+ | $^{16}/_{1}$ | T >> 0 | $2^{4+} < 16$ | False | $Ctx_2$ |
| 1 | 4 | 16 | 0..1 | $^{16}/_{4}$ | T >> 2 | $2^{0..1} < 4$ | True | $Ctx_1$ |
| 1 | 4 | 16 | 2+ | $^{16}/_{4}$ | T >> 2 | $2^{2+} < 4$ | False | $Ctx_2$ |

Example D: Context Derivation (Version B: adjust position, compare with threshold)

| imv_flag | F | T | *Bpos* | $F*2^{Bpos}$ | Shift($2^{Bpos}$) | $F*2^{Bpos}<T$ | $F*2^{Bpos}<T$? | Context? |
|---|---|---|---|---|---|---|---|---|
| 0 | 1 | 16 | 0..3 | $1*2^{0..3}$ | $2^{Bpos} << 0$ | 1..8 < 16 | True | $Ctx_1$ |
| 0 | 1 | 16 | 4+ | $1*2^{4+}$ | $2^{Bpos} << 0$ | 16+ < 16 | False | $Ctx_2$ |
| 1 | 4 | 16 | 0..1 | $4*2^{0..1}$ | $2^{Bpos} << 2$ | 4..8 < 16 | True | $Ctx_1$ |
| 1 | 4 | 16 | 2+ | $4*2^{2+}$ | $2^{Bpos} << 2$ | 16+ < 16 | False | $Ctx_2$ |

*FIG. 24*

RESOLUTION-BASED CONTEXT SELECTION FOR VECTOR DIFFERENCE CODING

CROSS-REFERENCE TO RELATED APPLICATIONS

This application is a continuation of International Application No. PCT/US2023/083323, filed Dec. 11, 2023, which claims the benefit of U.S. Provisional Application No. 63/431,619, filed Dec. 9, 2022, U.S. Provisional Application No. 63/453,698, filed Mar. 21, 2023, and U.S. Provisional Application No. 63/457,693, filed Apr. 6, 2023, all of which are hereby incorporated by reference in their entireties.

BRIEF DESCRIPTION OF THE DRAWINGS

Examples of several of the various embodiments of the present disclosure are described herein with reference to the drawings.

FIG. 24 illustrates examples of deriving a context/probability model based on threshold and position values in accordance with embodiments of the present disclosure.

DETAILED DESCRIPTION

Figure 1:
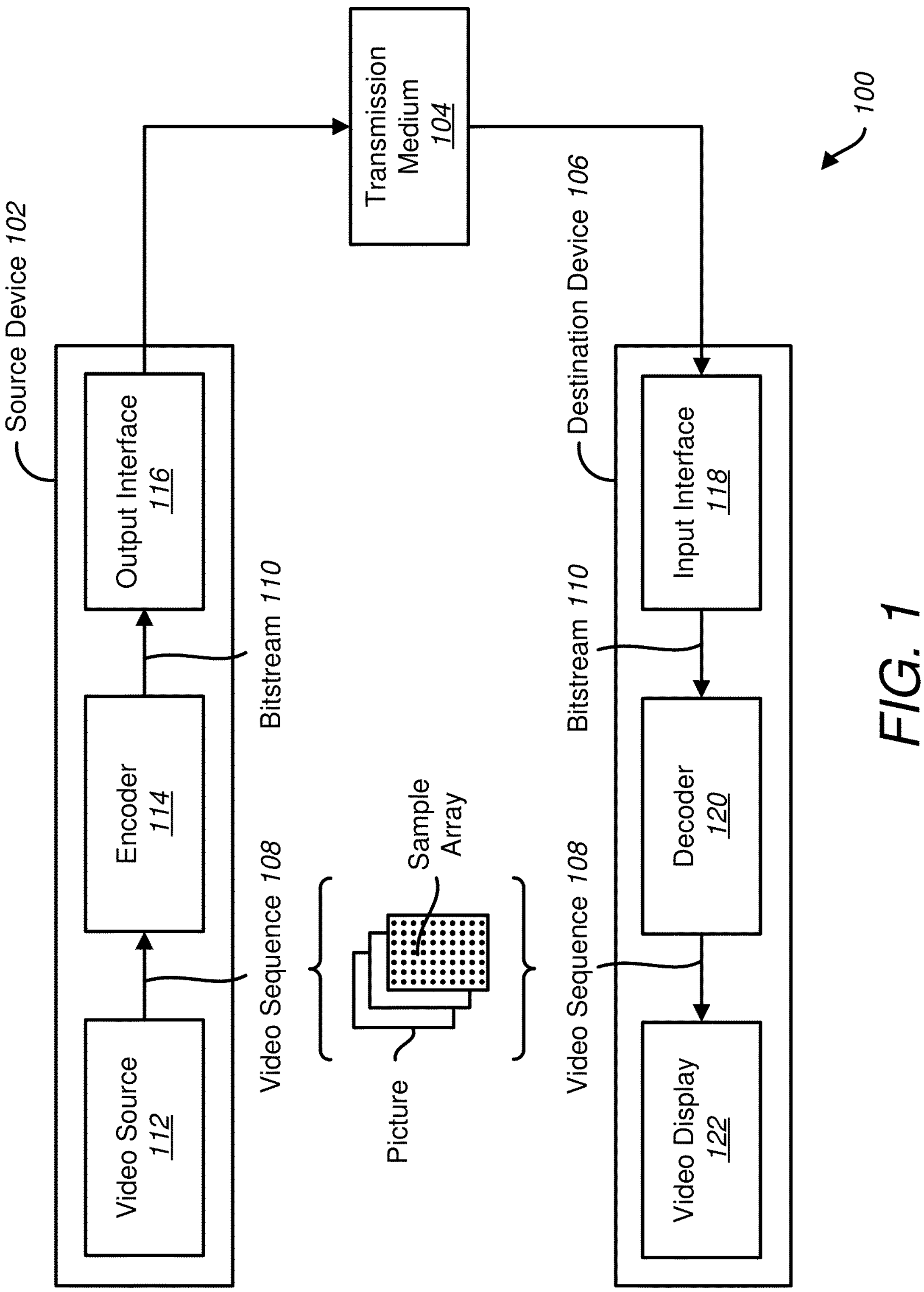
FIG. 1 illustrates an exemplary video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Representing a video sequence in digital form may require a large number of bits. The data size of a video sequence in digital form may be too large for storage and/or transmission in many applications. Video encoding may be used to compress the size of a video sequence to provide for more efficient storage and/or transmission. Video decoding may be used to decompress a compressed video sequence for display and/or other forms of consumption.

FIG. 1 illustrates an exemplary video coding/decoding system 100 in which embodiments of the present disclosure may be implemented. Video coding/decoding system 100 comprises a source device 102, a transmission medium 104, and a destination device 106. Source device 102 encodes a video sequence 108 into a bitstream 110 for more efficient storage and/or transmission. Source device 102 may store and/or transmit bitstream 110 to destination device 106 via transmission medium 104. Destination device 106 decodes bitstream 110 to display video sequence 108. Destination device 106 may receive bitstream 110 from source device 102 via transmission medium 104. Source device 102 and destination device 106 may be any one of a number of different devices, including a desktop computer, laptop computer, tablet computer, smart phone, wearable device, television, camera, video gaming console, set-top box, or video streaming device.

To encode video sequence 108 into bitstream 110, source device 102 may comprise a video source 112, an encoder 114, and an output interface 116. Video source 112 may provide or generate video sequence 108 from a capture of a natural scene and/or a synthetically generated scene. A synthetically generated scene may be a scene comprising computer generated graphics or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A shown in FIG. 1, a video sequence, such as video sequence 108, may comprise a series of pictures (also referred to as frames). A video sequence may achieve the impression of motion when a constant or variable time is used to successively present pictures of the video sequence. A picture may comprise one or more sample arrays of intensity values. The intensity values may be taken at a series of regularly spaced locations within a picture. A color picture typically comprises a luminance sample array and two chrominance sample arrays. The luminance sample array may comprise intensity values representing the brightness (or luma component, Y) of a picture. The chrominance sample arrays may comprise intensity values that respectively represent the blue and red components of a picture (or chroma components, Cb and Cr) separate from the brightness. Other color picture sample arrays are possible based on different color schemes (e.g., an RGB color scheme). For color pictures, a pixel may refer to all three intensity values for a given location in the three sample arrays used to represent color pictures. A monochrome picture comprises a single, luminance sample array. For monochrome pictures, a pixel may refer to the intensity value at a given location in the single, luminance sample array used to represent monochrome pictures.

Encoder 114 may encode video sequence 108 into bitstream 110. To encode video sequence 108, encoder 114 may apply one or more prediction techniques to reduce redundant information in video sequence 108. Redundant information is information that may be predicted at a decoder and therefore may not be needed to be transmitted to the decoder for accurate decoding of the video sequence. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Before applying the one or more prediction techniques, encoder 114 may partition pictures of video sequence 108 into rectangular regions referred to as blocks. Encoder 114 may then encode a block using one or more of the prediction techniques.

For temporal prediction, encoder 114 may search for a block similar to the block being encoded in another picture (also referred to as a reference picture) of video sequence 108. The block determined during the search (also referred to as a prediction block) may then be used to predict the block being encoded. For spatial prediction, encoder 114 may form a prediction block based on data from reconstructed neighboring samples of the block to be encoded within the same picture of video sequence 108. A reconstructed sample refers to a sample that was encoded and then decoded. Encoder 114 may determine a prediction error (also referred to as a residual) based on the difference between a block being encoded and a prediction block. The prediction error may represent non-redundant information that may be transmitted to a decoder for accurate decoding of a video sequence.

Encoder 114 may apply a transform to the prediction error (e.g. a discrete cosine transform (DCT)) to generate transform coefficients. Encoder 114 may form bitstream 110 based on the transform coefficients and other information used to determine prediction blocks (e.g., prediction types, motion vectors, and prediction modes). In some examples, encoder 114 may perform one or more of quantization and entropy coding of the transform coefficients and/or the other information used to determine prediction blocks before forming bitstream 110 to further reduce the number of bits needed to store and/or transmit video sequence 108.

Output interface 116 may be configured to write and/or store bitstream 110 onto transmission medium 104 for transmission to destination device 106. In addition or alternatively, output interface 116 may be configured to transmit, upload, and/or stream bitstream 110 to destination device 106 via transmission medium 104. Output interface 116 may comprise a wired and/or wireless transmitter configured to transmit, upload, and/or stream bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one more networks (e.g., the Internet) or file servers configured to store and/or transmit encoded video data.

To decode bitstream 110 into video sequence 108 for display, destination device 106 may comprise an input interface 118, a decoder 120, and a video display 122. Input interface 118 may be configured to read bitstream 110 stored on transmission medium 104 by source device 102. In addition or alternatively, input interface 118 may be configured to receive, download, and/or stream bitstream 110 from source device 102 via transmission medium 104. Input interface 118 may comprise a wired and/or wireless receiver configured to receive, download, and/or stream bitstream 110 according to one or more proprietary and/or standardized communication protocols, such as those mentioned above.

Decoder 120 may decode video sequence 108 from encoded bitstream 110. To decode video sequence 108, decoder 120 may generate prediction blocks for pictures of video sequence 108 in a similar manner as encoder 114 and determine prediction errors for the blocks. Decoder 120 may generate the prediction blocks using prediction types, prediction modes, and/or motion vectors received in bitstream 110 and determine the prediction errors using transform coefficients also received in bitstream 110. Decoder 120 may determine the prediction errors by weighting transform basis functions using the transform coefficients. Decoder 120 may combine the prediction blocks and prediction errors to decode video sequence 108. In some examples, decoder 120 may decode a video sequence that approximates video sequence 108 due to, for example, lossy compression of video sequence 108 by encoder 114 and/or errors introduced into encoded bitstream 110 during transmission to destination device 106.

Video display 122 may display video sequence 108 to a user. Video display 122 may comprise a cathode rate tube (CRT) display, liquid crystal display (LCD), a plasma display, light emitting diode (LED) display, or any other display device suitable for displaying video sequence 108.

It should be noted that video encoding/decoding system 100 is presented by way of example and not limitation. In the example of FIG. 1, video encoding/decoding system 100 may have other components and/or arrangements. For example, video source 112 may be external to source device 102. Similarly, video display 122 may be external to destination device 106 or omitted altogether where video sequence is intended for consumption by a machine and/or storage device. In another example, source device 102 may further comprise a video decoder and destination device 106 may comprise a video encoder. In such an example, source device 102 may be configured to further receive an encoded bit stream from destination device 106 to support two-way video transmission between the devices.

In the example of FIG. 1, encoder 114 and decoder 120 may operate according to any one of a number of proprietary or industry video coding standards. For example, encoder 114 and decoder 120 may operate according to one or more of International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and AOMedia Video 1 (AV1).

Figure 2:
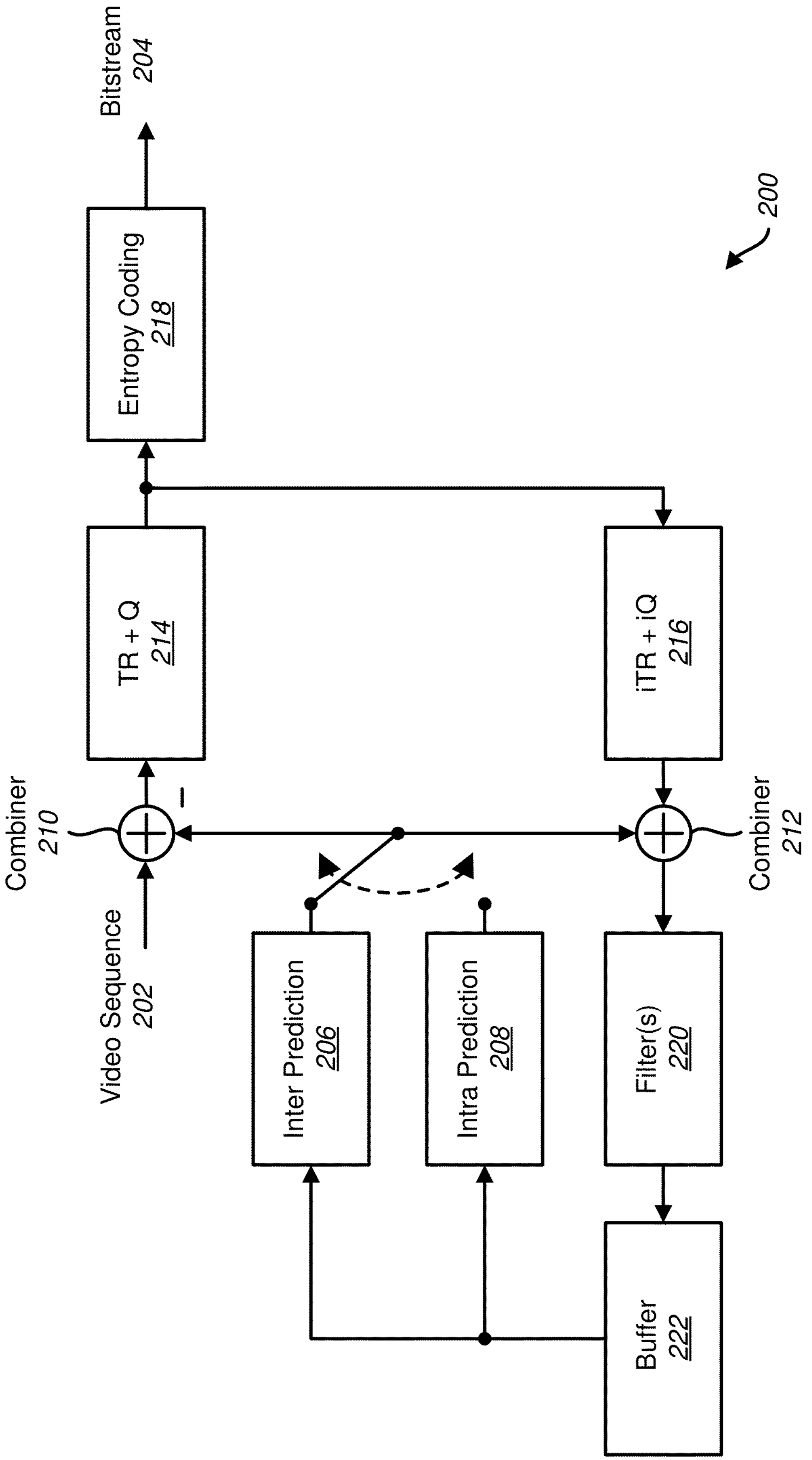
FIG. 2 illustrates an exemplary encoder in which embodiments of the present disclosure may be implemented.

FIG. 2 illustrates an exemplary encoder 200 in which embodiments of the present disclosure may be implemented. Encoder 200 encodes a video sequence 202 into a bitstream 204 for more efficient storage and/or transmission. Encoder 200 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Encoder 200 comprises an inter prediction unit 206, an intra prediction unit 208, combiners 210 and 212, a transform and quantization unit (TR+Q) unit 214, an inverse transform and quantization unit (iTR+iQ) 216, entropy coding unit 218, one or more filters 220, and a buffer 222.

Encoder 200 may partition the pictures of video sequence 202 into blocks and encode video sequence 202 on a block-by-block basis. Encoder 200 may perform a prediction technique on a block being encoded using either inter prediction unit 206 or intra prediction unit 208. Inter prediction unit 206 may perform inter prediction by searching for a block similar to the block being encoded in another, reconstructed picture (also referred to as a reference picture) of video sequence 202. A reconstructed picture refers to a picture that was encoded and then decoded. The block determined during the search (also referred to as a prediction block) may then be used to predict the block being encoded to remove redundant information. Inter prediction unit 206 may exploit temporal redundancy or similarities in scene content from picture to picture in video sequence 202 to determine the prediction block. For example, scene content between pictures of video sequence 202 may be similar except for differences due to motion or affine transformation of the screen content over time.

Intra prediction unit 208 may perform intra prediction by forming a prediction block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the prediction block. For example, the texture of a region of scene content in a picture may be similar to the texture in the immediate surrounding area of the region of the scene content in the same picture.

After prediction, combiner 210 may determine a prediction error (also referred to as a residual) based on the difference between the block being encoded and the prediction block. The prediction error may represent non-redundant information that may be transmitted to a decoder for accurate decoding of a video sequence.

Transform and quantization unit 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in bitstream 204. Irrelevant information is information that may be removed from the coefficients without producing visible and/or perceptible distortion in video sequence 202 after decoding.

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and syntax-based context-based binary arithmetic coding (SBAC). The entropy coded coefficients are packed to form bitstream 204.

Inverse transform and quantization unit 216 may inverse quantize and inverse transform the quantized transform coefficients to determine a reconstructed prediction error. Combiner 212 may combine the reconstructed prediction error with the prediction block to form a reconstructed block. Filter(s) 220 may filter the reconstructed block using, for example, a deblocking filter and/or a sample-adaptive offset (SAO) filter. Buffer 222 may store the reconstructed block for prediction of one or more other blocks in the same and/or different picture of video sequence 202.

Although not shown in FIG. 2, encoder 200 further comprises an encoder control unit configured to control one or more of the units of encoder 200 shown in FIG. 2. The encoder control unit may control the one or more units of encoder 200 such that bitstream 204 is generated in conformance with the requirements of any one of a number of proprietary or industry video coding standards. For example, The encoder control unit may control the one or more units of encoder 200 such that bitstream 204 is generated in conformance with one or more of ITU-T H.263, AVC, HEVC, WC, VP8, VP9, and AV1 video coding standards.

Within the constraints of a proprietary or industry video coding standard, the encoder control unit may attempt to minimize or reduce the bitrate of bitstream 204 and maximize or increase the reconstructed video quality. For example, the encoder control unit may attempt to minimize or reduce the bitrate of bitstream 204 given a level that the reconstructed video quality may not fall below, or attempt to maximize or increase the reconstructed video quality given a level that the bit rate of bitstream 204 may not exceed. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and one or more transform types and/or quantization parameters applied by transform and quantization unit 214. The encoder control unit may determine/control the above based on how the determination/control effects a rate-distortion measure for a block or picture being encoded. The encoder control unit may determine/control the above to reduce the rate-distortion measure for a block or picture being encoded.

After being determined, the prediction type used to encode a block (intra or inter prediction), prediction information of the block (intra prediction mode if intra predicted, motion vector, etc.), and transform and quantization parameters, may be sent to entropy coding unit 218 to be further compressed to reduce the bit rate. The prediction type, prediction information, and transform and quantization parameters may be packed with the prediction error to form bitstream 204.

It should be noted that encoder 200 is presented by way of example and not limitation. In other examples, encoder 200 may have other components and/or arrangements. For example, one or more of the components shown in FIG. 2 may be optionally included in encoder 200, such as entropy coding unit 218 and filters(s) 220.

Figure 3:
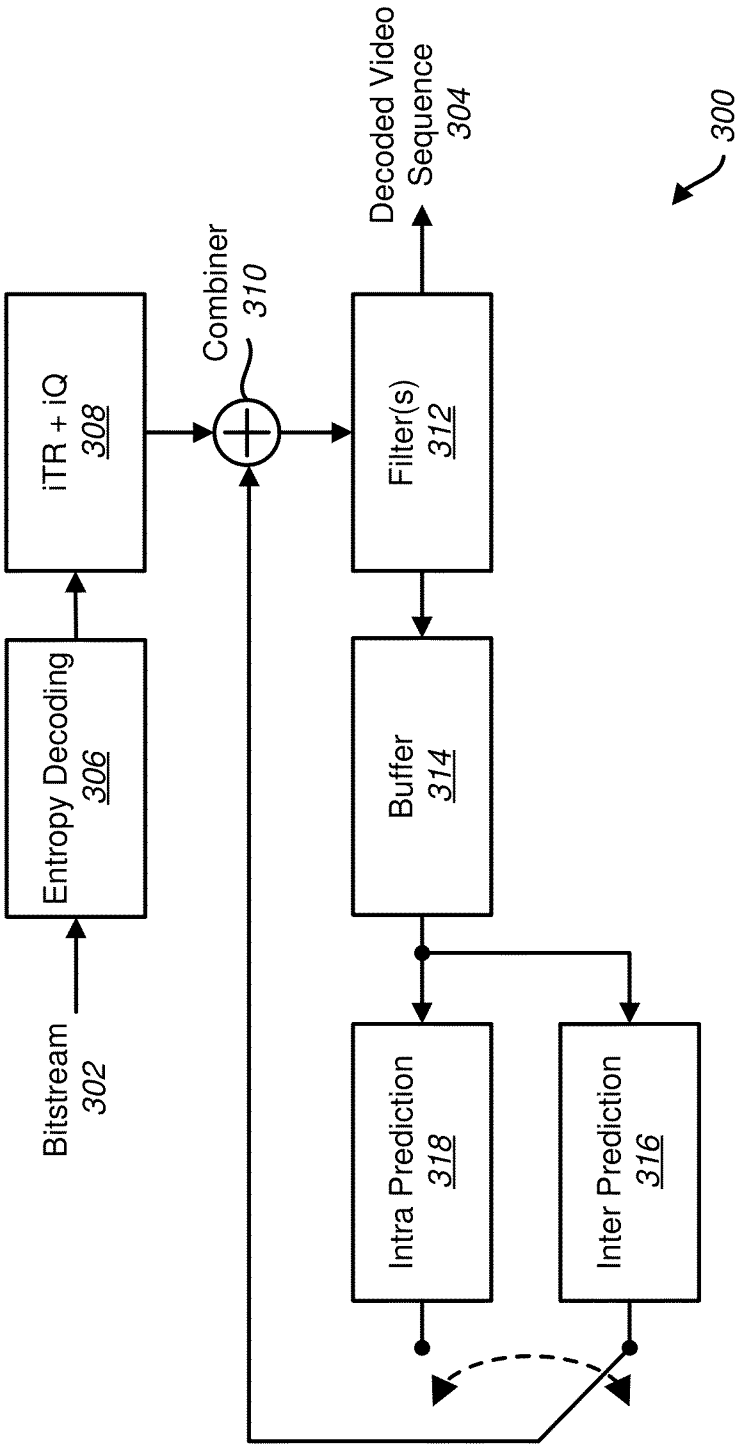
FIG. 3 illustrates an exemplary decoder in which embodiments of the present disclosure may be implemented.

FIG. 3 illustrates an exemplary decoder 300 in which embodiments of the present disclosure may be implemented. Decoder 300 decodes a bitstream 302 into a decoded video sequence 304 for display and/or some other form of consumption. Decoder 300 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Decoder 300 comprises an entropy decoding unit 306, an inverse transform and quantization (iTR+iQ) unit 308, a combiner 310, one or more filters 312, a buffer 314, an inter prediction unit 316, and an intra prediction unit 318.

Although not shown in FIG. 3, decoder 300 further comprises a decoder control unit configured to control one or more of the units of decoder 300 shown in FIG. 3. The decoder control unit may control the one or more units of decoder 300 such that bitstream 302 is decoded in conformance with the requirements of any one of a number of proprietary or industry video coding standards. For example, The decoder control unit may control the one or more units of decoder 300 such that bitstream 302 is decoded in conformance with one or more of ITU-T H.263, AVC, HEVC, WVC, VP8, VP9, and AV1 video coding standards.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and one or more inverse transform types and/or inverse quantization parameters to be applied by inverse transform and quantization unit 308. One or more of the control parameters used by the decoder control unit may be packed in bitstream 302.

Entropy decoding unit 306 may entropy decode the bitstream 302. Inverse transform and quantization unit 308 may inverse quantize and inverse transform the quantized transform coefficients to determine a decoded prediction error. Combiner 310 may combine the decoded prediction error with a prediction block to form a decoded block. The prediction block may be generated by intra prediction unit 318 or inter prediction unit 316 as described above with respect to encoder 200 in FIG. 2. Filter(s) 312 may filter the decoded block using, for example, a deblocking filter and/or a sample-adaptive offset (SAO) filter. Buffer 314 may store the decoded block for prediction of one or more other blocks in the same and/or different picture of the video sequence in bitstream 302. Decoded video sequence 304 may be output from filter(s) 312 as shown in FIG. 3.

It should be noted that decoder 300 is presented by way of example and not limitation. In other examples, decoder 300 may have other components and/or arrangements. For example, one or more of the components shown in FIG. 3 may be optionally included in decoder 300, such as entropy decoding unit 306 and filters(s) 312.

It should be further noted that, although not shown in FIGS. 2 and 3, each of encoder 200 and decoder 300 may further comprise an intra block copy unit in addition to inter prediction and intra prediction units. The intra block copy unit may perform similar to an inter prediction unit but predict blocks within the same picture. For example, the intra block copy unit may exploit repeated patterns that appear in screen content. Screen content may include, for example, computer generated text, graphics, and animation.

As mentioned above, video encoding and decoding may be performed on a block-by-block basis. The process of partitioning a picture into blocks may be adaptive based on the content of the picture. For example, larger block partitions may be used in areas of a picture with higher levels of homogeneity to improve coding efficiency.

In HEVC, a picture may be partitioned into non-overlapping square blocks, referred to as coding tree blocks (CTBs), comprising samples of a sample array. A CTB may have a size of 2n×2n samples, where n may be specified by a parameter of the encoding system. For example, n may be 4, 5, or 6. A CTB may be further partitioned by a recursive quadtree partitioning into coding blocks (CBs) of half vertical and half horizontal size. The CTB forms the root of the quadtree. A CB that is not split further as part of the recursive quadtree partitioning may be referred to as a leaf-CB of the quadtree and otherwise as a non-leaf CB of the quadtree. A CB may have a minimum size specified by a parameter of the encoding system. For example, a CB may have a minimum size of 4×4, 8×8, 16×16, 32×32, or 64×64 samples. For inter and intra prediction, a CB may be further partitioned into one or more prediction blocks (PBs) for performing inter and intra prediction. A PB may be a rectangular block of samples on which the same prediction type/mode may be applied. For transformations, a CB may be partitioned into one or more transform blocks (TBs). A TB may be a rectangular block of samples that may determine an applied transform size.

Figure 4:
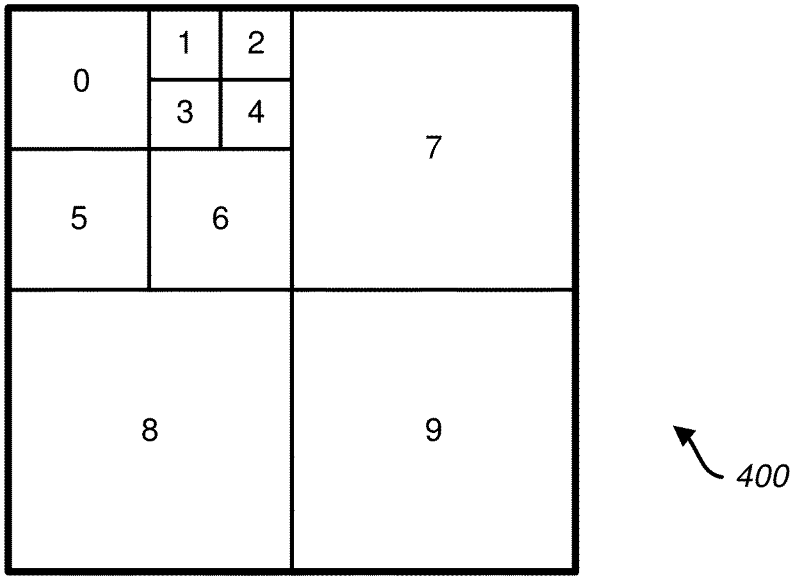
FIG. 4 illustrates an example quadtree partitioning of a coding tree block (CTB) in accordance with embodiments of the present disclosure.
Figure 5:
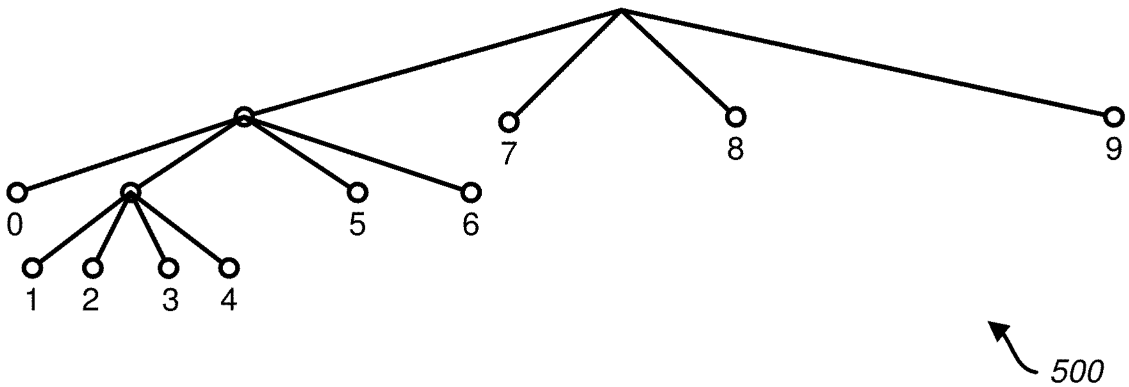
FIG. 5 illustrates a corresponding quadtree of the example quadtree partitioning of the CTB in FIG. 4 in accordance with embodiments of the present disclosure.

FIG. 4 illustrates an example quadtree partitioning of a CTB 400. FIG. 5 illustrates a corresponding quadtree 500 of the example quadtree partitioning of CTB 400 in FIG. 4. As shown in FIGS. 4 and 5, CTB 400 is first partitioned into four CBs of half vertical and half horizontal size. Three of the resulting CBs of the first level partitioning of CTB 400 are leaf-CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, the non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

Altogether, CTB 400 is partitioned into 10 leaf CBs respectively labeled 0-9. The resulting quadtree partitioning of CTB 400 may be scanned using a z-scan (left-to-right, top-to-bottom) to form the sequence order for encoding/decoding the CB leaf nodes. The numeric label of each CB leaf node in FIGS. 4 and 5 may correspond to the sequence order for encoding/decoding, with CB leaf node 0 encoded/decoded first and CB leaf node 9 encoded/decoded last. Although not shown in FIGS. 4 and 5, it should be noted that each CB leaf node may comprise one or more PBs and TBs.

Figure 6:
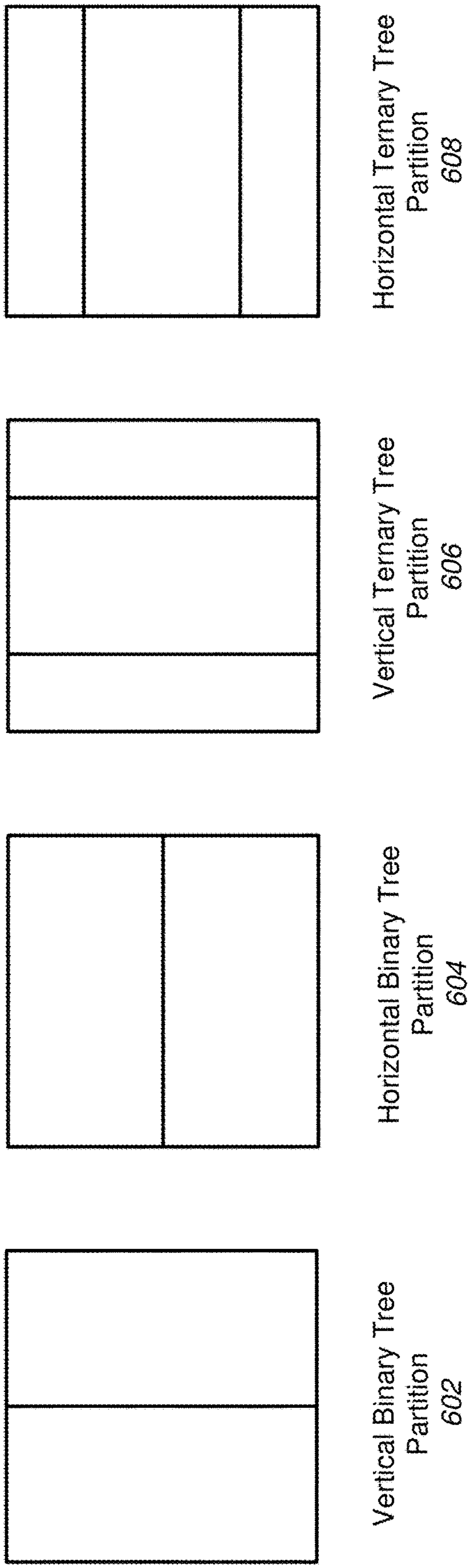
FIG. 6 illustrates example binary and ternary tree partitions in accordance with embodiments of the present disclosure.

In VVC, a picture may be partitioned in a similar manner as in HEVC. A picture may be first partitioned into non-overlapping square CTBs. The CTBs may then be partitioned by a recursive quadtree partitioning into CBs of half vertical and half horizontal size. In VVC, a quadtree leaf node may be further partitioned by a binary tree or ternary tree partitioning into CBs of unequal sizes. FIG. 6 illustrates example binary and ternary tree partitions. A binary tree partition may divide a parent block in half in either the vertical direction 602 or horizontal direction 604. The resulting partitions may be half in size as compared to the parent block. A ternary tree partition may divide a parent block into three parts in either the vertical direction 606 or horizontal direction 608. The middle partition may be twice as large as the other two end partitions in a ternary tree partition.

Figure 7:
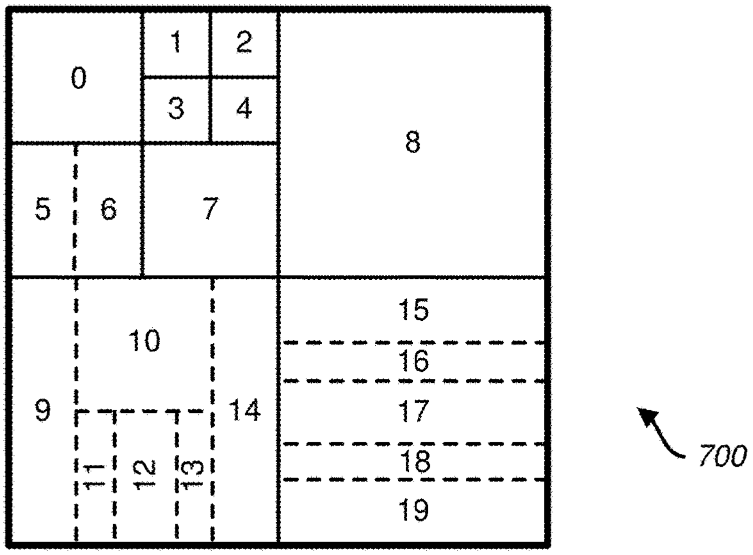
FIG. 7 illustrates an example quadtree+multi-type tree partitioning of a CTB in accordance with embodiments of the present disclosure.
Figure 8:
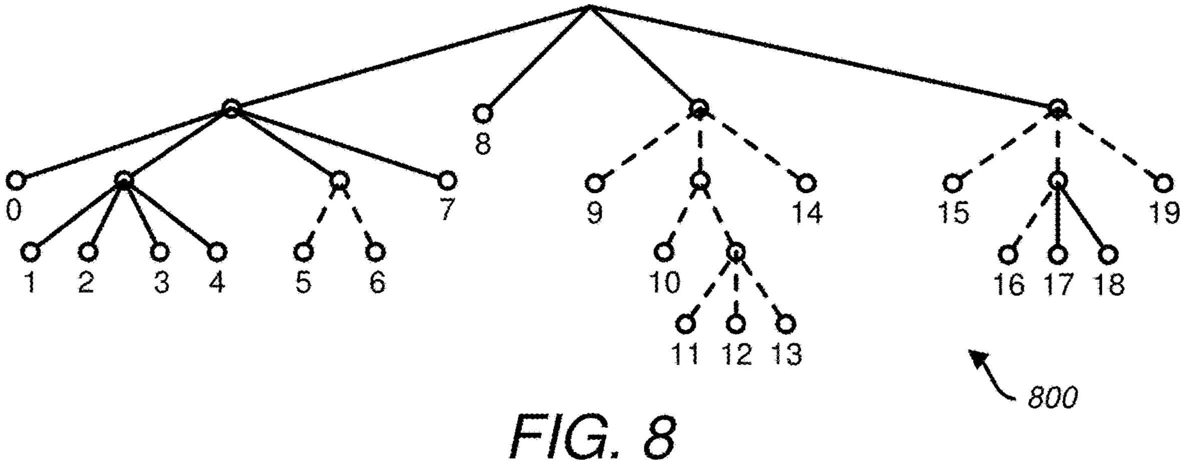
FIG. 8 illustrates a corresponding quadtree+multi-type tree of the example quadtree+multi-type tree partitioning of the CTB in FIG. 7 in accordance with embodiments of the present disclosure.

Because of the addition of binary and ternary tree partitioning, in VVC the block partitioning strategy may be referred to as quadtree+multi-type tree partitioning. FIG. 7 illustrates an example quadtree+multi-type tree partitioning of a CTB 700. FIG. 8 illustrates a corresponding quadtree+multi-type tree 800 of the example quadtree+multi-type tree partitioning of CTB 700 in FIG. 7. In both FIGS. 7 and 8, quadtree splits are shown in solid lines and multi-type tree splits are shown in dashed lines. For ease of explanation, CTB 700 is shown with the same quadtree partitioning as CTB 400 described in FIG. 4. Therefore, description of the quadtree partitioning of CTB 700 is omitted. The description of the additional multi-type tree partitions of CTB 700 is made relative to three leaf-CBs shown in FIG. 4 that have been further partitioned using one or more binary and ternary tree partitions. The three leaf-CBs in FIG. 4 that are shown in FIG. 7 as being further partitioned are leaf-CBs 5, 8, and 9.

Starting with leaf-CB 5 in FIG. 4, FIG. 7 shows this leaf-CB partitioned into two CBs based on a vertical binary tree partitioning. The two resulting CBs are leaf-CBs respectively labeled 5 and 6 in FIGS. 7 and 8. With respect to leaf-CB 8 in FIG. 4, FIG. 7 shows this leaf-CB partitioned into three CBs based on a vertical ternary tree partition. Two of the three resulting CBs are leaf-CBs respectively labeled 9 and 14 in FIGS. 7 and 8. The remaining, non-leaf CB is partitioned first into two CBs based on a horizontal binary tree partition, one of which is a leaf-CB labeled 10 and the other of which is further partitioned into three CBs based on a vertical ternary tree partition. The resulting three CBs are leaf-CBs respectively labeled 11, 12, and 13 in FIGS. 7 and 8. Finally, with respect to leaf-CB 9 in FIG. 4, FIG. 7 shows this leaf-CB partitioned into three CBs based on a horizontal ternary tree partition. Two of the three CBs are leaf-CBs respectively labeled 15 and 19 in FIGS. 7 and 8. The remaining, non-leaf CB is partitioned into three CBs based on another horizontal ternary tree partition. The resulting three CBs are all leaf-CBs respectively labeled 16, 17, and 18 in FIGS. 7 and 8.

Altogether, CTB 700 is partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. The numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and TBs.

In addition to specifying various blocks (e.g., CTB, CB, PB, TB), HEVC and VVC further define various units. While blocks may comprise a rectangular area of samples in a sample array, units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

It should be noted that the term block may be used to refer to any of a CTB, CB, PB, TB, CTU, CU, PU, or TU in the context of HEVC and WC. It should be further noted that the term block may be used to refer to similar data structures in the context of other video coding standards. For example, the term block may refer to a macroblock in AVC, a macroblock or sub-block in VP8, a superblock or sub-block in VP9, or a superblock or sub-block in AV1.

In intra prediction, samples of a block to be encoded (also referred to as the current block) may be predicted from samples of the column immediately adjacent to the left-most column of the current block and samples of the row immediately adjacent to the top-most row of the current block. The samples from the immediately adjacent column and row may be jointly referred to as reference samples. Each sample of the current block may be predicted by projecting the position of the sample in the current block in a given direction (also referred to as an intra prediction mode) to a point along the reference samples. The sample may be predicted by interpolating between the two closest reference samples of the projection point if the projection does not fall directly on a reference sample. A prediction error (also referred to as a residual) may be determined for the current block based on differences between the predicted sample values and the original sample values of the current block.

At an encoder, this process of predicting samples and determining a prediction error based on a difference between the predicted samples and original samples may be performed for a plurality of different intra prediction modes, including non-directional intra prediction modes. The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block using the intra prediction mode indicated by the encoder and combining the predicted samples with the prediction error.

Figure 9:
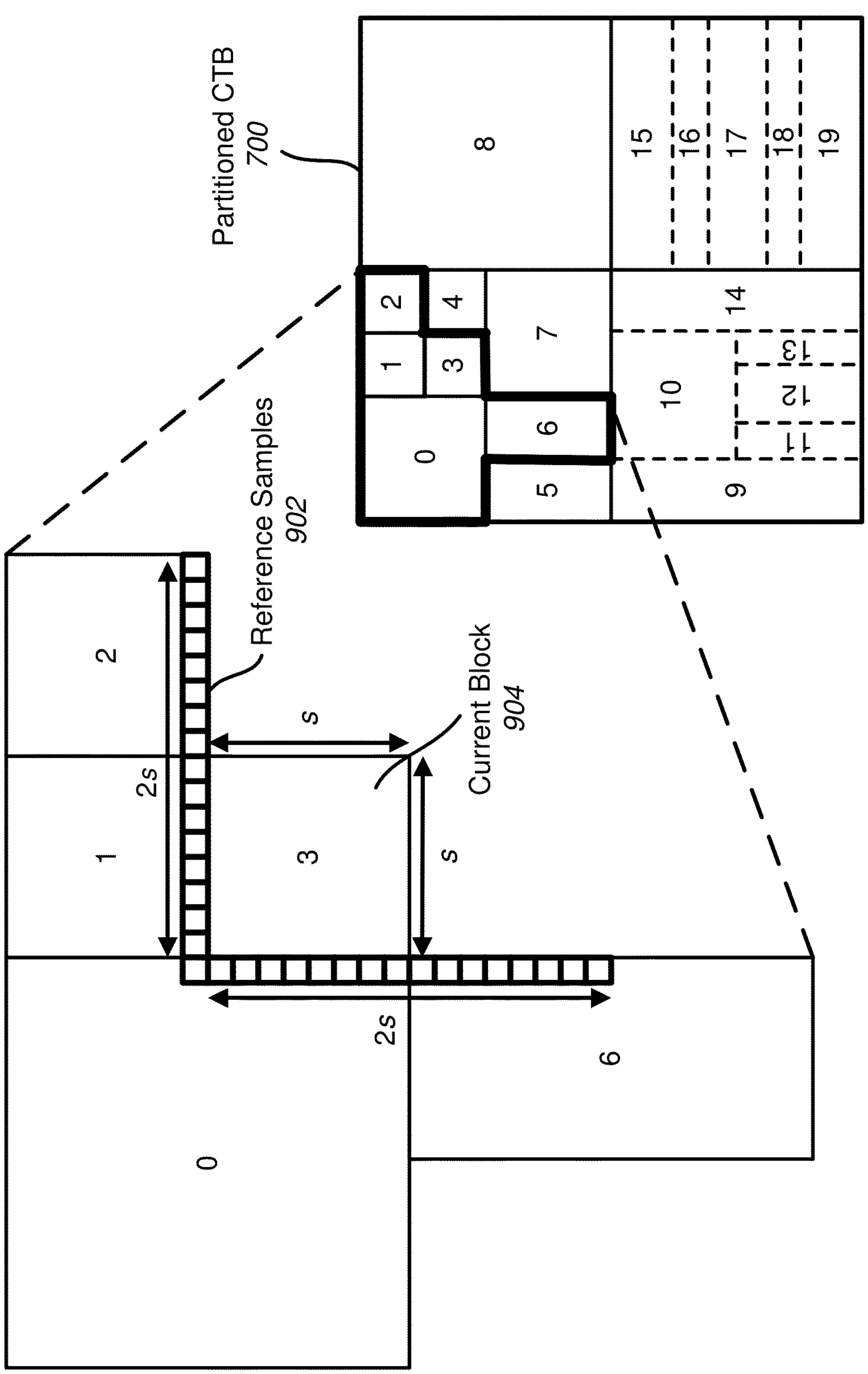
FIG. 9 illustrates an example set of reference samples determined for intra prediction of a current block being encoded or decoded in accordance with embodiments of the present disclosure.

FIG. 9 illustrates an example set of reference samples 902 determined for intra prediction of a current block 904 being encoded or decoded. In FIG. 9, current block 904 corresponds to block 3 of partitioned CTB 700 in FIG. 7. As explained above, the numeric labels 0-19 of the blocks of partitioned CTB 700 may correspond to the sequence order for encoding/decoding the blocks and are used as such in the example of FIG. 9.

Given current block 904 is of w×h samples in size, reference samples 902 may extend over 2w samples of the row immediately adjacent to the top-most row of current block 904, 2h samples of the column immediately adjacent to the left-most column of current block 904, and the top left neighboring corner sample to current block 904. In the example of FIG. 9, current block 904 is square, so w=h=s. For constructing the set of reference samples 902, available samples from neighboring blocks of current block 904 may be used. Samples may not be available for constructing the set of reference samples 902 if, for example, the samples would lie outside the picture of the current block, the samples are part of a different slice of the current block (where the concept of slices are used), and/or the samples belong to blocks that have been inter coded and constrained intra prediction is indicated. When constrained intra prediction is indicated, intra prediction may not be dependent on inter predicted blocks.

In addition to the above, samples that may not be available for constructing the set of reference samples 902 include samples in blocks that have not already been encoded and reconstructed at an encoder or decoded at a decoder based on the sequence order for encoding/decoding. This restriction may allow identical prediction results to be determined at both the encoder and decoder. In FIG. 9, samples from neighboring blocks 0, 1, and 2 may be available to construct reference samples 902 given that these blocks are encoded and reconstructed at an encoder and decoded at a decoder prior to coding of current block 904. This assumes there are no other issues, such as those mentioned above, preventing the availability of samples from neighboring blocks 0, 1, and 2. However, the portion of reference samples 902 from neighboring block 6 may not be available due to the sequence order for encoding/decoding.

Unavailable ones of reference samples 902 may be filled with available ones of reference samples 902. For example, an unavailable reference sample may be filled with a nearest available reference sample determined by moving in a clock-wise direction through reference samples 902 from the position of the unavailable reference. If no reference samples are available, reference samples 902 may be filled with the mid-value of the dynamic range of the picture being coded.

It should be noted that reference samples 902 may be filtered based on the size of current block 904 being coded and an applied intra prediction mode. It should be further noted that FIG. 9 illustrates only one exemplary determination of reference samples for intra prediction of a block. In some proprietary and industry video coding standards, reference samples may be determined in a different manner than discussed above. For example, multiple reference lines may be used in other instances, such as used in WC.

After reference samples 902 are determined and optionally filtered, samples of current block 904 may be intra predicted based on reference samples 902. Most encoders/decoders support a plurality of intra prediction modes in accordance with one or more video coding standards. For example, HEVC supports 35 intra prediction modes, including a planar mode, a DC mode, and 33 angular modes. WVC supports 67 intra prediction modes, including a planar mode, a DC mode, and 65 angular modes. Planar and DC modes may be used to predict smooth and gradually changing regions of a picture. Angular modes may be used to predict directional structures in regions of a picture.

Figure 10A:
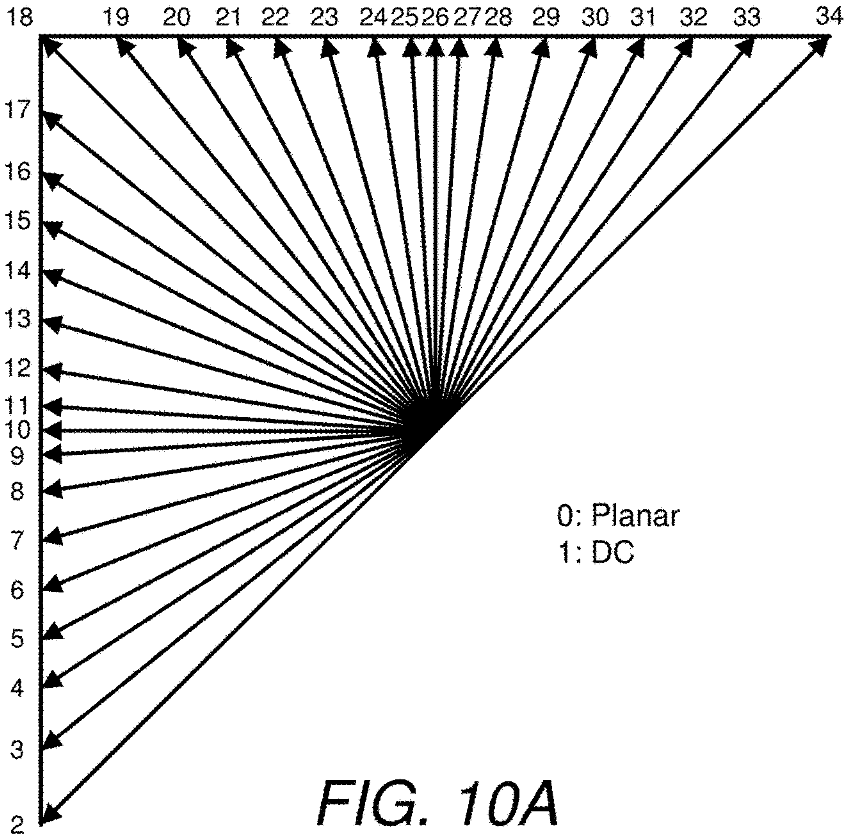
FIG. 10A illustrates the 35 intra prediction modes supported by HEVC in accordance with embodiments of the present disclosure.

FIG. 10A illustrates the 35 intra prediction modes supported by HEVC. The 35 intra prediction modes are identified by indices 0 to 34. Prediction mode 0 corresponds to planar mode. Prediction mode 1 corresponds to DC mode. Prediction modes 2-34 correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

Figure 10B:
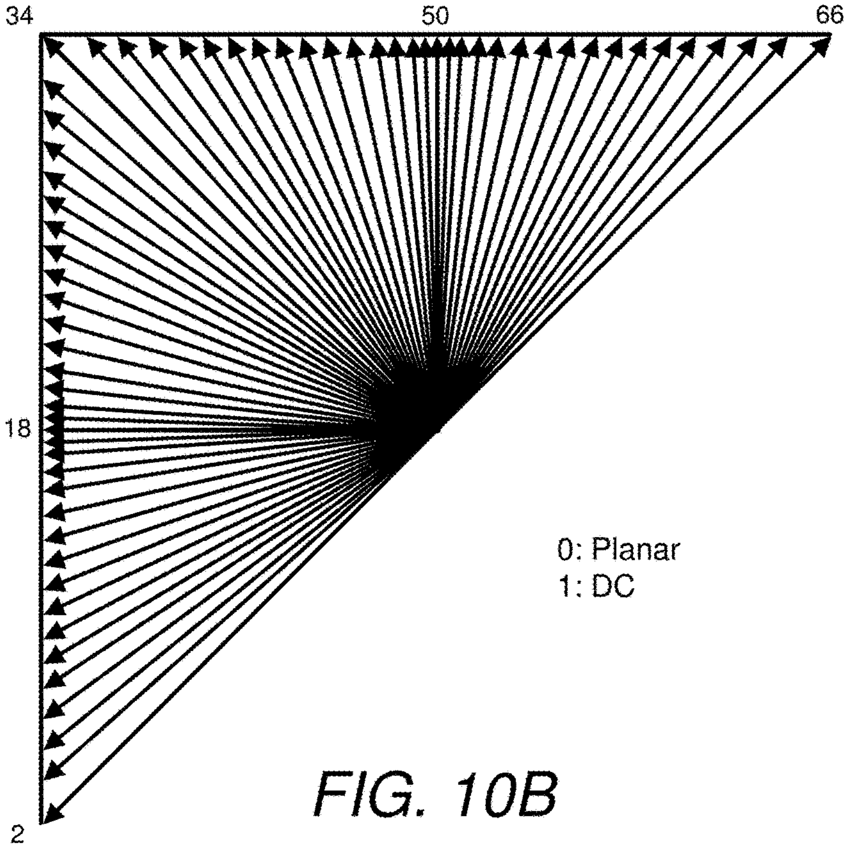
FIG. 10B illustrates the 67 intra prediction modes supported by HEVC in accordance with embodiments of the present disclosure.

FIG. 10B illustrates the 67 intra prediction modes supported by VVC. The 67 intra prediction modes are identified by indices 0 to 66. Prediction mode 0 corresponds to planar mode. Prediction mode 1 corresponds to DC mode. Prediction modes 2-66 correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Because blocks in WC may be non-square, some of the intra prediction modes illustrated in FIG. 10B may be adaptively replaced by wide-angle directions.

Figure 11:
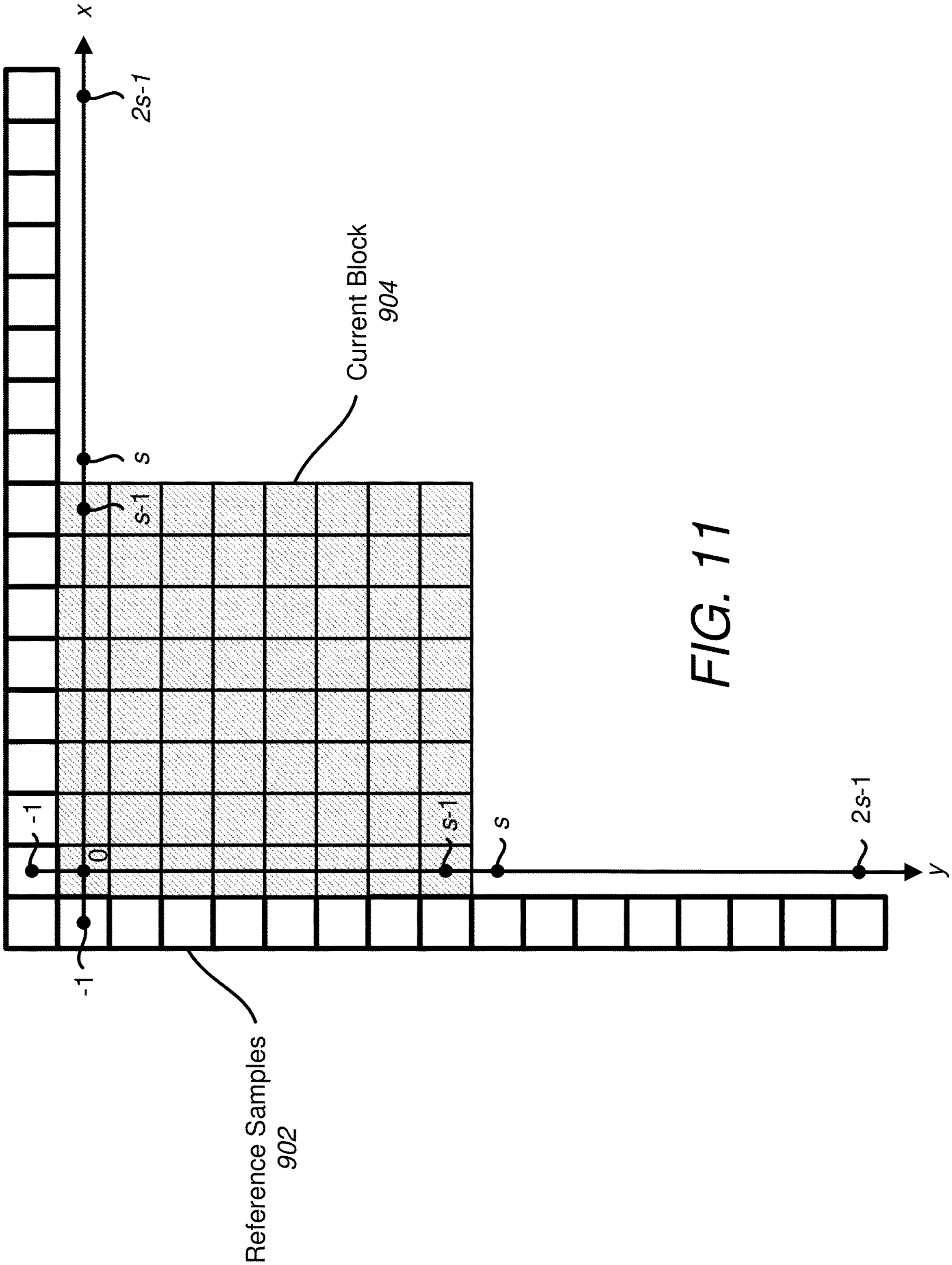
FIG. 11 illustrates the current block and reference samples from FIG. 9 in a two-dimensional x, y plane in accordance with embodiments of the present disclosure.
Figure 12:
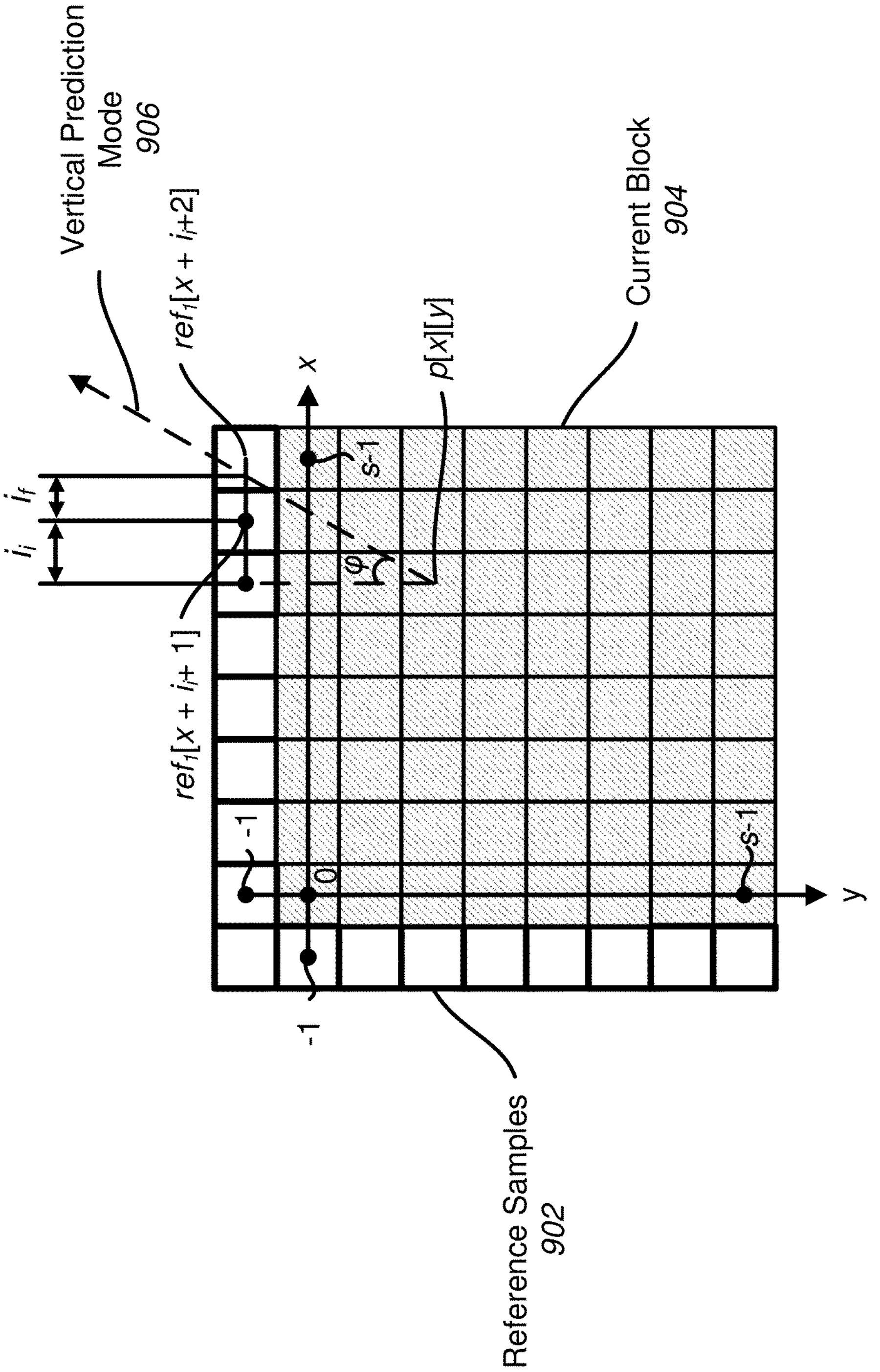
FIG. 12 illustrates an example angular mode prediction of the current block from FIG. 9 in accordance with embodiments of the present disclosure.

To further describe the application of intra prediction modes to determine a prediction of a current block, reference is made to FIGS. 11 and 12. In FIG. 11, current block 904 and reference samples 902 from FIG. 9 are shown in a two-dimensional x, y plane, where a sample may be referenced as p[x][y]. In order to simplify the prediction process, reference samples 902 may be placed in two, one-dimensional arrays. Reference samples 902 above current block 904 may be placed in the one-dimensional array $ref_1[x]$:

$$ref_1[x] = p[-1+x][-1], (x \geq 0) \quad (1)$$

Reference samples 902 to the left of current block 904 may be placed in the one-dimensional array $ref_2[x]$:

$$ref_2[y] = p[-1][-1+y], (y \geq 0) \quad (2)$$

For planar mode, a sample at location [x][y] in current block 904 may be predicted by calculating the mean of two interpolated values. The first of the two interpolated values may be based on a horizontal linear interpolation at location [x][y] in current block 904. The second of the two interpolated values may be based on a vertical linear interpolation at location [x][y] in current block 904. The predicted sample p[x][y] in current block 904 may be calculated as $$p[x][y] = \frac{1}{2 \cdot s}(h[x][y] + v[x][y] + s) \quad (3)$$

where $$h[x][y] = (s - x - 1) \cdot ref_2[y] + (x + 1) \cdot ref_1[s] \quad (4)$$

may be the horizonal linear interpolation at location [x][y] in current block 904 and $$v[x][y] = (s - y - 1) \cdot ref_1[x] + (y + 1) \cdot ref_2[s] \quad (5)$$

may be the vertical linear interpolation at location [x][y] in current block 904.

For DC mode, a sample at location [x][y] in current block 904 may be predicted by the mean of the reference samples 902. The predicted value sample p[x][y] in current block 904 may be calculated as $$p[x][y] = \frac{1}{2 \cdot s}\left(\sum_{x=0}^{s-1} ref_1[x] + \sum_{y=0}^{s-1} ref_2[y]\right) \quad (6)$$

For angular modes, a sample at location [x][y] in current block 904 may be predicted by projecting the location [x][y] in a direction specified by a given angular mode to a point on the horizontal or vertical line of samples comprising reference samples 902. The sample at location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC).

FIG. 12 illustrates a prediction of a sample at location [x][y] in current block 904 for a vertical prediction mode 906 given by an angle. For vertical prediction modes, the location [x][y] in current block 904 is projected to a point (referred to herein as the "projection point") on the horizontal line of reference samples $ref_1[x]$. Reference samples 902 are only partially shown in FIG. 12 for ease of illustration. Because the projection point falls at a fractional sample position between two reference samples in the example of FIG. 12, the predicted sample p[x][y] in current block 904 may be calculated by linearly interpolating between the two reference samples as follows $$p[x][y] = (1 - i_f) \cdot ref_1[x + i_i + 1] + i_f \cdot ref_1[x + i_i + 2] \quad (7)$$

where $i_i$ is the integer part of the horizontal displacement of the projection point relative to the location [x][y] and may calculated as a function of the tangent of the angle φ of the vertical prediction mode 906 as follows $$i_i = \lfloor (y + 1) \cdot \tan\varphi \rfloor, \quad (8)$$

and $i_f$ is the fractional part of the horizontal displacement of the projection point relative to the location [x][y] and may be calculated as $$i_f = ((y + 1) \cdot \tan\varphi) - \lfloor (y + 1) \cdot \tan\varphi \rfloor. \quad (9)$$

where $\lfloor \bullet \rfloor$ is the integer floor.

For horizontal prediction modes, the position [x][y] of a sample in current block 904 may be projected onto the vertical line of reference samples $ref_2[y]$. Sample prediction for horizontal prediction modes is given by:

$$p[x][y] = (1 - i_f) \cdot ref_2[y + i_i + 1] + i_f \cdot ref_2[y + i_i + 2] \quad (10)$$

where $i_i$ is the integer part of the vertical displacement of the projection point relative to the location [x][y] and may be calculated as a function of the tangent of the angle φ of the horizontal prediction mode as follows $$i_i = \lfloor (x + 1) \cdot \tan\varphi \rfloor, \quad (11)$$

and $i_f$ is the fractional part of the vertical displacement of the projection point relative to the location [x][y] and may be calculated as $$i_f = ((x + 1) \cdot \tan\varphi) - \lfloor (x + 1) \cdot \tan\varphi \rfloor. \quad (12)$$

where $\lfloor \bullet \rfloor$ is the integer floor.

The interpolation functions of (7) and (10) may be implemented by an encoder or decoder, such as encoder 200 in FIG. 2 or decoder 300 in FIG. 3, as a set of two-tap finite impulse response (FIR) filters. The coefficients of the two-tap FIR filters may be respectively given by $(1-i_f)$ and $i_f$. In the above angular intra prediction examples, the predicted sample p[x][y] may be calculated with some predefined level of sample accuracy, such as 1/32 sample accuracy. For 1/32 sample accuracy, the set of two-tap FIR interpolation filters may comprise up to 32 different two-tap FIR interpolation filters-one for each of the 32 possible values of the fractional part of the projected displacement if. In other examples, different levels of sample accuracy may be used.

In an embodiment, the two-tap interpolation FIR filter may be used for predicting chroma samples. For luma samples, a different interpolation technique may be used. For example, for luma samples a four-tap FIR filter may be used to determine a predicted value of a luma sample. For example, the four tap FIR filter may have coefficients determined based on if, similar to the two-tap FIR filter. For 1/32 sample accuracy, a set of 32 different four-tap FIR filters may comprise up to 32 different four-tap FIR filters-one for each of the 32 possible values of the fractional part of the projected displacement if. In other examples, different levels of sample accuracy may be used. The set of four-tap FIR filters may be stored in a look-up table (LUT) and referenced based on if. The value of the predicted sample p[x][y], for vertical prediction modes, may be determined based on the four-tap FIR filter as follows:

$$p[x][y] = \sum_{i=0}^{3} fT[i] * ref[x + iIdx + i] \quad (13)$$

where ft[i], i=0 . . . 3, are the filter coefficients. The value of the predicted sample p[x][y], for horizontal prediction modes, may be determined based on the four-tap FIR filter as follows:

$$p[x][y] = \sum_{i=0}^{3} fT[i] * ref[y + iIdx + i]. \quad (14)$$

It should be noted that supplementary reference samples may be constructed for the case where the position [x][y] of a sample in current block 904 to be predicted is projected to a negative x coordinate, which happens with negative vertical prediction angles φ. The supplementary reference samples may be constructed by projecting the reference samples in $ref_2[y]$ in the vertical line of reference samples 902 to the horizontal line of reference samples 902 using the negative vertical prediction angle φ. Supplemental reference samples may be similarly for the case where the position [x][y] of a sample in current block 904 to be predicted is projected to a negative y coordinate, which happens with negative horizontal prediction angles φ. The supplementary reference samples may be constructed by projecting the reference samples in $ref_1[x]$ on the horizontal line of reference samples 902 to the vertical line of reference samples 902 using the negative horizontal prediction angle φ.

An encoder may predict the samples of a current block being encoded, such as current block 904, for a plurality of intra prediction modes as explained above. For example, the encoder may predict the samples of the current block for each of the 35 intra prediction modes in HEVC or 67 intra prediction modes in VVC. For each intra prediction mode applied, the encoder may determine a prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may select one of the intra prediction modes to encode the current block based on the determined prediction errors. For example, the encoder may select an intra prediction mode that results in the smallest prediction error for the current block. In another example, the encoder may select the intra prediction mode to encode the current block based on a rate-distortion measure (e.g., Lagrangian rate-distortion cost) determined using the prediction errors. The encoder may send an indication of the selected intra prediction mode and its corresponding prediction error to a decoder for decoding of the current block.

Similar to an encoder, a decoder may predict the samples of a current block being decoded, such as current block 904, for an intra prediction mode as explained above. For example, the decoder may receive an indication of an angular intra prediction mode from an encoder for a block. The decoder may construct a set of reference samples and perform intra prediction based on the angular intra prediction mode indicated by the encoder for the block in a similar manner as discussed above for the encoder. The decoder would add the predicted values of the samples of the block to a residual of the block to reconstruct the block. In another embodiment, the decoder may not receive an indication of an angular intra prediction mode from an encoder for a block. Instead, the decoder may determine an intra prediction mode through other, decoder-side means.

Although the description above was primarily made with respect to intra prediction modes in HEVC and VVC, it will be understood that the techniques of the present disclosure described above and further below may be applied to other intra prediction modes, including those of other video coding standards like VP8, VP9, AV1, and the like.

As explained above, intra prediction may exploit correlations between spatially neighboring samples in the same picture of a video sequence to perform video compression. Inter prediction is another coding tool that may be used to exploit correlations in the time domain between blocks of samples in different pictures of the video sequence to perform video compression. In general, an object may be seen across multiple pictures of a video sequence. The object may move (e.g., by some translation and/or affine motion) or remain stationary across the multiple pictures. A current block of samples in a current picture being encoded may therefore have a corresponding block of samples in a previously decoded picture that accurately predicts the current block of samples. The corresponding block of samples may be displaced from the current block of samples due to movement of an object, represented in both blocks, across the respective pictures of the blocks. The previously decoded picture may be referred to as a reference picture and the corresponding block of samples in the reference picture may be referred to as a reference block or motion compensated prediction. An encoder may use a block matching technique to estimate the displacement (or motion) and determine the reference block in the reference picture.

Similar to intra prediction, once a prediction for a current block is determined and/or generated using inter prediction, an encoder may determine a difference between the current block and the prediction. The difference may be referred to as a prediction error or residual. The encoder may then store and/or signal in a bitstream the prediction error and other related prediction information for decoding or other forms of consumption. A decoder may decode the current block by predicting the samples of the current block using the prediction information and combining the predicted samples with the prediction error.

Figure 13A:
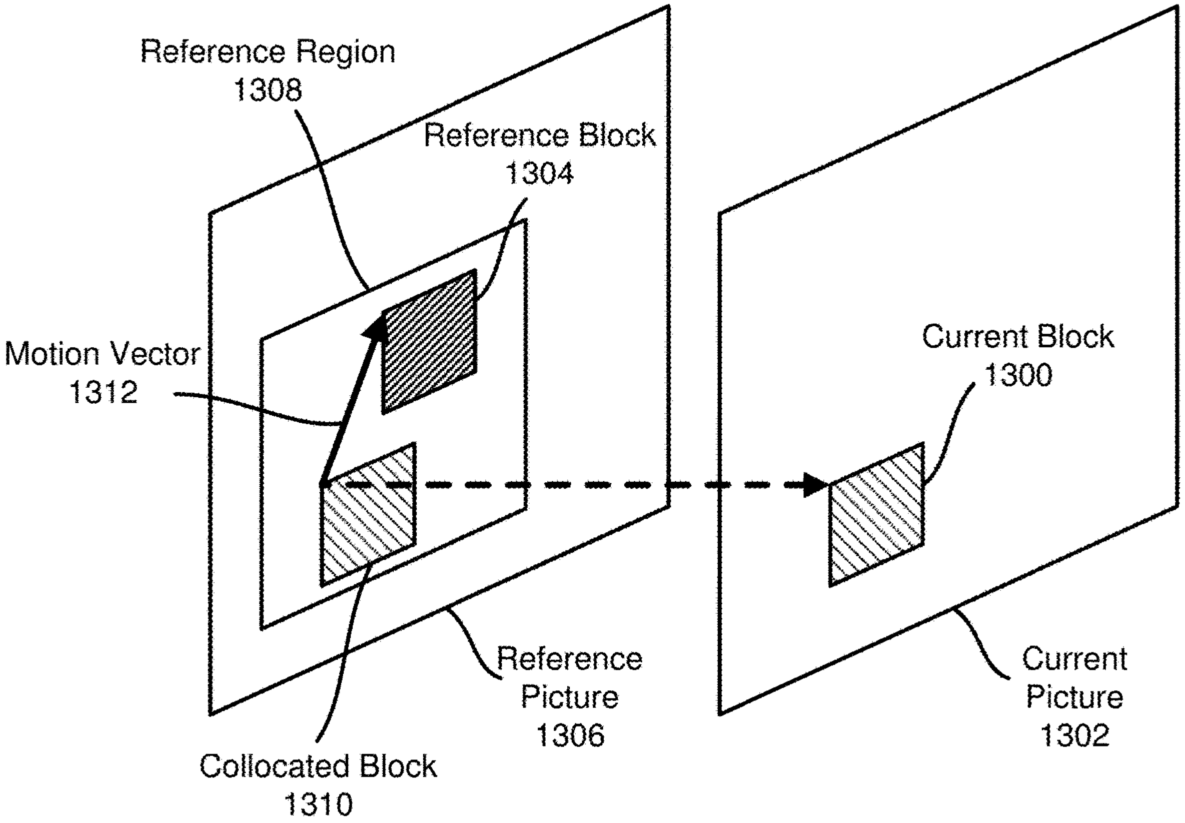
FIG. 13A illustrates an example of inter prediction performed for a current block in a current picture being encoded in accordance with embodiments of the present disclosure.

FIG. 13A illustrates an example of inter prediction performed for a current block 1300 in a current picture 1302 being encoded. An encoder, such as encoder 200 in FIG. 2, may perform inter prediction to determine and/or generate a reference block 1304 in a reference picture 1306 to predict current block 1300. Reference pictures, like reference picture 1306, are prior decoded pictures available at the encoder and decoder. Availability of a prior decoded picture may depend on whether the prior decoded picture is available in a decoded picture buffer at the time current block 1300 is being encoded or decoded. The encoder may, for example, search one or more reference pictures for a reference block that is similar to current block 1300. The encoder may determine a “best matching” reference block from the blocks tested during the searching process as reference block 1304. The encoder may determine that reference block 1304 is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), or sum of absolute transformed differences (SATD) between the prediction samples of reference block 1304 and the original samples of current block 1300.

The encoder may search for reference block 1304 within a search range 1308. Search range 1308 may be positioned around the collocated position (or block) 1310 of current block 1300 in reference picture 1306. In some instances, search range 1308 may at least partially extend outside of reference picture 1306. When extending outside of reference picture 1306, constant boundary extension may be used such that the values of the samples in the row or column of reference picture 1306, immediately adjacent to the portion of search range 1308 extending outside of reference picture 1306, are used for the “sample” locations outside of reference picture 1306. All or a subset of potential positions within search range 1308 may be searched for reference block 1304. The encoder may utilize any one of a number of different search implementations to determine and/or generate reference block 1304. For example, the encoder may determine a set of a candidate search positions based on motion information of neighboring blocks to current block 1300.

One or more reference pictures may be searched by the encoder during inter prediction to determine and/or generate the best matching reference block. The reference pictures searched by the encoder may be included in one or more reference picture lists. For example, in HEVC and VVC, two reference picture lists may be used, a reference picture list 0 and a reference picture list 1. A reference picture list may include one or more pictures. Reference picture 1306 of reference block 1304 may be indicated by a reference index pointing into a reference picture list comprising reference picture 1306.

Figure 13B:
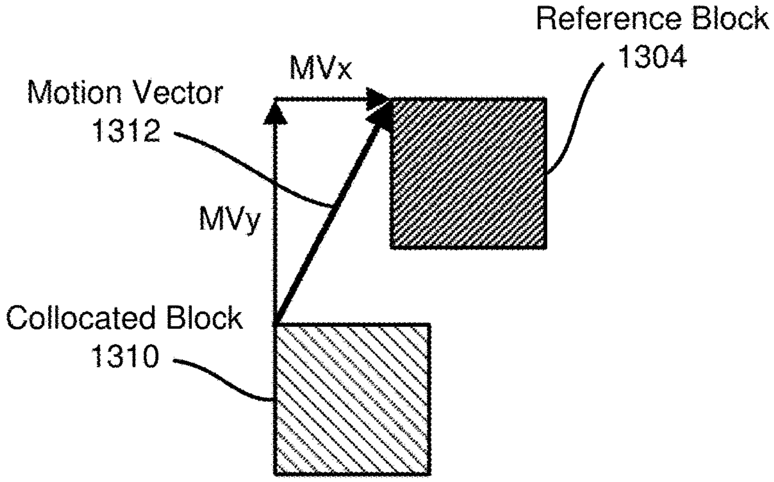
FIG. 13B illustrates an example horizontal component and vertical component of a motion vector in accordance with embodiments of the present disclosure.

The displacement between reference block 1304 and current block 1300 may be interpreted as an estimate of the motion between reference block 1304 and current block 1300 across their respective pictures. The displacement may be represented by a motion vector 1312. For example, motion vector 1312 may be indicated by a horizontal component (MVx) and a vertical component (MVy) relative to the position of current block 1300. FIG. 13B illustrates the horizontal component and vertical component of motion vector 1312. A motion vector, such as motion vector 1312, may have fractional or integer resolution. A motion vector with fractional resolution may point between two samples in a reference picture to provide a better estimation of the motion of current block 1300. For example, a motion vector may have ½, ¼, ⅛, 1/16, or 1/32 fractional sample resolution. When a motion vector points to a non-integer sample value in the reference picture, interpolation between samples at integer positions may be used to generate the reference block and its corresponding samples at fractional positions. The interpolation may be performed by a filter with two or more taps.

Once reference block 1304 is determined and/or generated for current block 1300 using inter prediction, the encoder may determine a difference (e.g., a corresponding sample-by-sample difference) between reference block 1304 and current block 1300. The difference may be referred to as a prediction error or residual. The encoder may then store and/or signal in a bitstream the prediction error and the related motion information for decoding or other forms of consumption. The motion information may include motion vector 1312 and a reference index pointing into a reference picture list comprising reference picture 1306. In other instances, the motion information may include an indication of motion vector 1312 and an indication of the reference index pointing into the reference picture list comprising reference picture 1306. A decoder may decode current block 1300 by determining and/or generating reference block 1304, which forms the prediction of current block 1300, using the motion information and combining the prediction with the prediction error.

Figure 14:
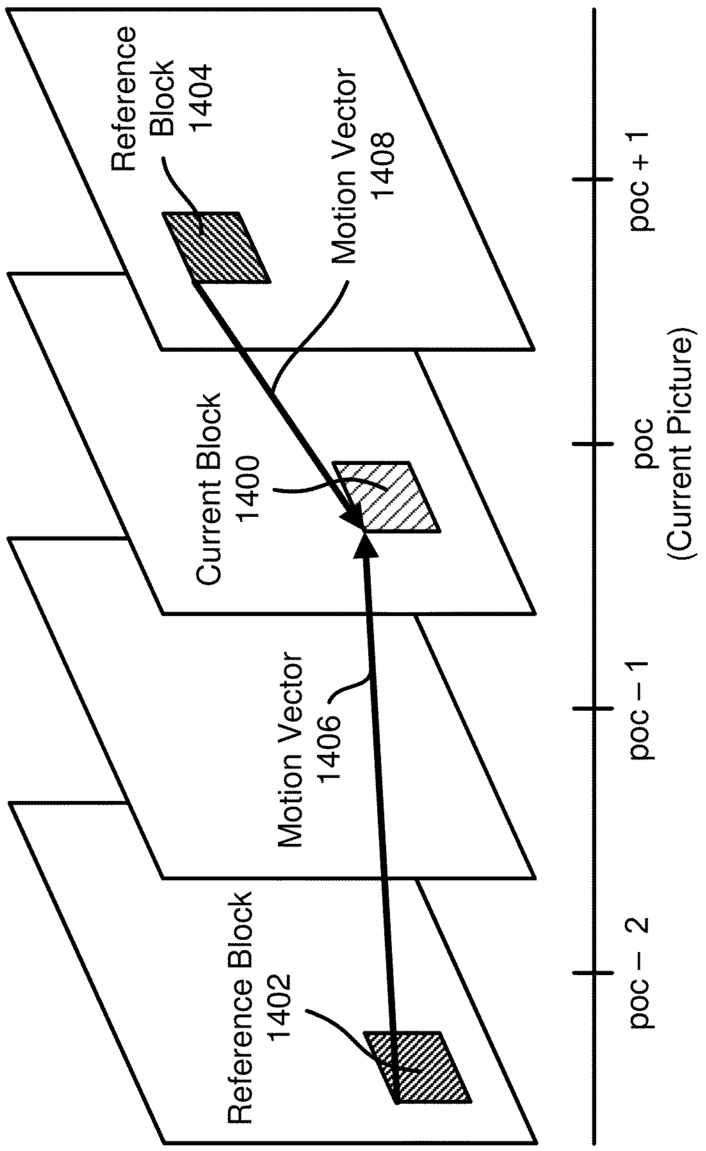
FIG. 14 illustrates an example of bi-prediction, performed for a current block in accordance with embodiments of the present disclosure.

In FIG. 13A, inter prediction is performed using one reference picture 1306 as the source of the prediction for current block 1300. Because the prediction for current block 1300 comes from a single picture, this type of inter prediction is referred to as uni-prediction. FIG. 14 illustrates another type of inter prediction, referred to as bi-prediction, performed for a current block 1400. In bi-prediction, the source of the prediction for a current block 1400 comes from two pictures. Bi-prediction may be useful, for example, where the video sequence comprises fast motion, camera panning or zooming, or scene changes. Bi-prediction may also be useful to capture fade outs of one scene or fade outs from one scene to another, where two pictures are effectively displayed simultaneously with different levels of intensity.

Whether uni-prediction or both uni-prediction and bi-prediction are available for performing inter prediction may depend on a slice type of current block 1400. For P slices, only uni-prediction may be available for performing inter prediction. For B slices, either uni-prediction or bi-prediction may be used. When uni-prediction is performed, an encoder may determine and/or generate a reference block for predicting current block 1400 from reference picture list 0. When bi-prediction is performed, an encoder may determine and/or generate a first reference block for predicting current block 1400 from reference picture list 0 and determine and/or generate a second reference block for predicting current block 1400 from reference picture list 1.

In FIG. 14, inter-prediction is performed using bi-prediction, where two reference blocks 1402 and 1404 are used to predict current block 1400. Reference block 1402 may be in a reference picture of one of reference picture list 0 or 1, and reference block 1404 may be in a reference picture of the other one of reference picture list 0 or 1. As shown in FIG. 14, reference block 1402 is in a picture that precedes the current picture of current block 1400 in terms of picture order count (POC), and reference block 1402 is in a picture that proceeds the current picture of current block 1400 in terms of POC. In other examples, the reference pictures may both precede or proceed the current picture in terms of POC. POC is the order in which pictures are output from, for example, a decoded picture buffer and is the order in which pictures are generally intended to be displayed. However, it should be noted that pictures that are output are not necessarily displayed but may undergo different processing or consumption, such as transcoding. In other examples, the two reference blocks determined and/or generated using bi-prediction may come from the same reference picture. In such an instance, the reference picture may be included in both reference picture list 0 and reference picture list 1.

A configurable weight and offset value may be applied to the one or more inter prediction reference blocks. An encoder may enable the use of weighted prediction using a flag in a picture parameter set (PPS) and signal the weighting and offset parameters in the slice segment header for the current block. Different weight and offset parameters may be signaled for luma and chroma components.

Once reference blocks 1402 and 1404 are determined and/or generated for current block 1400 using inter prediction, the encoder may determine a difference between current block 1400 and each of reference blocks 1402 and 1404. The differences may be referred to as prediction errors or residuals. The encoder may then store and/or signal in a bitstream the prediction errors and their respective related motion information for decoding or other forms of consumption. The motion information for reference block 1402 may include motion vector 1406 and the reference index pointing into the reference picture list comprising the reference picture of reference block 1402. In other instances, the motion information for reference block 1402 may include an indication of motion vector 1406 and an indication of the reference index pointing into the reference picture list-specifically, pointing to a reference picture comprising reference block 1402. The motion information for reference block 1404 may include motion vector 1408 and the reference index pointing into the reference picture list comprising the reference picture of reference block 1404. In other instances, the motion information for reference block 1404 may include an indication of motion vector 1408 and an indication of the reference index pointing into the reference picture list-specifically, pointing to a reference picture comprising reference block 14042. A decoder may decode current block 1400 by determining and/or generating reference blocks 1402 and 1404, which together form the prediction of current block 1400, using their respective motion information and combining the predictions with the prediction errors.

In HEVC, VVC, and other video compression schemes, motion information may be predictively coded before being stored or signaled in a bit stream. The motion information for a current block may be predictively coded based on the motion information of neighboring blocks of the current block. In general, the motion information of the neighboring blocks is often correlated with the motion information of the current block because the motion of an object represented in the current block is often the same or similar to the motion of objects in the neighboring blocks. Two of the motion information prediction techniques in HEVC and WC include advanced motion vector prediction (AMVP) and inter prediction block merging.

An encoder, such as encoder 200 in FIG. 2, may code a motion vector using the AMVP tool as a difference between the motion vector of a current block being coded and a motion vector predictor (MVP). An encoder may select the MVP from a list of candidate MVPs. The candidate MVPs may come from previously decoded motion vectors of neighboring blocks in the current picture of the current block or blocks at or near the collocated position of the current block in other reference pictures. Both the encoder and decoder may generate or determine the list of candidate MVPs.

After the encoder selects an MVP from the list of candidate MVPs, the encoder may signal, in a bitstream, an indication of the selected MVP and a motion vector difference (MVD). The encoder may indicate the selected MVP in the bitstream by an index pointing into the list of candidate MVPs. The MVD may be calculated based on the difference between the motion vector of the current block and the selected MVP. For example, for a motion vector represented by a horizontal component (MVx) and a vertical displacement (MVy) relative to the position of the current block being coded, the MVD may be represented by two components calculated as follows:

$$MVD_x = MV_x - MVP_x \tag{15}$$

$$MVD_y = MV_y - MVP_y \tag{16}$$

where $MVD_x$ and $MVD_y$ respectively represent the horizontal and vertical components of the MVD, and $MVP_x$ and $MVP_y$ respectively represent the horizontal and vertical components of the MVP. A decoder, such as decoder 300 in FIG. 3, may decode the motion vector by adding the MVD to the MVP indicated in the bitstream. The decoder may then decode the current block by determining and/or generating the reference block, which forms the prediction of the current block, using the decoded motion vector and combining the prediction with the prediction error.

Figure 15A:
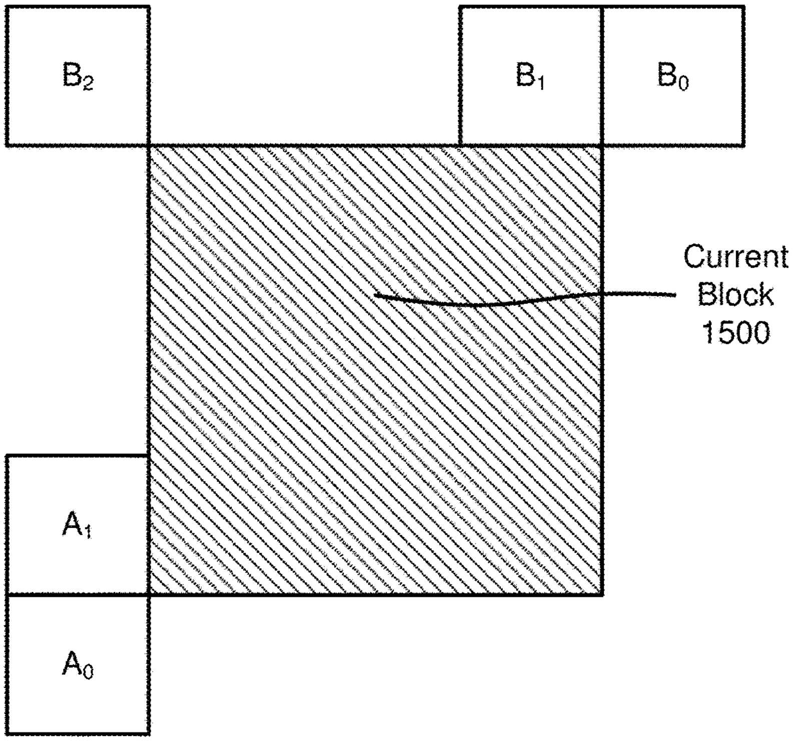
FIG. 15A illustrates an example location of five spatial candidate neighboring blocks relative to a current block being coded in accordance with embodiments of the present disclosure.
Figure 15B:
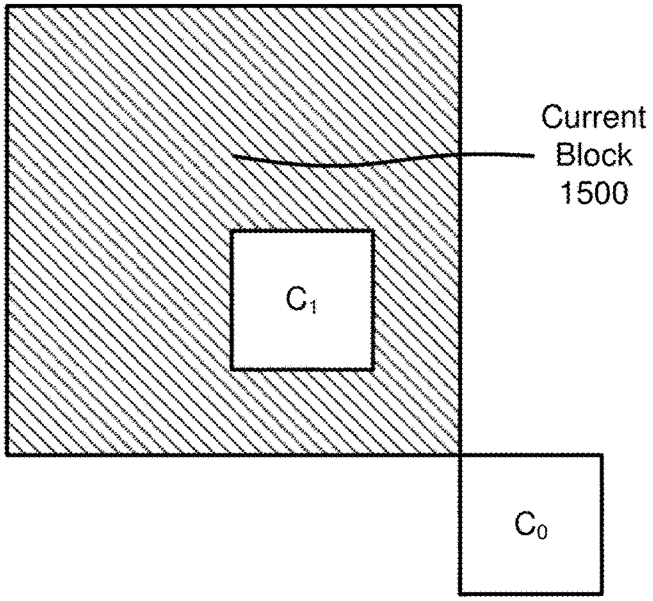
FIG. 15B illustrates an example location of two temporal, co-located blocks relative to a current block being coded in accordance with embodiments of the present disclosure.

In HEVC and WVC, the list of candidate MVPs for AMVP may comprise two candidates referred to as candidates A and B. Candidates A and B may include up to two spatial candidate MVPs derived from five spatial neighboring blocks of the current block being coded, one temporal candidate MVP derived from two temporal, co-located blocks when both spatial candidate MVPs are not available or are identical, or zero motion vectors when the spatial, temporal, or both candidates are not available. FIG. 15A illustrates the location of the five spatial candidate neighboring blocks relative to a current block 1500 being encoded. The five spatial candidate neighboring blocks are respectively denoted $A_0$, $A_1$, $B_0$, $B_1$, and $B_2$. FIG. 15B illustrates the location of the two temporal, co-located blocks relative to current block 1500 being coded. The two temporal, co-located blocks are denoted $C_0$ and $C_1$ and are included in a reference picture that is different from the current picture of current block 1500.

An encoder, such as encoder 200 in FIG. 2, may code a motion vector using the inter prediction block merging tool also referred to as merge mode. Using merge mode, the encoder may reuse the same motion information of a neighboring block for inter prediction of a current block. Because the same motion information of a neighboring block is used, no MVD needs to be signaled and the signaling overhead for signaling the motion information of the current block may be small in size. Similar to AMVP, both the encoder and decoder may generate a candidate list of motion information from neighboring blocks of the current block. The encoder may then determine to use (or inherit) the motion information of one neighboring block's motion information in the candidate list for predicting the motion information of the current block being coded. The encoder may signal, in the bit stream, an indication of the determined motion information from the candidate list. For example, the encoder may signal an index pointing into the list of candidate motion information to indicate the determined motion information.

In HEVC and WVC, the list of candidate motion information for merge mode may comprise up to four spatial merge candidates that are derived from the five spatial neighboring blocks used in AMVP as shown in FIG. 15A, one temporal merge candidate derived from two temporal, co-located blocks used in AMVP as shown in FIG. 15B, and additional merge candidates including bi-predictive candidates and zero motion vector candidates.

It should be noted that inter prediction may be performed in other ways and variants than those described above. For example, motion information prediction techniques other than AMVP and merge mode are possible. In addition, although the description above was primarily made with respect to inter prediction modes in HEVC and WVC, it will be understood that the techniques of the present disclosure described above and further below may be applied to other inter prediction modes, including those of other video coding standards like VP8, VP9, AV1, and the like. In addition, history based motion vector prediction (HMVP), combined intra/inter prediction mode (CIIP), and merge mode with motion vector difference (MMVD) as described in VVC may also be performed and are within the scope of the present disclosure.

In inter prediction, a block matching technique may be applied to determine a reference block in a different picture than the current block being encoded. Block matching techniques have also been applied to determine a reference block in the same picture as a current block being encoded. However, it has been determined that for camera-captured videos, a reference block in the same picture as the current block determined using block matching may often not accurately predict the current block. For screen content video this is generally not the case. Screen content video may include, for example, computer generated text, graphics, and animation. Within screen content, there is often repeated patterns (e.g., repeated patterns of text and graphics) within the same picture. Therefore, a block matching technique applied to determine a reference block in the same picture as a current block being encoded may provide efficient compression for screen content video.

Figure 16:
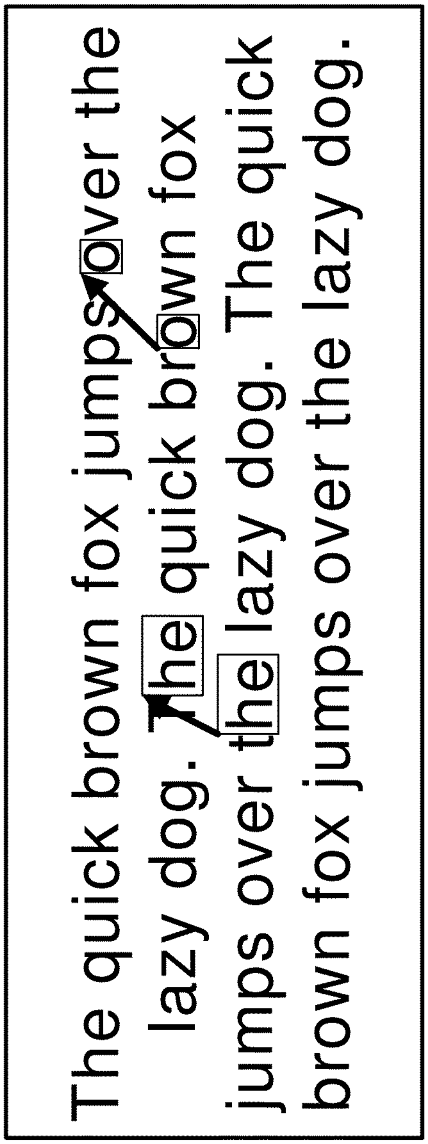
FIG. 16 illustrates an example of IBC applied for screen content in accordance with embodiments of the present disclosure.

HEVC and WVC both include a prediction technique to exploit the correlation between blocks of samples within the same picture of screen content video. This technique is referred to as intra block copy (IBC) or current picture referencing (CPR). Similar to inter prediction, an encoder may apply a block matching technique to determine a displacement vector (referred to as a block vector (BV)) that indicates the relative displacement from the current block to a reference block (or intra block compensated prediction) that "best matches" the current block. The encoder may determine the best matching reference block from blocks tested during a searching process similar to inter prediction. The encoder may determine that a reference block is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), sum of absolute transformed differences (SATD), or difference determined based on a hash function) between the prediction samples of the reference block and the original samples of the current block. A reference block may correspond to prior decoded blocks of samples of the current picture. The reference block may comprise decoded blocks of samples of the current picture prior to being processed by in-loop filtering operations, like deblocking or SAO filtering. FIG. 16 illustrates an example of IBC applied for screen content. The rectangular portions with arrows beginning at their boundaries are current blocks being encoded and the rectangular portions that the arrows point to are the reference blocks for predicting the current blocks.

Once a reference block is determined and/or generated for a current block using IBC, the encoder may determine a difference (e.g., a corresponding sample-by-sample difference) between the reference block and the current block. The difference may be referred to as a prediction error or residual. The encoder may then store and/or signal in a bitstream the prediction error and the related prediction information for decoding or other forms of consumption. The prediction information may include a BV. In other instances, the prediction information may include an indication of the BV. A decoder, such as decoder 300 in FIG. 3, may decode the current block by determining and/or generating the reference block, which forms the prediction of the current block, using the prediction information and combining the prediction with the prediction error.

In HEVC, VVC, and other video compression schemes, a BV may be predictively coded before being stored or signaled in a bit stream. The BV for a current block may be predictively coded based on the BV of neighboring blocks of the current block. For example, an encoder may predictively code a BV using the merge mode as explained above for inter prediction or a similar technique as AMVP also explained above for inter prediction. The technique similar to AMVP may be referred to as BV prediction and difference coding.

For BV prediction and difference coding, an encoder, such as encoder 200 in FIG. 2, may code a BV as a difference between the BV of a current block being coded and a BV predictor (BVP). An encoder may select the BVP from a list of candidate BVPs. The candidate BVPs may come from previously decoded BVs of neighboring blocks of the current block in the current picture. Both the encoder and decoder may generate or determine the list of candidate BVPs.

After the encoder selects a BVP from the list of candidate BVPs, the encoder may signal, in a bitstream, an indication of the selected BVP and a BV difference (BVD). The encoder may indicate the selected BVP in the bitstream by an index pointing into the list of candidate BVPs. The BVD may be calculated based on the difference between the BV of the current block and the selected BVP. For example, for a BV represented by a horizontal component ($BV_x$) and a vertical component ($BV_y$) relative to the position of the current block being coded, the BVD may represented by two components calculated as follows:

$$BVD_x = BV_x - BVP_x \tag{17}$$

$$BVD_y = BV_y - BVP_y \tag{18}$$

where $BVD_x$ and $BVD_y$ respectively represent the horizontal and vertical components of the BVD, and $BVP_x$ and $BVP_y$ respectively represent the horizontal and vertical components of the BVP. A decoder, such as decoder 300 in FIG. 3, may decode the BV by adding the BVD to the BVP indicated in the bitstream. The decoder may then decode the current block by determining and/or generating the reference block, which forms the prediction of the current block, using the decoded BV and combining the prediction with the prediction error.

In HEVC and VVC, the list of candidate BVPs may comprise two candidates referred to as candidates A and B. Candidates A and B may include up to two spatial candidate BVPs derived from five spatial neighboring blocks of the current block being encoded, or one or more of the last two coded BVs when spatial neighboring candidates are not available (e.g., because they are coded in intra or inter mode). The location of the five spatial candidate neighboring blocks relative to a current block being encoded using IBC are the same as those shown in FIG. 15A for inter prediction. The five spatial candidate neighboring blocks are respectively denoted $A_0$, $A_1$, $B_0$, $B_1$, and $B_2$. In other implementations, the list of candidate BVPs may include more than two candidate BVPs.

As explained above with respect to FIGS. 2 and 3, entropy coding may be performed at the end of the video encoding process and at the beginning of the video decoding process. Entropy coding is a technique for compressing a sequence of symbols by representing symbols with greater probability of occurring using fewer bits than symbols with less probability of occurring. When the compressed sequence of symbols is represented in bits {0, 1}, Shannon's information theory provides that the optimal average code length for a symbol with probability p is-log 2p.

Arithmetic coding is one method of entropy coding. Arithmetic coding is based on recursive interval subdivision. To arithmetically encode a symbol that takes a value from an m-ary source alphabet, an initial coding interval may be divided into m disjoint subintervals. Each of the m disjoint subintervals may have a width proportional to the probability of the symbol having a different one of the values in the m-ary source alphabet. The probabilities of the symbol having the different values in the m-ary source alphabet may be referred to as a probability model for the symbol. The symbol is arithmetically encoded by choosing the subinterval corresponding to the actual value of the symbol as the new coding interval. By recursively applying this interval-subdivision scheme to each symbol $s_i$ of a given sequence $s=\{s_1, s_2, \ldots, s_N)$, the encoder may determine a value in the range of the final coding interval, after the Nth interval subdivision, as the arithmetic code word for the sequence s. Each successive symbol of the sequence s that is encoded reduces the size of the coding interval in accordance with the probability model of the symbol. The more likely symbol values reduce the size of the coding interval by less than the unlikely symbol values and hence add fewer bits to the arithmetic code word for the sequence s in accordance with the general principle of entropy coding.

Arithmetic decoding is based on the same recursive interval subdivision. To arithmetically decode a symbol that takes a value from an m-ary source alphabet, an initial coding interval may be divided into m disjoint subintervals. Each of the m disjoint subintervals may have a width proportional to the probability of the symbol having a different one of the values in the m-ary source alphabet. The probabilities of the symbol having the different values in the m-ary source alphabet may be referred to as a probability model for the symbol as mentioned above. The symbol is arithmetically decoded from an arithmetic code word by determining the symbol value corresponding to the subinterval in which the arithmetic code word falls within. This subinterval then becomes the new coding interval. The decoder may sequentially decode each symbol $s_i$ of a sequence s={$s_1$, $s_2$, . . . , $s_N$) by recursively applying this interval-subdivision scheme N times and determining which subinterval the arithmetic code word falls within during each iteration.

For each symbol arithmetically coded, a different probability model may be used to subdivide the coding interval. For example, the probability model for a symbol may be determined by a fixed selection (e.g., based on a position of the symbol in a sequence of symbols) or by an adaptive selection from among two or more probability models (e.g., based on information related to the symbol). It is also possible for two or more symbols in a sequence of symbols to use a joint probability model. Selection of a probability model for a symbol is referred to as context modeling. Arithmetic coding that employs context modeling may be referred to more specifically as context-based arithmetic coding. In addition to probability model selection for a symbol, the selected probability model may be updated based on the actual coded value of the symbol. For example, the probability of the actual coded value of the symbol may be increased in the probability model while the probability of all other values may be decreased. Arithmetic coding that employs both context modeling and probability model adaptation may be referred to more specifically as context-based adaptive arithmetic coding.

The above description provides only one example of arithmetic coding. Other variations of arithmetic coding may be possible as would be appreciated by a person of ordinary skill in the art. For example, during arithmetic coding, a renormalization operation may be performed to ensure that the precision needed to represent the range and lower bound of a subinterval does not exceed the finite precision of registers used to store these values. In addition, other simplifications to the coding process may be made to decrease complexity, increase speed, and/or reduce power requirements of the implementation of the coding process in either hardware, software, or some combination of the two. For example, probabilities of symbols and lower bounds and ranges of subintervals may be approximated or quantized in such implementations.

Figure 17:
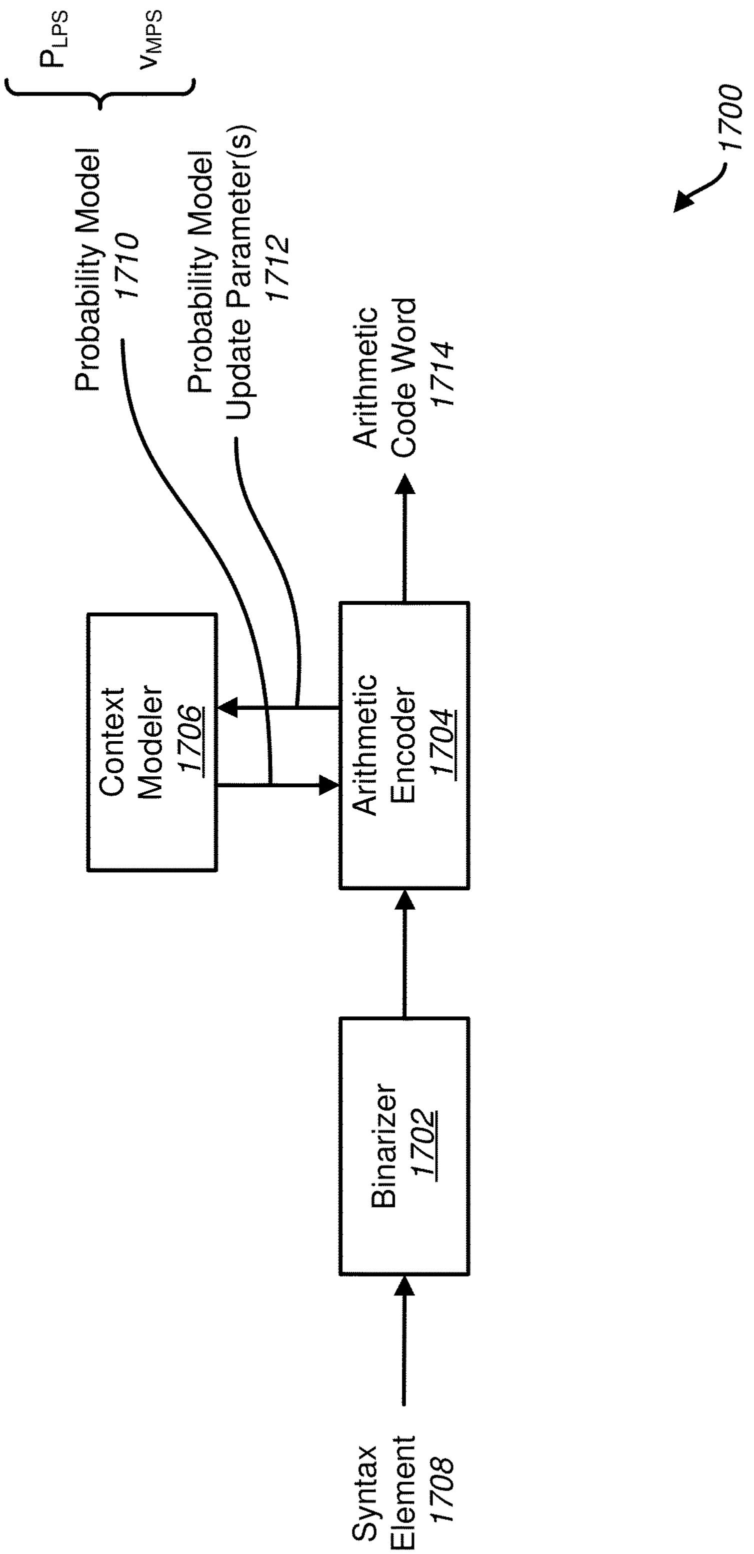
FIG. 17 illustrates an example implementation of a context-based adaptive binary arithmetic coding (CABAC) encoder in accordance with embodiments of the present disclosure.

FIG. 17 illustrates an example implementation of a context-based adaptive binary arithmetic coding (CABAC) encoder 1700 in accordance with embodiments of the present disclosure. CABAC encoder 1700 may be implemented in a video encoder, such as video encoder 200 in FIG. 2, for entropy encoding syntax elements of a video sequence. As illustrated in FIG. 17, CABAC encoder 1700 includes a binarizer 1702, an arithmetic encoder 1704, and a context modeler 1706.

CABAC encoder 1700 may receive a syntax element 1708 for arithmetic encoding. Syntax elements, such as syntax element 1708, may be generated at a video encoder and may describe how a video signal may be reconstructed at a video decoder. For a coding unit (CU), the syntax elements may comprise an intra prediction mode based on the CU being intra predicted, motion data (e.g., MVD and MVP related data) based on the CU being inter predicted, or displacement data (e.g., BVD and BVP related data) based on the CU being predicted using IBC.

Binarizer 1702 may first map the value of syntax element 1708 to a sequence of binary symbols (also referred to as bins). Binarizer 1702 may define a unique mapping of values of syntax element 1708 to sequences of binary symbols. Binarization of syntax elements may help to improve probability modeling and implementation of arithmetic encoding. Binarizer 1702 may implement one or more binarization processes, such as unary, truncated unary, k-th order truncated Rice, k-th order exponential-Golomb (EGk), fixed-length, or some combination of two or more of these binarization processes. Binarizer 1702 may select a binarization process based on a type of syntax element 1708 and/or one or more syntax elements processed by CABAC encoder 1700 before syntax element 1708. Based on syntax element 1708 already being represented by a sequence of one or more binary symbols, binarizer 1702 may not process syntax element 1708. In another example, binarizer 1702 may not be used and syntax element 1708, represented by a sequence of one or more non-binary symbols, may be directly encoded by CABAC encoder 1700.

After binarizer 1702 optionally maps the value of syntax element 1708 to a sequence of binary symbols, one or more of the binary symbols may be processed by arithmetic encoder 1704. Arithmetic encoder 1704 may process each of the one or more binary symbols in one of at least two modes: regular arithmetic encoding mode or bypass arithmetic encoding mode.

Arithmetic encoder 1704 may process binary symbols that do not have a uniform (or approximately uniform) probability distribution in regular arithmetic encoding mode (e.g., binary symbols that do not have a probability distribution of 0.5 for each of their two possible values). In regular arithmetic encoding mode, arithmetic encoder 1704 may perform arithmetic encoding as described above. For example, arithmetic encoder 1704 may subdivide a current coding interval into m disjoint subintervals. Each of the m disjoint subintervals may have a width proportional to the probability of the binary symbol having a different one of the values in an m-ary source alphabet. In the case of a binary symbol, m is equal to two and the current coding interval may be subdivided into two disjoint intervals that each have a width proportional to the probability of a different one of the two possible values {0, 1} for the binary symbol being encoded. The probabilities of the two possible values for the binary symbol may be indicated by a probability model 1710 for the binary symbol. Arithmetic encoder 1704 may then encode the binary symbol by choosing the subinterval corresponding to the actual value of the binary symbol as the new coding interval for the next binary symbol to be encoded.

Arithmetic encoder 1704 may receive probability model 1710 from context modeler 1706. Context modeler 1706 may determine probability model 1710 for the binary symbol by a fixed selection (e.g., based on a position of the binary symbol in the sequence of binary symbols representing syntax element 1708) or by an adaptive selection from among two or more probability models (e.g., based on information related to the binary symbol). As shown in FIG. 17, probability model 1710 may comprise two parameters: the probability $P_{LPS}$ of the least probable symbol (LPS) and the value $V_{MPS}$ of the most probable symbol (MPS). In other examples, probability model 1710 may comprise the probability $P_{MPS}$ of the MPS in addition or alternatively to the probability $P_{LPS}$ of the LPS. Similarly, in other examples, probability model 1710 may comprise the value $V_{LPS}$ of the LPS in addition or alternatively to the value $V_{MPS}$ of the MPS. After arithmetic encoder 1704 encodes the binary symbol, arithmetic encoder 1704 may provide one or more probability model update parameters 1712 to context modeler 1706. Context modeler 1706 may adapt probability model 1710 based on the one or more probability model update parameters 1712. For example, the one or more probability model update parameters 1712 may comprise the actual coded value of the binary symbol. Context modeler 1706 may update probability model 1710 by increasing $P_{LPS}$ if the actual coded value of the binary symbol is not equal to $V_{MPS}$ and by decreasing $P_{LPS}$ otherwise.

Arithmetic encoder 1704 may process binary symbols that have (or are assumed to have) a uniform (or approximately uniform) probability distribution in bypass arithmetic encoding mode. Because binary symbols processed by arithmetic encoder 1704 in bypass arithmetic encoding mode have (or are assumed to have) a uniform (or approximately uniform) probability distribution, arithmetic encoder 1704 may bypass probability model determination and adaptation performed in regular arithmetic encoding mode when encoding these binary symbols to speed up the encoding process. In addition, subdivision of the current coding interval may be simplified given the uniform (or assumed uniform) probability distribution. For example, the current coding interval may be partitioned into two disjoint subintervals of equal width, which may be realized using a simple implementation that may further speed up the encoding process. Arithmetic encoder 1704 encodes the binary symbol by choosing the subinterval corresponding to the value of the binary symbol as the new coding interval for the next binary symbol to be encoded. The resulting increase in encoding speed for binary symbols encoded by arithmetic encoder 1704 in bypass arithmetic encoding mode is often important because CABAC encoding may have throughput limitations.

After processing a number of binary symbols (e.g., corresponding to one or more syntax elements), arithmetic encoder 1704 may determine a value in the range of the final coding interval as an arithmetic code word 1714 for the binary symbols. Arithmetic encoder 1704 may then output arithmetic code word 1714. For example, arithmetic encoder 1704 may output arithmetic code word 1714 to a bitstream that may be received and processed by a video decoder.

As explained above, two syntax elements that may be coded in bypass arithmetic coding mode are the magnitude of the motion vector difference (MVD) and the magnitude of the block vector difference (BVD). These syntax elements may be respectively determined as part of advanced motion vector prediction (AMVP) for inter prediction and AMVP for intra block copy (IBC) as explained above. Although the bypass arithmetic coding mode may be used to speed up the arithmetic coding process, compression of the symbols of these syntax elements coded in bypass arithmetic encoding mode is limited because their probability distributions are uniformly distributed (or at least assumed to be uniformly distributed). From information theory, a symbol cannot be compressed at a rate less than its entropy without loss of information, and a symbol with a uniform probability distribution has maximum entropy. Thus, symbols coded using the bypass arithmetic encoding mode generally require more bits to encode than symbols encoded using the regular arithmetic encoding mode.

In some embodiments, to further improve compression efficiency of one or more magnitude symbols of a BVD, instead of entropy coding a magnitude symbol of the BVD, an indication of whether a value of the magnitude symbol of the BVD matches (or is equal to) a value of the magnitude symbol of a BVD candidate used as a predictor of the BVD may be entropy coded. The BVD predictor may be selected from among a plurality of BVD candidates based on costs of the plurality of BVD candidates. The cost of each BVD candidate in the plurality of BVD candidates may be calculated based on a difference between a template of a current block and a template of a candidate reference block. The candidate reference block may be displaced relative to the current block by a sum of the BVD candidate and a block vector predictor (BVP). The indication of whether the value of the magnitude symbol of the BVD matches the value of the magnitude symbol of the BVD predictor may have a non-uniform probability distribution and therefore provide improved compression efficiency over coding the magnitude symbol of the BVD based on a uniform probability distribution.

Compression efficiency of one or more magnitude symbols of an MVD may be improved similarly as for BVD. Instead of entropy coding a magnitude symbol of the MVD, an indication of whether a value of the magnitude symbol of the MVD matches (or is equal to) a value of the magnitude symbol of an MVD candidate used as a predictor of the MVD may be entropy coded. The MVD predictor may be selected from among a plurality of MVD candidates based on costs of the plurality of MVD candidates. The cost of each MVD candidate in the plurality of MVD candidates may be calculated based on a difference between a template of a current block and a template of a candidate reference block. The candidate reference block may be displaced relative to a co-location of the current block in a reference frame by a sum of the MVD candidate and a motion vector predictor (MVP). The indication of whether the value of the magnitude symbol of the MVD matches the value of the magnitude symbol of the MVD predictor may have a non-uniform probability distribution and therefore provide improved compression efficiency over coding the magnitude symbol of the MVD based on a uniform probability distribution.

As explained above, HEVC and VVC both include a prediction technique to exploit the correlation between blocks of samples within the same picture. This technique is referred to as Intra Block Copy (IBC). IBC is also included in the Enhanced Compression Model (ECM) software algorithm that is currently under coordinated exploration study by the Joint Video Exploration Team (JVET) of ITU-T Video Coding Experts Group (VCEG) and ISO/IEC MPEG as a potential enhanced video coding technology beyond the capabilities of VVC.

Figure 18A:
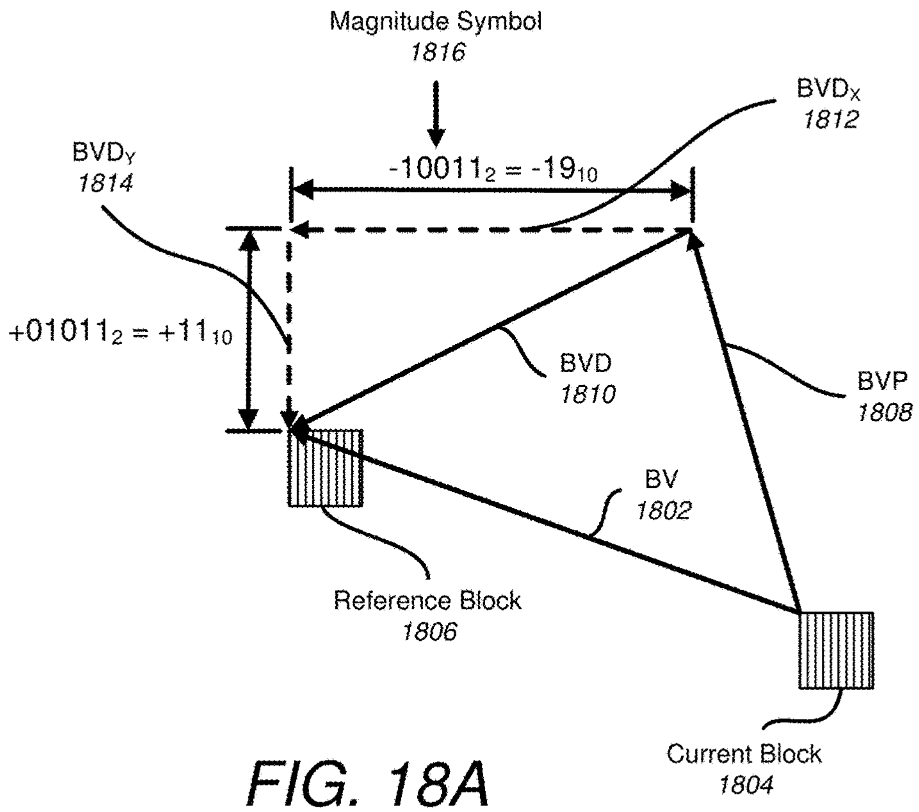
FIG. 18A illustrates an example of IBC in accordance with embodiments of the present disclosure.

FIG. 18A illustrates an example of IBC in accordance with embodiments of the present disclosure. During IBC, an encoder may determine a block vector (BV) 1802 that indicates the displacement from a current block 1804 to a reference block (or intra block compensated prediction) 1806. The encoder may determine reference block 1806 from among one or more reference blocks tested during a searching process. For example, for each of the one or more reference blocks tested during a searching process, the encoder may determine a difference (e.g., sum of squared differences (SSD), sum of absolute differences (SAD), sum of absolute transformed differences (SATD), or difference determined based on a hash function) between the samples of the reference block and the samples of current block 1804. The encoder may determine reference block 1806 from among the one or more reference blocks based on reference block 1806 having the smallest difference from current block 1804 among the one or more reference blocks or based on some other criteria. Reference block 1806 and the one or more other reference blocks tested during the searching process may comprise decoded (or reconstructed) samples. The decoded (or reconstructed) samples may not have been processed by in-loop filtering operations, like deblocking or SAO filtering.

Once reference block 1806 is determined for current block 1804, the encoder may use reference block 1806 to predict current block 1804. For example, the encoder may determine or use a difference (e.g., a corresponding sample-by-sample difference) between reference block 1806 and current block 1804. The difference may be referred to as a prediction error or residual. The encoder may then signal the prediction error and the related prediction information in a bitstream. The prediction information may include BV 1802. In other instances, the prediction information may include an indication of BV 1802. A decoder, such as decoder 300 in FIG. 3, may receive the bitstream and decode current block 1804 by determining reference block 1806, which forms the prediction of current block 1804, using the prediction information and combining the prediction with the prediction error.

BV 1802 may be predictively encoded before being signaled in a bit stream. BV 1802 may be predictively encoded based on the BVs of neighboring blocks of current block 1804 or BVs of other blocks. For example, the encoder may predictively encode BV 1802 using the merge mode or AMVP as explained above. For AMVP, the encoder may encode BV 1802 as a difference between BV 1802 and a BV predictor (BVP) 1808 as shown in FIG. 18A. The encoder may select BVP 1808 from a list of candidate BVPs. The candidate BVPs may come from previously decoded BVs of neighboring blocks of current block 1804 or other sources. Both the encoder and decoder may generate or determine the list of candidate BVPs.

After the encoder selects BVP 1808 from the list of candidate BVPs, the encoder may signal, in a bitstream, an indication of BVP 1808 and a BV difference (BVD) 1810. The encoder may indicate BVP 1808 in the bitstream by an index, pointing into the list of candidate BVPs, or one or more flags. BVD 1810 may be calculated based on the difference between BV 1802 and BVP 1808. BVD 1810 may comprise a horizontal component (BVDx) 1812 and a vertical component (BVDy) 1814 that may be respectively determined in accordance with (17) and (18) above. The two components BVDx 1812 and BVDy 1814 each comprise a magnitude and sign. As shown in FIG. 18A, BVDx 1812 has a magnitude of 10011 in fixed length binary (or 19 in base 10) and a negative sign (the positive horizontal direction points to the right in the example of FIG. 18A). As further shown in FIG. 18A, BVDy 1814 has a magnitude of 01011 in fixed length binary (or 11 in base 10) and a positive sign (the positive vertical direction points down in the example of FIG. 18A). The encoder may indicate BVD 1810 in the bitstream via its two components BVDx 1812 and BVDy 1814.

The decoder may decode BV 1802 by adding BVD 1810 to BVP 1808. The decoder may then decode current block 1804 by determining reference block 1806, which forms the prediction of current block 1804, using BV 1802 and combining the prediction with the prediction error. The decoder may determine reference block 1806 by adding BV 1802 to the location of current block 1804, which may give the location of reference block 1806.

As explained above, the magnitude of BVD 1810 may be encoded in bypass arithmetic encoding mode. Although the bypass arithmetic encoding mode may be used to speed up the arithmetic encoding process, compression of the magnitude symbols of BVD 1810 encoded in bypass arithmetic encoding mode is limited because their probability distributions are uniformly distributed (or at least assumed to be uniformly distributed). From information theory, a symbol cannot be compressed at a rate less than its entropy without loss of information, and a symbol with uniform probability distribution has maximum entropy. Thus, symbols encoded using the bypass arithmetic encoding mode generally require more bits to encode than symbols encoded using the regular arithmetic encoding mode.

Example embodiments described herein may improve the compression efficiency of one or more magnitude symbols of BVD 1810. For example, instead of directly entropy encoding a magnitude symbol of BVD 1810, the encoder may entropy encode an indication of whether a value of the magnitude symbol of BVD 1810 matches a value of the same magnitude symbol of a BVD candidate used as a predictor of BVD 1810. The indication of whether the value of the magnitude symbol of BVD 1810 matches the value of the magnitude symbol of the BVD predictor may have a non-uniform probability distribution and therefore provide improved compression efficiency. The encoder may select the BVD predictor from among a plurality of BVD candidates based on costs of the plurality of the BVD candidates. The BVD candidates may include a BVD candidate for each possible value of the magnitude symbol of BVD 1810. For example, a magnitude symbol of BVD 1810 represented in binary form has only two possible values. Therefore, the BVD candidates may include two BVD candidates for this representation (one for each possible value of the magnitude symbol in BVD 1810 being encoded): a first BVD candidate equal to BVD 1810 itself and a second BVD candidate equal to BVD 1810 but with the opposite (or other) value of the magnitude symbol of BVD 1810. The cost for each BVD candidate in the plurality of BVD candidates may be calculated based on a difference between a template of current block 1804 and a template of a candidate reference block. The candidate reference block may be displaced relative to the current block by a sum of the BVD candidate and BVP 1808.

To provide a more specific example, FIG. 18A indicates an example magnitude symbol 1816 of BVD 1810 to be entropy encoded. Magnitude symbol 1816 of BVD 1810 is the second most significant bit in the fixed length binary representation of horizontal component $BVD_x$ 1812 of BVD 1810 and has a binary value of "0". As explained above, instead of directly entropy encoding magnitude symbol 1816 of BVD 1810, the encoder may entropy encode an indication of whether the value of magnitude symbol 1816 of BVD 1810 matches the value of the same magnitude symbol of a BVD candidate used as a predictor of BVD 1810. The encoder may select the BVD predictor from among a plurality of BVD candidates based on costs of the plurality of BVD candidates. The BVD candidates may include a BVD candidate for each of the two possible values {0, 1} of magnitude symbol 1816 of BVD 1810: a first BVD candidate 1818 equal to BVD 1810 itself and a second BVD candidate 1820 equal to BVD 1810 but with the opposite (or other) value of magnitude symbol 1816 of BVD 1810.

Figure 18B:
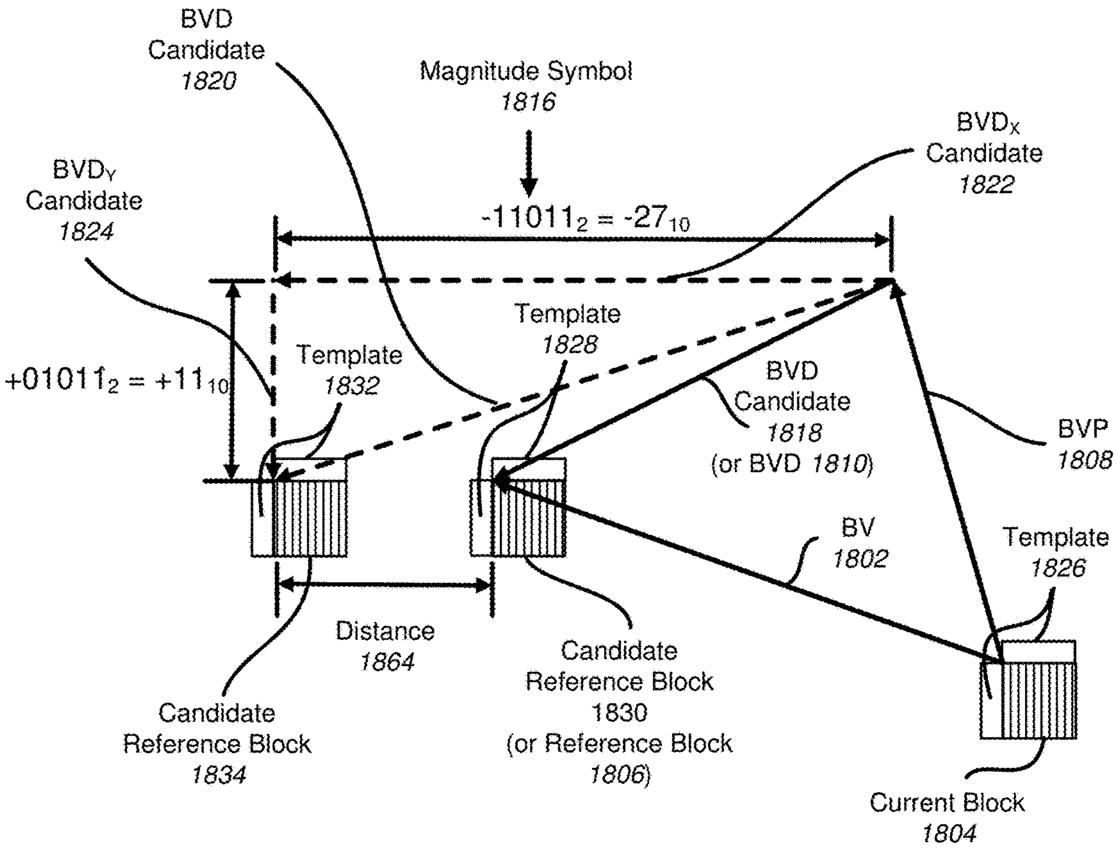
FIG. 18B illustrates example BVD candidates used to entropy encode a magnitude symbol of a BVD in accordance with embodiments of the present disclosure.

FIG. 18B illustrates example BVD candidates used to entropy encode a magnitude symbol of a BVD in accordance with embodiments of the present disclosure. In the example illustrated by FIG. 18B, both BVD candidates used to entropy encode magnitude symbol 1816 of BVD 1810. More specifically, FIG. 18B illustrates BVD candidate 1818 equal to BVD 1810 itself and BVD candidate 1820 equal to BVD 1810 but with the opposite (or other) value of magnitude symbol 1816 of BVD 1810. With the opposite (or other) value of magnitude symbol 1816 of BVD candidate 1818, BVD candidate 1820 has a horizontal component $BVD_x$ 1822 with a magnitude of 11011 in fixed length binary (or 27 in base 10) and a negative sign. The vertical component $BVD_y$ 1824 of BVD candidate 1820 has the same magnitude of 01011 in fixed length binary (or 11 in base 10) and positive sign as vertical component $BVD_y$ 1814 of BVD candidate 1818 (or BVD 1810).

The cost for each BVD candidate in the plurality of BVD candidates may be calculated based on a difference between a template of current block 1804 and a template of a candidate reference block displaced relative to current block 1804 by a sum of the BVD candidate and BVP 1808. For example, the encoder may determine a cost for BVD candidate 1818 based on a difference between a template 1826 of current block 1804 and a template 1828 of a candidate reference block 1830 displaced relative to current block 1804 by a sum of BVD candidate 1818 and BVP 1808. The encoder may determine the difference between template 1826 and template 1828 based on a difference (e.g., sum of squared differences (SSD), sum of absolute differences (SAD), sum of absolute transformed differences (SATD), mean removal SAD, or mean removal SSD) between samples of template 1826 and samples of template 1828. The encoder may similarly determine a cost for BVD candidate 1820 based on a difference between template 1826 of current block 1804 and a template 1832 of a candidate reference block 1834 displaced relative to current block 1804 by a sum of BVD candidate 1820 and BVP 1808. The encoder may determine the difference between template 1826 and template 1832 based on a difference (e.g., SSD, SAD, SATD, mean removal SAD, or mean removal SSD) between samples of template 1826 and samples of template 1828. Templates 1826, 1828, and 1832 may comprise one or more samples to the left and/or above their respective blocks. For example, templates 1826, 1828, and 1832 may comprise samples from one or more columns to left of their respective block and/or from one or more rows above their respective block. FIG. 18B illustrates one example position and shape (e.g., an L-shape rotated clockwise 90 degrees) of templates 1826, 1828, and 1832.

After determining the costs of each of the plurality of BVD candidates, the encoder may select one of the plurality of BVD candidates as a BVD predictor. For example, the encoder may select the BVD candidate with the smallest cost among the plurality of BVD candidates as the BVD predictor.

Figure 18C:
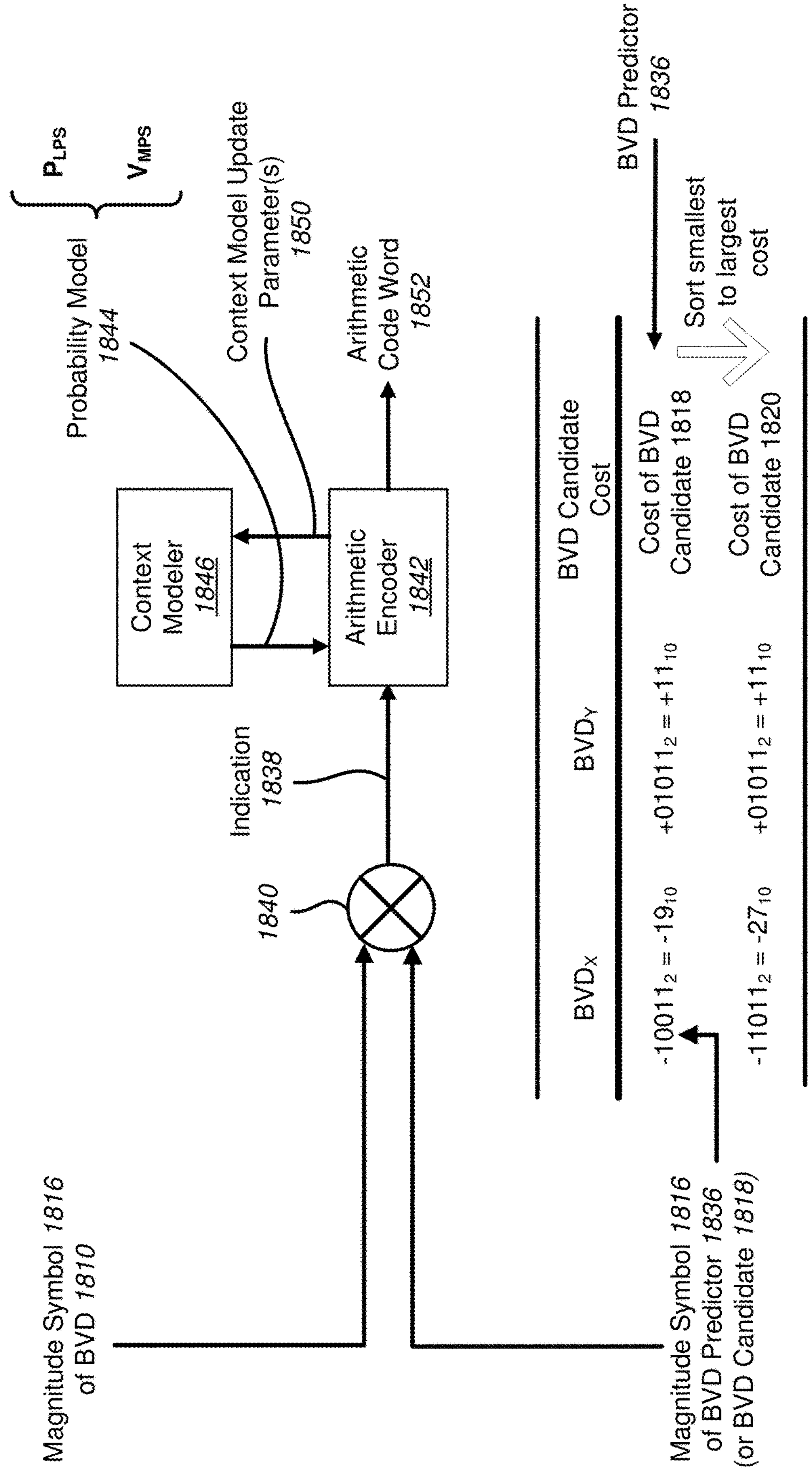
FIG. 18C illustrates an example of entropy encoding an indication of whether a value of a magnitude symbol of a BVD matches a value of the magnitude symbol of a BVD candidate used as a predictor of the BVD in accordance with embodiments of the present disclosure.

FIG. 18C illustrates an example of entropy encoding an indication of whether a value of a magnitude symbol of a BVD matches a value of the magnitude symbol of a BVD candidate used as a predictor of the BVD in accordance with embodiments of the present disclosure. FIG. 18C further illustrates a table with the components (horizontal and vertical) and costs of each BVD candidate 1818 and 1820 in respective rows. In this example, BVD candidates 1818 and 1820 are assumed to be the only BVD candidates. In other examples, more BVD candidates may be used. The rows of the table are sorted by the costs of BVD candidates 1818 and 1820, with the BVD candidate with the smallest cost on top. In this example, BVD candidate 1818 has the smallest cost among BVD candidates 1818 and 1820. The encoder may therefore select BVD candidate 1818 as the BVD predictor 1836 for BVD 1810.

After selecting BVD candidate 1818 as BVD predictor 1836, the encoder may entropy encode an indication 1838 of whether the value of magnitude symbol 1816 of BVD 1810 matches the value of magnitude symbol 1816 in BVD predictor 1836. Magnitude symbol 1816 of BVD predictor 1836 has a value of "0", which matches the value of magnitude symbol 1816 of BVD 1810. In this example, indication 1838 would indicate that the value of magnitude symbol 1816 of BVD 1810 matches the value of magnitude symbol 1816 of BVD predictor 1836. In one example, indication 1838 may be a single bit that has the value: "0" when the value of magnitude symbol 1816 of BVD 1810 matches the value of magnitude symbol 1816 of BVD predictor 1836; and "1" when the value of magnitude symbol 1816 of BVD 1810 does not match the value of magnitude symbol 1816 of BVD predictor 1836. Logic 1840 may be used to determine indication 1838. In one example, logic 1840 may implement a logical exclusive or (XOR) function. It should be noted that in other examples where magnitude symbol 1816 is non-binary, indication 1838 may indicate the first candidate among the plurality of candidates (e.g., as sorted based on their respective costs) that has a value of magnitude symbol 1816 that matches the value of magnitude symbols 1816 in BVD 1810.

In the example of FIG. 18C, the encoder may entropy encode indication 1838 using arithmetic encoder 1842. Based on the method of determining indication 1838 as described above, indication 1838 may have a non-uniform probability distribution. Therefore, arithmetic encoder 1842 may process indication 1838 in regular arithmetic encoding mode as described above. For example, arithmetic encoder 1842 may subdivide a current coding interval into m disjoint subintervals. Each of the m disjoint subintervals may have a width proportional to the probability of the symbol being encoded having a different one of the values in an m-ary source alphabet. In the case of indication 1838, which is binary, m is equal to two and the current coding interval may be subdivided into two disjoint intervals that each have a width proportional to the probability of a different one of the two possible values {0, 1} for indication 1838 being encoded. The probabilities of the two possible values for indication 1838 may be indicated by a probability model 1844 for indication 1838. Arithmetic encoder 1842 may then encode indication 1838 by choosing the subinterval corresponding to the actual value of indication 1838 as the new coding interval for the next binary symbol to be encoded.

Arithmetic encoder 1842 may receive probability model 1844 from context modeler 1846. Context modeler 1846 may determine probability model 1844 for indication 1838 by a fixed selection or an adaptive selection from among two or more probability models. For example, context modeler 1846 may determine probability model 1844 by a fixed selection or an adaptive selection from among two or more probability models based on a position of magnitude symbol 1816 in $BVD_x$ 1812 of BVD 1810 or an index of (e.g., a value indicating) the position of magnitude symbol 1816 in $BVD_x$ 1812 of BVD 1810. The position (or index of the position) of magnitude symbol 1816 in $BVD_x$ 1812 of BVD 1810 provides an indication of the distance 1864 (illustrated in FIG. 18B) between the two candidate BVDs. The likelihood of the value of magnitude symbol 1816 of BVD predictor 1836 matching the value of magnitude symbol 1816 of BVD 1810 may be related to distance 1864. More particularly, the extent of the difference between respective templates of the candidate BVDs is likely to be larger for greater values of distance 1864 between the candidate BVDs. In turn, the larger the difference between respective templates of the BVD candidates, the more likely the costs of the BVD candidates accurately reflect the BVD candidate with a value of magnitude symbol 1816 that matches the value of magnitude symbol 1816 of BVD 1810. Thus, the position (or index of the position) of magnitude symbol 1816 in $BVD_x$ 1812 of BVD 1810 may be helpful in selecting probability model 1844 for indication 1838.

For adaptive selection from among two or more probability models, context modeler 1846 may compare the position (or index of the position) of magnitude symbol 1816 (also referred to herein as the significance of magnitude symbol 1816) in $BVD_x$ 1812 of BVD 1810 to one or more thresholds. For example, context modeler 1846 may compare the position (or index of the position) of magnitude symbol 1816 in $BVD_x$ 1812 of BVD 1810 to a first threshold. Based on the position (or index of the position) of magnitude symbol 1816 in $BVD_x$ 1812 of BVD 1810 being less than the threshold, context modeler 1846 may select a first probability model for indication 1838. Based on the position (or index of the position) of magnitude symbol 1816 in $BVD_x$ 1812 of BVD 1810 being greater than the threshold, context modeler 1846 may select a second probability model for indication 1838. In another example, based on the position (or index of the position) of magnitude symbol 1816 in $BVD_x$ 1812 of BVD 1810 being greater than the threshold, context modeler 1846 may compare the position (or index of the position) of magnitude symbol 1816 in $BVD_x$ 1812 of BVD 1810 to a second threshold. Based on the position (or index of the position) of magnitude symbol 1816 in $BVD_x$ 1812 of BVD 1810 being less than the second threshold, context modeler 1846 may select a second probability model for indication 1838. Based on the position (or index of the position) of magnitude symbol 1816 in $BVD_x$ 1812 of BVD 1810 being greater than the second threshold, context modeler 1846 may select a third probability model for indication 1838.

In another example, context modeler 1846 may determine probability model 1844 by a fixed selection or an adaptive selection from among two or more probability models based on the change in value of BVD 1810 (or $BVD_x$ 1812 of BVD 1810) for an incremental change in value of magnitude symbol 1816 of BVD 1810 (further also referred to herein as the significance of magnitude symbol 1816). The change in value of BVD 1810 (or $BVD_x$ 1812 of BVD 1810) for an incremental change in value of magnitude symbol 1816 of BVD 1810 may be determined as $2^{(n-1)}$, where n is the bit position of magnitude symbol 1816 in $BVD_x$ 1812 of BVD 1810. In the example of FIGS. 18A-D, n=4 and therefore the change in value of BVD 1810 (or $BVD_x$ 1812 of BVD 1810) for an incremental change in value of magnitude symbol 1816 of BVD 1810 may be determined as $2^{(4-1)}$ or 8. The change in value of BVD 1810 (or $BVD_x$ 1812 of BVD 1810) for an incremental change in value of magnitude symbol 1816 of BVD 1810 provides an indication of the distance 1864 (illustrated in FIG. 18B) between the two candidate BVDs. As mentioned above, the likelihood of the value of magnitude symbol 1816 of BVD predictor 1836 matching the value of magnitude symbol 1816 of BVD 1810 may be related to distance 1864. More particularly, the extent of the difference between respective templates of the candidate BVDs is likely to be larger for greater values of distance 1864 between the candidate BVDs. In turn, the larger the difference between respective templates of the BVD candidates, the more likely the costs of the BVD candidates accurately reflect the BVD candidate with a value of magnitude symbol 1816 that matches the value of magnitude symbol 1816 of BVD 1810. Thus, the change in value of BVD 1810 (or $BVD_x$ 1812 of BVD 1810) for an incremental change in value of magnitude symbol 1816 of BVD 1810 may be helpful in selecting probability model 1844 for indication 1838.

For adaptive selection from among two or more probability models, context modeler 1846 may compare the value of BVD 1810 (or $BVD_x$ 1812 of BVD 1810) for an incremental change in value of magnitude symbol 1816 of BVD 1810 to one or more thresholds. For example, context modeler 1846 may compare the value of BVD 1810 (or $BVD_x$ 1812 of BVD 1810) for an incremental change in value of magnitude symbol 1816 of BVD 1810 to a first threshold. Based on the value of BVD 1810 (or $BVD_x$ 1812 of BVD 1810) for an incremental change in value of magnitude symbol 1816 of BVD 1810 being less than the threshold, context modeler 1846 may select a first probability model for indication 1838. Based on the value of BVD 1810 (or $BVD_x$ 1812 of BVD 1810) for an incremental change in value of magnitude symbol 1816 of BVD 1810 being greater than the threshold, context modeler 1846 may select a second probability model for indication 1838. In another example, based on the value of BVD 1810 (or $BVD_x$ 1812 of BVD 1810) for an incremental change in value of magnitude symbol 1816 of BVD 1810 being greater than the threshold, context modeler 1846 may compare the value of BVD 1810 (or $BVD_x$ 1812 of BVD 1810) for an incremental change in value of magnitude symbol 1816 of BVD 1810 to a second threshold. Based on the value of BVD 1810 (or $BVD_x$ 1812 of BVD 1810) for an incremental change in value of magnitude symbol 1816 of BVD 1810 being less than the second threshold, context modeler 1846 may select a second probability model for indication 1838. Based on the value of BVD 1810 (or $BVD_x$ 1812 of BVD 1810) for an incremental change in value of magnitude symbol 1816 of BVD 1810 being greater than the second threshold, context modeler 1846 may select a third probability model for indication 1838.

As shown in FIG. 18C, probability model 1844 may comprise two parameters: the probability $P_{LPS}$ of the least probable symbol (LPS) for indication 1838 and the value $V_{MPS}$ of the most probable symbol (MPS) for indication 1838. In other examples, probability model 1844 may comprise the probability $P_{MPS}$ of the MPS for indication 1838 in addition or alternatively to the probability $P_{LPS}$ of the LPS for indication 1838. Similarly, in other examples, probability model 1844 may comprise the value $V_{LPS}$ of the LPS for indication 1838 in addition or alternatively to the value $V_{MPS}$ of the MPS for indication 1838. After arithmetic encoder 1842 encodes indication 1838, arithmetic encoder 1842 may provide one or more probability model update parameters 1850 to context modeler 1846. Context modeler 1846 may adapt probability model 1844 based on the one or more probability model update parameters 1850. For example, the one or more probability model update parameters 1850 may comprise the actual coded value of indication 1838. Context modeler 1846 may update probability model 1844 by increasing $P_{LPS}$ for indication 1838 if the actual coded value of indication 1838 is not equal to $V_{MPS}$ and by decreasing $P_{LPS}$ for indication 1838 otherwise.

After processing a number of binary symbols (e.g., corresponding to one or more syntax elements), arithmetic encoder 1842 may determine a value in the range of the final coding interval as an arithmetic code word 1852 for the binary symbols. Arithmetic encoder 1842 may then output arithmetic code word 1852. For example, arithmetic encoder 1842 may output arithmetic code word 1852 to a bitstream that may be received and processed by a video decoder.

Figure 18D:
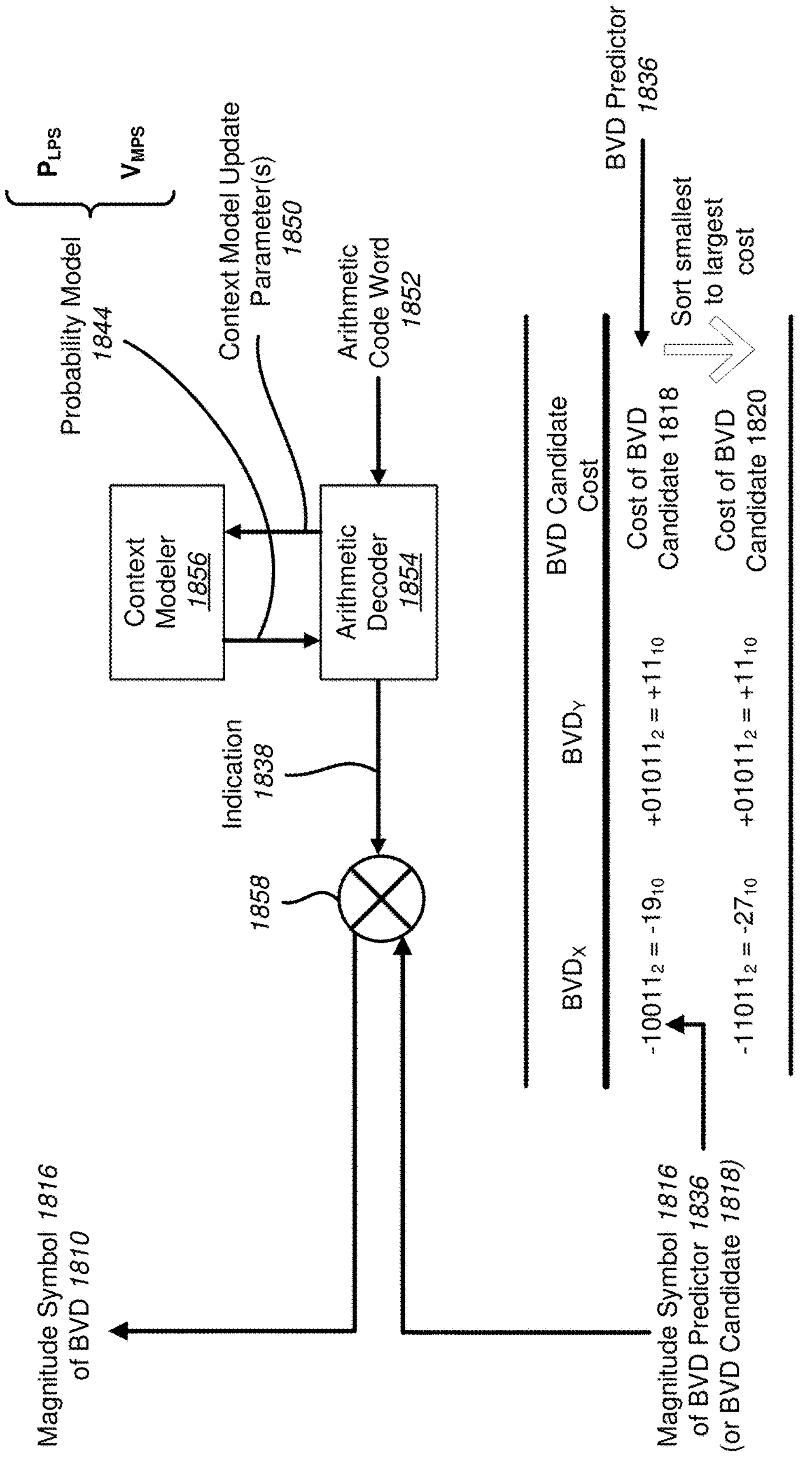
FIG. 18D illustrates an example of entropy decoding an indication of whether a value of a magnitude symbol of a BVD matches a value of the magnitude symbol of a BVD candidate used as a predictor of the BVD and using the indication to determine a magnitude symbol of the BVD in accordance with embodiments of the present disclosure.

FIG. 18D illustrates an example of entropy decoding an indication of whether a value of a magnitude symbol of a BVD matches a value of the magnitude symbol of a BVD candidate used as a predictor of the BVD and using the indication to determine a magnitude symbol of the BVD in accordance with embodiments of the present disclosure. In the example illustrated by FIG. 18D, a decoder (e.g., decoder 300 in FIG. 3) may receive arithmetic code word 1852, arithmetically decode indication 1838 from arithmetic code word 1852, and use indication 1838 to determine magnitude symbol 1816 of BVD 1810 in accordance with embodiments of the present disclosure.

The decoder may receive arithmetic code word 1852 in a bitstream. The decoder may provide arithmetic code word 1852 to an arithmetic decoder 1854. Based on the method of determining indication 1838 as described above, indication 1838 may have a non-uniform probability distribution. Therefore, arithmetic decoder 1854 may process indication 1838 in regular arithmetic decoding mode. For example, arithmetic decoder 1854 may perform recursive interval subdivision as explained above to decode symbols encoded by arithmetic code word 1852. For example, arithmetic decoder 1854 may arithmetically decode a symbol that takes a value from an m-ary source alphabet by dividing an initial coding interval into m disjoint subintervals. Each of the m disjoint subintervals may have a width proportional to the probability of the symbol having a different one of the values in the m-ary source alphabet. In the case of binary symbols like indication 1838, m is equal to two and the initial coding interval may be subdivided into two disjoint intervals that each have a width proportional to the probability of a different one of the two possible values {0, 1}. The probabilities of the symbol having the different values in the m-ary source alphabet may be referred to as a probability model for the symbol as mentioned above. The symbol is arithmetically decoded from arithmetic code word 1852 by determining the symbol value corresponding to the subinterval in which the arithmetic code word falls within. The decoder may sequentially decode each symbol $s_i$ of a sequence $s=\{s_1, s_2, \ldots, s_N\}$ encoded by arithmetic code word 1852 by recursively applying this interval-subdivision scheme N times and determining which subinterval arithmetic code word 1852 falls within during each iteration.

When decoding the symbol corresponding to indication 1838, arithmetic decoder 1854 may receive probability model 1844 for indication 1838 from context modeler 1856. Context modeler 1856 may determine probability model 1844 for indication 1838 by a fixed selection or by an adaptive selection from among two or more probability models in the same manner as described above for context modeler 1846 in FIG. 18C.

As shown in FIG. 18D, after arithmetic decoder 1854 decodes indication 1838, arithmetic decoder 1854 may provide one or more probability model update parameters 1850 to context modeler 1856. Context modeler 1856 may adapt probability model 1844 based on the one or more probability model update parameters 1850. For example, the one or more probability model update parameters 1850 may comprise the actual decoded value of indication 1838. Context modeler 1856 may update probability model 1844 by increasing $P_{LPS}$ for indication 1838 if the actual decoded value of indication 1838 is not equal to $V_{MPS}$ and by decreasing $P_{LPS}$ for indication 1838 otherwise.

After entropy decoding indication 1838, the decoder may determine the value of magnitude symbol 1816 of BVD 1810 based on the value of magnitude symbol 1816 of BVD predictor 1836 and the value of indication 1838. For example, the decoder may determine the value of magnitude symbol 1816 of BVD 1810 as being equal to the magnitude symbol of BVD predictor 1836 based on indication 1838 indicating that the value of magnitude symbol 1816 of BVD 1810 matches the value of magnitude symbol 1816 of BVD predictor 1836. Conversely, the decoder may determine the value of magnitude symbol 1816 of BVD 1810 as being not equal to (or equal to the opposite value of) magnitude symbol 1816 of BVD predictor 1836 based on indication 1838 indicating that the value of magnitude symbol 1816 of BVD 1810 does not match the value of magnitude symbol 1816 of BVD predictor 1836. Magnitude symbol 1816 of BVD predictor 1836 has a value of "0", which matches the value of magnitude symbol 1816 of BVD 1810. In this example, indication 1838 would indicate that the value of magnitude symbol 1816 of BVD 1810 matches the value of magnitude symbol 1816 of BVD predictor 1836. In one example, indication 1838 may be a single bit that has the value: "0" when the value of magnitude symbol 1816 of BVD 1810 matches the value of magnitude symbol 1816 of BVD predictor 1836; and "1" when the value of magnitude symbol 1816 of BVD 1810 does not match the value of magnitude symbol 1816 of BVD predictor 1836. Logic 1858 may be used to determine magnitude symbol 1816 of BVD 1810. In one example, logic 1858 may implement a logical XOR function. It should be noted that in other examples where magnitude symbol 1816 is non-binary, indication 1838 may indicate the first candidate among the plurality of candidates (e.g., as sorted based on their respective costs) that has a value of magnitude symbol 1816 that matches the value of magnitude symbols 1816 in BVD 1810.

The decoder may determine the value of magnitude symbol 1816 of BVD predictor 1836 in the same manner as the encoder described above. More specifically, the decoder may select BVD predictor 1836 from among a plurality of BVD candidates based on costs of the plurality of the BVD candidates. The BVD candidates may include a BVD candidate for each possible value of the magnitude symbol of BVD 1810. For example, a magnitude symbol of BVD 1810 represented in binary form has only two possible values. Therefore, the BVD candidates may include at least two BVD candidates for this representation (one for each possible value of the magnitude symbol in BVD 1810 being encoded): a first BVD candidate equal to BVD 1810 itself and a second BVD candidate equal to BVD 1810 but with the opposite (or other) value of the magnitude symbol of BVD 1810. The cost for each BVD candidate in the plurality of BVD candidates may be calculated as described above with respect to the encoder based on a difference between a template of current block 1804 and a template of a candidate reference block. The candidate reference block may be displaced relative to the current block by a sum of the BVD candidate and BVP 1808. The decoder may select the BVD candidate with the lowest cost as BVD predictor 1836.

It should be further noted that the approach discussed above with respect to FIGS. 18A-D to entropy code an indication of whether a value of a magnitude symbol of a BVD matches a value of the magnitude symbol of a BVD candidate used as a predictor of the BVD may be applied to one or more magnitude symbols of $BVD_y$ 1814 in addition or alternatively to one or more magnitude symbols of $BVD_x$ 1812.

It should be further noted that the approach discussed above with respect to FIGS. 18A-D may be further applied to one or more magnitude symbols of an MVD used in inter prediction in addition or alternatively to one or more magnitude symbols of a BVD used in IBC. For inter prediction, the terms BV, BVP, BVD, and BVD candidate used in FIGS. 18A-D may be replaced by the terms MV, MVP, MVD, and MVD candidate as would be appreciated by a person of ordinary skill in the art based on the present disclosure.

It should be further noted that the approach discussed above with respect to FIGS. 18A-D is applied to IBC and inter prediction based on a translational motion model for the prediction block. In other examples, the approach discussed above with respect to FIGS. 18A-D may be applied to IBC and inter prediction based on an affine motion model for the prediction block.

It should be further noted that the approach discussed above with respect to FIGS. 18A-D to entropy code an indication of whether a value of a magnitude symbol of a BVD matches a value of the magnitude symbol of a BVD candidate used as a predictor of the BVD may be applied to multiple magnitude symbols of the BVD. For example, the above approach may be further applied to one or more magnitude symbols of $BVD_x$ 1812 other than magnitude symbol 1816 and/or to one or more magnitude symbols of $BVD_y$ 1814. For each additional magnitude symbol of $BVD_x$ 1812 and/or $BVD_y$ 1814 that the approach discussed above with respect to FIGS. 18A-D is applied, additional candidate BVDs may be determined. For example, applying the approach discussed above with respect to FIGS. 18A-D to N magnitude symbols of $BVD_x$ 1812 and/or $BVD_y$ 1814 (where Nis an integer value), $2^N$ different BVD candidates may be determined—one for each possible combination of values for the N magnitude symbols of $BVD_x$ 1812 and/or $BVD_y$ 1814. Cost values may be further determined for each of the BVD candidates to determine a BVD predictor for encoding each of the N magnitude symbols of $BVD_x$ 1812 and/or $BVD_y$ 1814.

Further, it should be further noted that, although components $BVD_y$ 1814 and $BVD_x$ 1816 of BVD 1810 and components of BVD candidates were described above as being represented using fixed-length binary, other binarizations of components $BVD_y$ 1814 and $BVD_x$ 1816 of BVD 1810 and components of BVD candidates may be possible. For example, components $BVD_y$ 1814 and $BVD_x$ 1816 of BVD 1810 may be represented by one of a wide range of codes that include two parts: a prefix and a suffix.

There are a wide class of codes that include a first part that indicates a range of values and a second part that indicates a precise value within the range of values, such as Rice codes, Golomb codes (e.g., Golomb-Rice codes or Exponential Golomb codes), and fixed length codes. For example, referring back to FIGS. 18A-D, the magnitude of horizontal component $BVD_x$ 1812 of BVD 1810 may be binarized using a Golomb-Rice code. Golomb-Rice codes have the structure discussed above, including the first part referred to as the "prefix" part and the second part referred to as the "suffix" part. The prefix indicates a range of values and the suffix indicates a precise value within the range of values. A Golomb-Rice code Cgr k(v) of order k includes a unary coded prefix and k suffix bits (i.e., suffix with a bit-length of k). The k suffix bits are a binary representation of an integer $0 \le i < 2^k$. Golomb codes further use a tunable parameter M to divide an input value v into the prefix part and the suffix part—specifically, a prefix value q, which is the result of a division by M, and a suffix value $v_s$, which is the remainder. Golomb-Rice codes are a class of Golomb codes where the parameter M is an exponent of 2 such as $2^k$. For the input value v where v is a non-negative integer, the prefix part (q) and the suffix part (Vs) may be determined by:

$$q = \left\lfloor \frac{v}{2^k} \right\rfloor. \quad (19)$$

$$v_s = v - q(2^k). \quad (20)$$

An example of a Golomb-Rice code for k=4 is given in Table 1 below. In the table and the following explanation, $x_0$, $x_1$, . . . , $x_n$ denote bits of the code word with $x_n \in \{0, 1\}$.

TABLE 1

| v | $C_{gr\ 4}(v)$ |
|---|---|
| 0, . . . , 15 | 1 $x_3$, $x_2$, $x_1$, $x_0$ |
| 16, . . . , 31 | 0 1 $x_3$, $x_2$, $x_1$, $x_0$ |
| 32, . . . , 47 | 0 0 1 $x_3$, $x_2$, $x_1$, $x_0$ |
| . | . |
| . | . |
| . | . |

The number of prefix bits is denoted by $n_p$, the number of suffix bits is denoted by $n_s$. For the Golomb-Rice code, the number of suffix bits is $n_s$=k. When encoding a value v, the number of prefix bits is determined by:

$$n_p = 1 + \left\lfloor \frac{v}{2^k} \right\rfloor. \quad (21)$$

where $\lfloor x \rfloor$ is the integer part of x. The suffix is the $n_s$-bit representation of:

$$v_s = v - 2^k(n_p - 1). \quad (22)$$

The Golomb-Rice codes discussed above use a suffix of fixed length. The length of the suffix may also be determined by the length of the prefix. Exponential Golomb codes (Exp-Golomb) use this approach and can further be used to binarize the magnitude of horizontal component $BVD_x$ 1812 of BVD 1810. A kth-order Exp-Golomb code $C_{eg\ k}(v)$ includes a unary prefix code and a suffix of variable length. The number of bits in the suffix $n_s$ is determined by the value $n_p$ as follows:

$$n_s = k + n_p - 1. \quad (23)$$

The number of prefix bits $n_p$ of $C_{eg\ k}(v)$ is determined from the value v by:

$$2^k(2^{n_p - 1} - 1) \le v \le 2^k(2^{n_p} - 1). \quad (24)$$

The suffix is then the $n_s$-bit representation of:

$$v_s = v - 2^k(2^{n_p} - 1). \quad (25)$$

An example of Exp-Golomb codes for k=1 is given in Table 2 below.

TABLE 2

| v | $C_{gr\ 4}(v)$ |
|---|---|
| 0, 1 | 1 $x_0$ |
| 2, . . . , 5 | 0 1 $x_1$, $x_0$ |
| 6, . . . , 13 | 0 0 1 $x_2$, $x_1$, $x_0$ |
| 14, . . . , 29 | 0 0 0 1 $x_3$, $x_2$, $x_1$, $x_0$ |
| . | . |
| . | . |
| . | . |

In the example of FIG. 18A, the magnitude of horizontal component $BVD_x$ 1812 of BVD 1810 has a value of 19 in base 10, which may be represented by a Golomb-Rice code or an Exp-Golomb code. For example, the magnitude of $BVD_x$ 1812 may be represented by the Exp-Golomb code of order k=4 with a prefix of "0001" and a suffix of "0101". The prefix "0001" indicates that the magnitude of $BVD_x$ 1812 falls within the range of values 14-29, and the suffix "0101" indicates that the magnitude of $BVD_x$ 1812 has the precise value of 19 within the range of values of 14-29. In the example of FIG. 18A, the magnitude of vertical component $BVD_y$ 1814 of BVD 1810 has a value of 11 in base 10, which may be represented by a Golomb-Rice code or an Exp-Golomb code. For example, the magnitude of $BVD_y$ 1814 may be represented by the Exp-Golomb code of order k=4 with a prefix of "001" and a suffix of "101". The prefix "001" indicates that the magnitude of $BVD_y$ 1814 falls within the range of values 6-13, and the suffix "101" indicates that the magnitude of $BVD_y$ 1814 has the precise value of 11 within the range of values of 6-13.

It should be further noted that the approach discussed above with respect to FIGS. 18A-D may be further applied to one or more magnitude symbols of an MVD used in inter prediction in addition or alternatively to one or more magnitude symbols of a BVD used in IBC. For inter prediction, the terms BV, BVP, BVD, and BVD candidate used in FIGS. 18A-D may be replaced by the terms MV, MVP, MVD, and MVD candidate as would be appreciated by a person of ordinary skill in the art based on the present disclosure. It should be further noted that the approach discussed above with respect to FIGS. 18A-D may be applied to IBC and inter prediction based on a translational motion model for the prediction block. In other examples, the approach discussed above with respect to FIGS. 18A-D may be applied to IBC and inter prediction based on an affine motion model for the prediction block. Herein, the term "bins" may refer to the bits, or binary symbols, used to encode and decode symbols of BVDs or MVDs.

Figure 19:
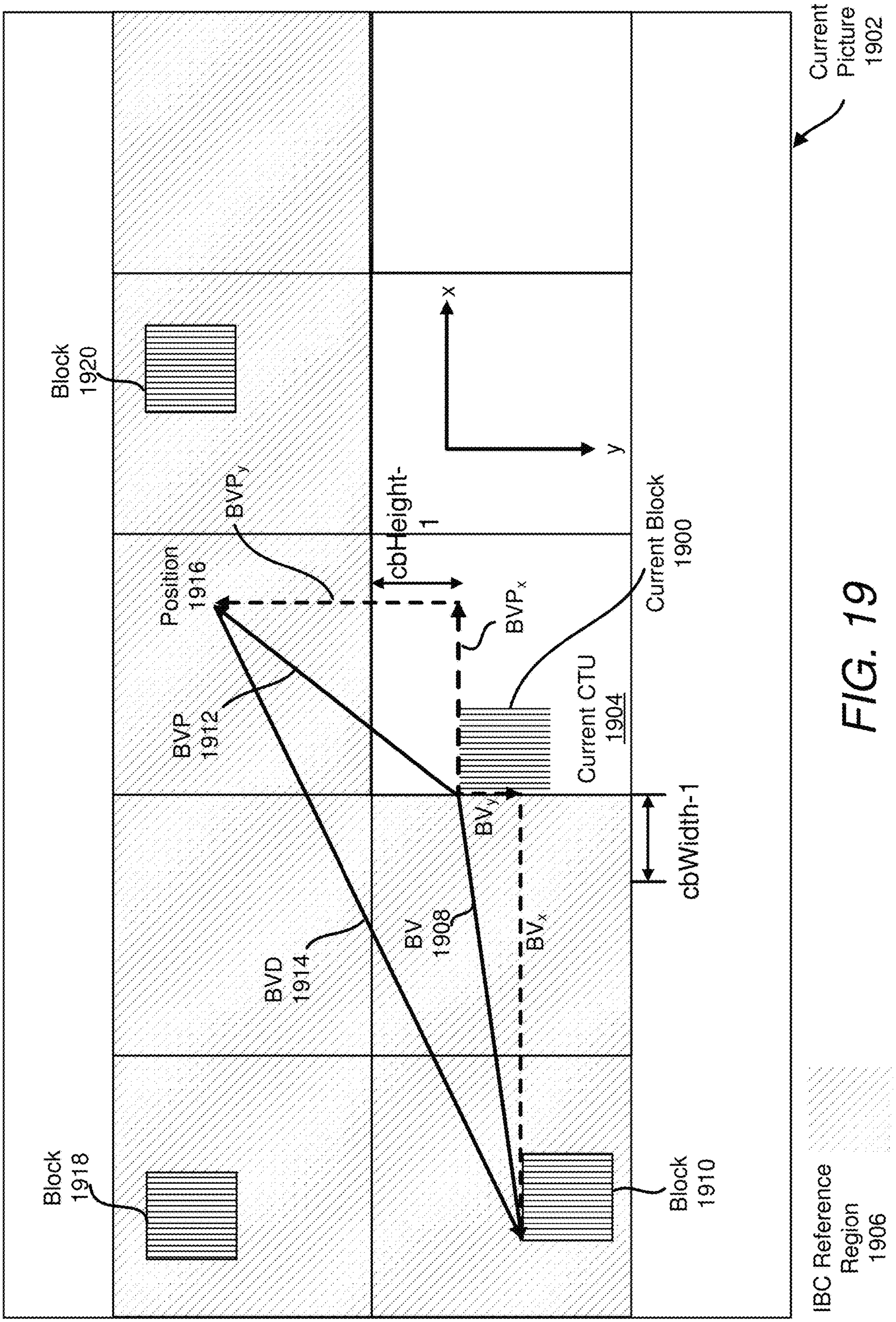
FIG. 19 illustrates an example IBC coding in accordance with embodiments of the present disclosure.

FIG. 19 illustrates an example IBC coding in accordance with embodiments of the present disclosure. In FIG. 19, an encoder, such as encoder 200 in FIG. 2, uses an IBC mode to code a current block 1900 in a current picture (or portion of a current picture) 1902. Current block 1900 may be a coding block within a coding tree unit (CTU) 1904. Unlike inter prediction that searches for a reference block in a prior decoded picture that is different than the picture of the current block being encoded, IBC searches for a reference block in the same, current picture as the current block. As a result, only part of the current picture may be available for searching for a reference block in IBC. For example, only the part of the current picture that has been decoded prior to the encoding of the current block. This may ensure the encoding and decoding systems can produce identical results but also limits the IBC reference region.

In HEVC, VVC, and other video compression standards, blocks may be scanned from left-to-right, top-to-bottom using a z-scan to form the sequence order for encoding/decoding. Based on the z-scan, CTUs (represented by the large, square tiles in FIG. 19) to the left and above current CTU 1904 may be encoded/decoded prior to current CTU 1904 and current block 1900. Therefore, the samples of these CTUs (shown with hatching in FIG. 19) may form an exemplary IBC reference region 1906 for determining a reference block to predict current block 1900. In other video encoders and decoders, a different sequence order for encoding/decoding may be used, which may influence IBC reference region 1906 accordingly.

In addition to the encoding/decoding sequence order, one or more additional reference region constraints may be placed on IBC reference region 1906. For example, IBC reference region 1906 may be constrained based on a limited memory for storing reference samples or to CTUs based on a parallel processing approach, like tiles or wavefront parallel processing (WPP). Tiles may be used as part of a picture partitioning process for flexibly subdividing a picture into rectangular regions of CTUs such that coding dependencies between CTUs of different tiles are not allowed. WPP may be similarly used as part of a picture partitioning process for partitioning a picture into CTU rows such that dependencies between CTUs of different partitions are not allowed. Each of these tools may enable parallel processing of the picture partitions.

It should be noted that reference to a position of a block throughout this disclosure refers to the position of the block's top-left sample. However, in other examples, the position of a block may be determined by the position of another sample in the block. The position of a sample in a picture is indicated by a sample number in the horizontal direction (given by the variable x) and a sample number in the vertical direction (given by the variable y) relative to the origin ((x, y)=(0,0) of the picture coordinate system in the top left corner of the picture or relative to the top left sample of a block (e.g., a CTU) in which the sample is located within. In the horizontal x direction, the positive direction is to the right. Thus, as x increases, the sample location moves farther right in the positive, horizontal direction. In the vertical y direction, the positive direction is down. Thus, as y increases, the sample location moves farther down in the positive, vertical direction.

The encoder may apply a block matching technique to determine a block vector (BV) 1908 that indicates the relative displacement from current block 1900 to a reference block shown as block 1910 (or intra block compensated prediction) within IBC reference region 1906 that "best matches" current block 1900. For example, block 1910 may have been determined as the reference block from IBC reference region 1906 as being a better match than other blocks such as block 1918 and block 1920 within IBC reference region 1906. In an example, IBC reference region 1906 is a constraint placed on BV 1908. BV 1908 is constrained by IBC reference region 1906 to indicate a displacement from current block 1900 to a reference block (shown as block 1910) that is within IBC reference region 1906. The encoder may determine the best matching reference block as block 1910 from blocks tested such as blocks 1918 and 1920, within IBC reference region 1906, during a searching process. The encoder may determine that a reference block is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), sum of absolute transformed differences (SATD), or difference determined based on a hash function) between the prediction samples of the reference block and the original samples of the current block. Reference block 1910 may comprise decoded (or reconstructed) samples of current picture 1902 prior to being processed by in-loop filtering operations, like deblocking or SAO filtering.

Once reference block 1910 is determined and/or generated for current block 1900 using IBC, the encoder may determine or use a difference (e.g., a corresponding sample-by-sample difference) between current block 1900 and reference block 1910. The difference may be referred to as a prediction error or residual. The encoder may then store and/or signal in a bitstream the prediction error and the related prediction information for decoding.

The prediction information may include BV 1908. In other instances, the prediction information may include an indication of BV 1908. For example, in HEVC, VVC, and other video compression schemes, BV 1908 may be predictively coded before being stored or signaled in a bit stream as explained previously above. BV 1908 for current block 1900 may be predictively coded using a similar technique as AMVP for inter prediction. This technique may be referred to as BV prediction and difference coding. For the BV prediction and difference coding technique, the encoder may code BV 1908 as a difference between BV 1908 and a BV predictor (BVP) 1912. The encoder may select BVP 1912 from a list of candidate BVPs. In an example, BVP 1912 points to a position 1916 within IBV reference region 1906. The candidate BVPs may come from previously decoded BVs of neighboring blocks of current block 1900 or from other sources. In one example, where a BV from a neighboring block of current block 1900 is not available, a null BVP candidate (e.g., with an x-component and y-component with zero magnitude) may be added to the list of candidate BVPs. Both the encoder and decoder may generate or determine the list of candidate BVPs.

After the encoder selects BVP 1912 from the list of candidate BVPs, the encoder may determine a BV difference (BVD) 1914. BVD 1914 may be calculated based on the difference between BV 1908 and BVP 1912. For example, BVD 1914 may be represented by two directional components calculated according to equations (17) and (18) above for $BVD_x$ and $BVD_y$, which are reproduced below:

$$BVD_x = BVx - BVP_x \tag{17}$$

$$BVD_y = BVy - BVP_y \tag{18}$$

where $BVD_x$ and $BVD_y$ respectively represent the horizontal and vertical components of BVD 1914, $BV_x$ and $BV_y$ respectively represent the horizontal and vertical components of BV 1908, and $BVP_x$ and $BVP_y$ respectively represent the horizontal and vertical components of BVP 1912. The horizontal x-axis and vertical y-axis are indicated in the lower right hand corner of current picture 1902 for reference purposes. In the example of FIG. 19, the x-axis increases from left to right, and the y-axis increases from top to bottom.

The encoder may signal, in a bitstream, the prediction error, an indication of the selected BVP 1912 (e.g., via an index pointing into the list of candidate BVPs), and the separate components of BVD 1914 given by equations (17) and (18). A decoder, such as decoder 300 in FIG. 3, may decode BV 1908 by adding corresponding components of BVD 1914 to corresponding components of BVP 1912. The decoder may then decode current block 1900 by determining and/or generating reference block 1910, which forms the prediction of current block 1900, using the decoded BV and combining the prediction with the prediction error received in the bitstream.

When encoding a suffix value, e.g., for a component of a block vector difference (BVD), the context (as well as the number) of suffix bins may be determined based on the significance of a bin. Herein, the term "bin" or "bins" may refer to the bits, or binary symbols, used to encode and decode symbols of BVDs or MVDs. The significance of a bin may be determined based on its impact on the length (or magnitude) of a BVD component. However, the impact on the length of a BVD component may further be defined in accordance with a block vector (BV) resolution indicated in a bitstream. For example, an integer motion vector (IMV) flag may affect how BVD components are obtained from BVD symbols (bins). For example, when an IMV flag is equal to 0, a 1-pel resolution may be selected for the BVD, such that an increment of a BVD symbol by 1 corresponds to the increase of a BVD component length by 1 sample. Further, for example, when the IMV flag is equal to 1, a 4-pel resolution may be selected for the BVD, such that increment of a BVD symbol by 1 corresponds to the increase of a BVD component length by 4 samples. An IMV flag is further referred to herein as "imv_flag( )". In an example, a resolution may indicate integer resolution of fraction resolution for the BVD. In further examples, a resolution of a BVD may also correspond to a precision of the BVD.

Figure 20:
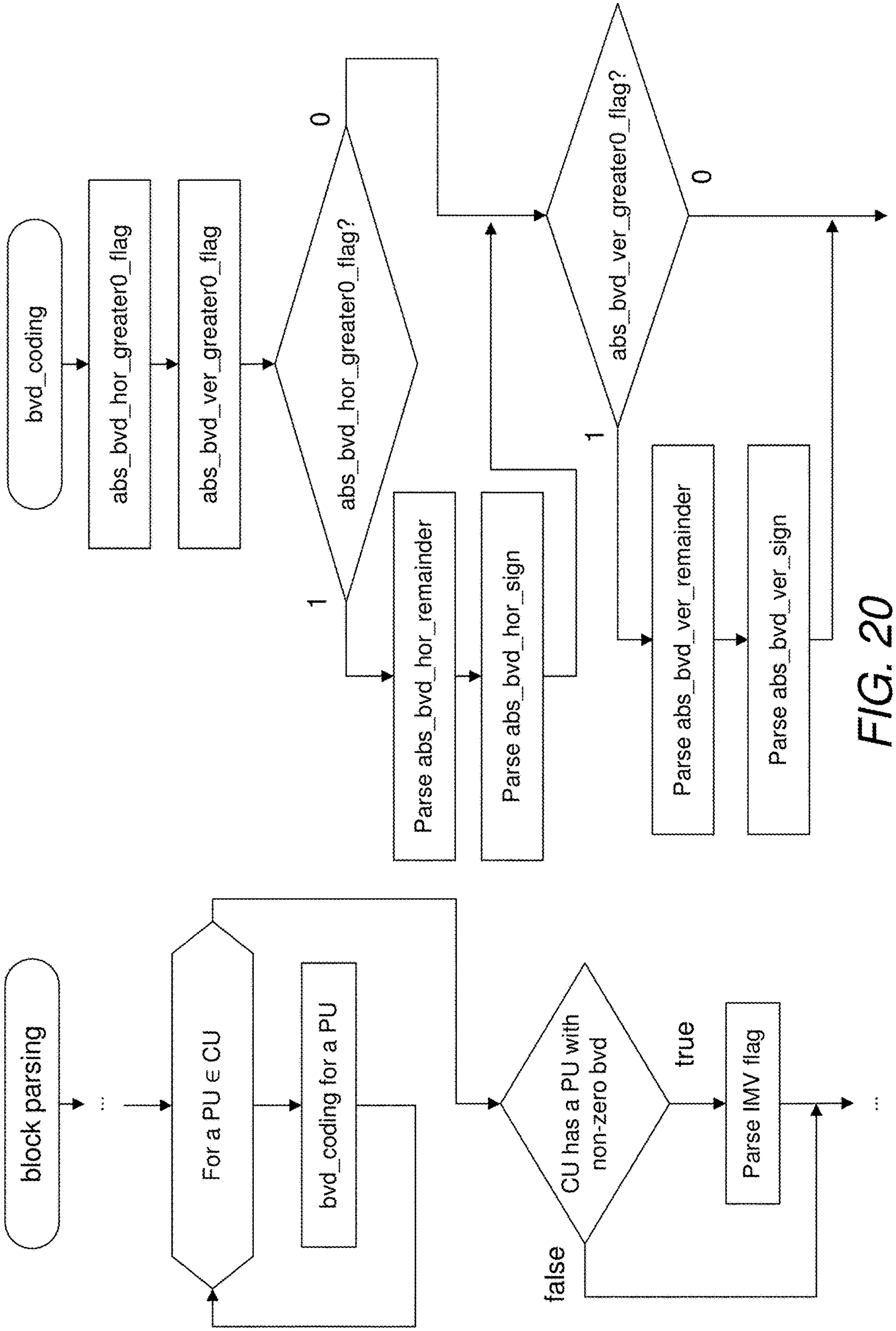
FIG. 20 illustrates examples of signaling BVD components in accordance with embodiments of the present disclosure.

FIG. 20 illustrates examples of signaling BVD components in accordance with embodiments of the present disclosure. Signaling of BVD components may include several stages. A first stage may include indicating whether a horizontal and/or vertical component of the BVD are non-zero (see "abs_bvd_hor_greater0_flag" and "abs_bvd_ver_greater0_flag" in FIG. 20). A second stage may include indicating the remainder for the absolute values of the BVD's horizontal and vertical components. Remainder values may be defined as an absolute value that is decreased by a value $V_{init}$ which is indicated at the first stage. For BVD signaling, a maximum of one flag may be indicated per component and $V_{init}=1$. For motion vector difference (MVD) or transform coefficients signaling, the value of $V_{init}$ may be equal to 2, and more flags per MVD component may be specified at the first stage.

In H.266 (Versatile Video Coding, VVC), the same syntax may be used for both MVDs and BVDs. Table 3 below shows the order of syntax elements for both MVD and BVD coding in H.266.

TABLE 3

| | Descriptor |
|---|---|
| mvd_coding(x0, y0, refList ,cpIdx) { | |
| abs_mvd_greater0_flag[ 0 ] | ae(v) |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| mvd_sign_flag[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| mvd_sign_flag[ 1 ] | ae(v) |
| } | |
| } | |

The syntax elements shown in Table 3 have the following semantics. An abs_mvd_greater0_flag[compIdx] specifies whether the absolute value of a motion vector component difference is greater than 0. An abs_mvd_greater1_flag [compIdx] specifies whether the absolute value of a motion vector component difference is greater than 1. When abs_mvd_greater1_flag[compIdx] is not present, it is inferred to be equal to 0. The syntax element abs_mvd_minus2[compIdx] specifies the absolute value of a motion vector component difference. When abs_mvd_minus2[compIdx] is not present, it is inferred to be equal to −1.

Further, a mvd_sign_flag[compIdx] specifies the sign of a motion vector component difference as follows. If the mvd_sign_flag[compIdx] is equal to 0, the corresponding motion vector component difference has a positive value. Otherwise, if the mvd_sign_flag[compIdx] is equal to 1, the corresponding motion vector component difference has a negative value. When the mvd_sign_flag[compIdx] is not present, it is inferred to be equal to 0. The motion vector difference lMvd[compIdx] for compIdx=0 . . . 1 may be derived as follows: lMvd[compIdx]=abs_mvd_greater0_flag[compIdx]*(abs_mvd_minus2[compIdx]+2)*(1−2*mvd_sign_flag[compIdx]). The value of lMvd[compIdx] is in the range of −217 to 217−1, inclusive.

Further, depending on the value of MotionModelIdc[x0][y0], motion vector differences (MVDs) may be derived as follows. If MotionModelIdc[x0][y0] is equal to 0, the variables MvdLX[x0][y0][compIdx], with X being 0 or 1, specify the difference between a list X vector component to be used and its prediction. Further, the array indices x0, y0 specify the location (x0, y0) of the top-left luma sample of the considered coding block relative to the top-left luma sample of the picture.

Further, the array index compIdx specifies horizontal or vertical component motion vector difference which may be derived as follows. If refList is equal to 0, MvdL0[x0][y0][compIdx] is set equal to lMvd[compIdx] for compIdx=0 . . . 1. Further when refList is equal to 1, MvdL1[x0][y0][compIdx] is set equal to lMvd[compIdx] for compIdx=0.1. Otherwise (MotionModelIdc[x0][y0] is not equal to 0), the variables MvdCpLX[x0][y0][cpIdx][compIdx], with X being 0 or 1, specify the difference between a list X vector component to be used and its prediction. Further, the array indices x0, y0 specify the location (x0, y0) of the top-left luma sample of the considered coding block relative to the top-left luma sample of the picture.

Further, the array index cpIdx specifies the control point index. Further, the array index compIdx specifies horizontal or vertical component motion vector difference, which may be derived as follows. If refList is equal to 0, MvdCpL0[x0][y0][cpIdx][compIdx] is set equal to lMvd[compIdx] for compIdx=0.1. Otherwise, when refList is equal to 1, MvdCpL1[x0][y0][cpIdx][compIdx] is set equal to lMvd[compIdx] for compIdx=0 . . . 1. Further, when sym_mvd_flag[x0][y0] is equal to 1, the value of MvdL1[x0][y0][compIdx] is in the range of −217 to 217−1, inclusive.

Another example of motion vector difference (MVD) coding is shown in Table 4 below.

TABLE 4

| | Descriptor |
|---|---|
| mvd_coding(x0, y0, refList ,cpIdx) { | |
| abs_mvd_greater0_flag[ 0 ] | ae(v) |
| abs_mvd_greater0_flag[ 1 ] | ae(v) |
| if( abs_mvd_greater0_flag[ 0 ] ) { | |
| abs_mvd_minus1[ 0 ] | ae(v) |
| mvd_sign_flag[ 0 ] | ae(v) |
| } | |
| if( abs_mvd_greater0_flag[ 1 ] ) { | |
| abs_mvd_minus1[ 1 ] | ae(v) |
| mvd_sign_flag[ 1 ] | ae(v) |
| } | |
| } | |

In the example of Table 4 above, abs_mvd_minus1[compIdx] specifies the absolute value of a motion vector component difference. Further, for example, when abs_mvd_minus1[compIdx] is not present, it is inferred to be equal to −1.

Another example of motion vector difference (MVD) coding is shown in Table 5 below. Table 5 illustrates an example of signaling an mvd_coding( ) syntax element that may be performed when a PU is indicated to be predicted using IBC mode.

TABLE 5

| | Descriptor |
|---|---|
| coding_unit( x0, y0, cbWidth, cbHeight, cqtDepth, treeType, modeType ) { | |
| ... | |
| if( CuPredMode[ chType ][ x0 ][ y0 ] = = MODE_IBC ) { | |
| mvd_coding( x0, y0, 0, 0 ) | |
| ... | |
| } | |
| imv_flag( ) | ae(v) |
| ... | |

In the example of Table 5 above, the syntax element “imv_flag( )” may be present when at least one of the components of the coded MVD is non-zero.

Figure 21:
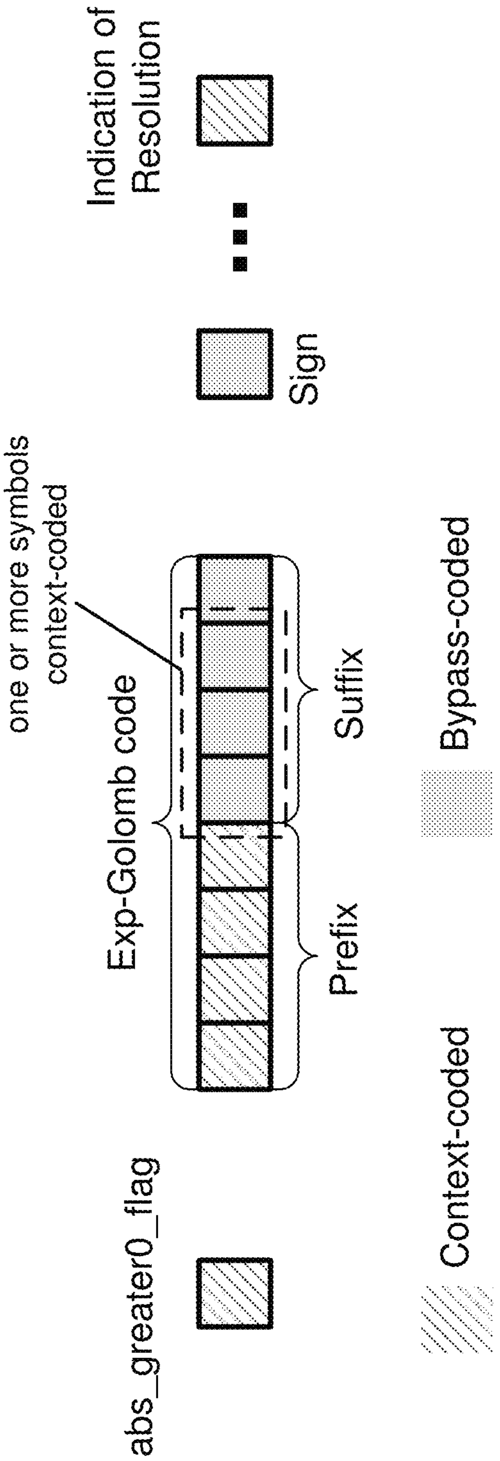
FIG. 21 illustrates an example coding order for signaling bins, and corresponding syntax elements, of a BVD or MVD in accordance with embodiments of the present disclosure.

FIG. 21 illustrates an example coding order for signaling bins, and corresponding syntax elements, of a BVD or MVD, in accordance with embodiments of the present disclosure. As illustrated, FIG. 21 shows an example for syntax elements to code a component (e.g., a horizontal component or a vertical component) of a BVD or an MVD. For ease of illustration, as used in the present disclosure, reference to a value of the MVD may refer to a value of a component of the MVD. For example, in FIG. 21, mvd_coding syntax element(s) may be signaled before a resolution indication such as an imv_flag syntax element. For example, a BVD or an MVD coding syntax element may include an indication of whether the value is greater than 0 shown as “abs_greater0_flag.” This indication may be syntax element “abs_bvd_greater0_flag” for BVD or syntax element “abs_mvd_greater0_flag” for MVD. For ease of illustration, the following description may be provided in reference to MVD, but it is to be understood that they may similarly apply to BVD unless specific differences are specified. As illustrated by FIG. 21, the syntax element “abs_mvd_minus1” may be indicated as an exponential Golomb code and is denoted as “Exp-Golomb code” because if the syntax element abs_mvd_greater0_flag indicates the MVD is greater than 0, then the MVD is at least 1 and the value represented as Exp-Golomb code is equal the true MVD value minus 1. In some examples, for coding MVDs, an additional indication of whether the MVD value is greater than 1 (e.g., abs_mvd_greater1_flag) may be indicated if the abs_mvd_greater0_flag is set to 1. In these examples, the Exp-Golomb code may correspond to a value of the MVD minus 2 because if both the abs_mvd_greater0_flag and abs_mvd_greater1_flag are true, then the MVD value is at least 2. In other words, the value of the MVD value may be determined as a value represented by the Exp-Golomb code plus 2.

As described above, magnitude symbols of the Exp-Golomb code (or other Golomb codes) includes a prefix and a suffix. In some examples, magnitude symbol(s) in the prefix may be context coded (or coded in a regular mode of an entropy coder like CABAC), as described above in FIG. 17. Generally, magnitude symbols of the suffix may be bypass-coded. In some examples, as shown in dotted lines in FIG. 21, instead of coding the magnitude symbols themselves, one or more of the magnitude symbols of the suffix (e.g., a number of the most significant magnitude symbols of the suffix) may be context-coded as indications of whether predicted values are equal to corresponding values of the magnitude symbols of the BVD or MVD, according to the embodiments described above in FIG. 18A-D. After the code (e.g., Exp-Golomb code or abs_mvd_minus1" syntax element) corresponding to a magnitude value of the MVD is encoded (or parsed and decoded at the decoder), a sign bin (or binary symbol) may be encoded in an equiprobable (EP) bypass mode (e.g., in CABAC). In some examples, the sign symbol may be similarly context-coded as an indication of whether a value of the sign symbol of the BVD or MVD is equal to (or matches) a value of the corresponding sign symbol of the BVP (in the case of BVD) or MVP (in the case of MVD). In some examples, an indication of resolution (such as an IMV flag syntax element for BVD) may be signaled after all the BVD or MVD syntax element(s) are signaled.

In some embodiments, one or more indication of the resolution of the BVD or MVD may be signaled by the encoder (and parsed and decoded by the decoder). For example, the one or more indications may include an amvr_flag syntax element and may further include an amr_precision_index. As shown in Table 6 below, combinations of these indications may specify a resolution for the intra-block copy (IBC) mode (which is applicable to coding BVDs) and the affine and translation models/modes (which are applicable to coding MVDs):

TABLE 6

| amvr_flag | amvr_precision_index | Affine Model | IBC | Translational Model |
|---|---|---|---|---|
| 0 | — | 2 (1/4 sample) | — | 2 (1/4 sample) |
| 1 | 0 | 0 (1/16 sample) | 4 (1 sample) | 3 (1/2 sample) |
| 1 | 1 | 4 (1 sample) | 6 (4 samples) | 4 (1 sample) |
| 1 | 2 | — | — | 6 (4 samles) |

The table above shows the shift value applied to the vector difference (e.g., BVD in IBC or MVD in affine and translational models) to achieve the resolution indicated in the parenthesis. It should be noted that with respect to Table 6, a default resolution of vector differences may be 1/16. For example, since the default resolution for a value of the MVD is 1/16, to achieve a 4 sample resolution indicated in the translation model (e.g., amvr_flag set to 1 and amvr_precision index set to 2), the value of the MVD may be left shifted by 6 (i.e., 1/16 resolution<<6) to obtain a resolution of 4 samples. In some implementations, since there are two possible resolutions (1 sample or 4 sample) for BVDs coded in IBC mode, one indication (e.g., the IMV flag) is used instead of the amvr_flag and amvr_precision_index flag. The indication may correspond to the amvr_precision_index flag for coding resolutions of MVDs. For example, in IBC mode, the amvr_flag is not signaled and may be set (or inferred) to be 1 by the encoder and decoder.

In some examples, if the amvr_flag is 0, then no further indications (i.e., amvr_precision_index) are signaled to code the resolution of the MVD. As shown above, the resolution (sometimes referred to as precision) of the MVD may indicate 1/16 sample, 1/4 sample, 1/2 sample, 1 sample, or 4 samples depending on the combination of indications and the specific mode. The specific mode may also be indicated in separate syntax element(s).

In existing technologies for video coding, an indication of a resolution (e.g., a resolution of a MVD or BVD indicated by an IMV flag) may be decoded/parsed after syntax elements indicating the components of the BVD or MVD are signaled. For example, the indication of a resolution for the BVD may be an IMV flag. For example, and indication of resolution for MVD may be one or more flags (e.g., an AMVR flag and depending on a value of the AMVR flag, an AMVR precision index flag) that together corresponds to the resolution for the MVD value. As a result of signaling at the encode and parsing at the decoder the indication of the resolution after syntax elements of the BVD or MVD, the indication of the resolution may not be available when parsing BVD or MVD components. In existing approaches, this ordering may be used because when none of the BVD components for a block are zero, there is no need to signal resolution data. Further, this resolution indication may be performed for some set of blocks. For example, in existing approaches a set of blocks may be referred to as a Coding Unit (CU), which may include several Prediction Units (PUs), each of which are referenced as "blocks" or "PUs" in the context of this disclosure. A problem with this approach is that resolution information that could be utilized in conjunction with predicting bins of a BVD or MVD may be unavailable due to the order of parsing.

Embodiments of the present disclosure are directed to apparatuses and methods for selecting a context/probability model based on a first indication of a resolution of a block vector difference (BVD) or motion vector difference (MVD) and a position of a magnitude symbol of the BVD or MVD to be decoded/encoded. For example, the first indication of resolution may be an IMV flag for coding one or more symbols of BVD or may be one or more indications such as AMVR_flag or AMVR_precision_index syntax elements for coding one or more symbols of MVD. In an example embodiment, a method for selecting a probability model based on a first indication of a resolution of a BVD or MVD and a position of a magnitude symbol of the BVD or MVD to be decoded may be implemented by a decoder. For example, the decoder receives, in a bitstream, a first indication of a resolution of a BVD or MVD. The decoder further selects, based on the first indication and a position of a magnitude symbol of the BVD or MVD to be decoded, a probability model from a plurality of probability models. The decoder further arithmetically decodes, based on the probability model, a second indication of whether the magnitude symbol of the BVD or MVD is equal to a corresponding magnitude symbol of a BVD or MVD predictor. And, the decoder further determines a value of the magnitude symbol of the BVD or MVD based on the second indication and a value of the corresponding magnitude symbol of the BVD or MVD predictor. In another example embodiment, a method for selecting a probability model based on a first indication of a resolution of BVD or MVD and a position of a magnitude symbol of the BVD or MVD to be encoded may be implemented by an encoder. For example, the encoder determines a value of a magnitude symbol of a BVD or MVD to be encoded. The encoder further encodes, in a bitstream, a first indication of a resolution of the BVD or MVD. The encoder further selects, based on the first indication and a position of the magnitude symbol of the BVD or MVD, a probability model from a plurality of probability models. And, the encoder further arithmetically encodes, in the bitstream and based on the probability model, a second indication of whether the magnitude symbol of the BVD or MVD is equal to a corresponding magnitude symbol of a BVD or MVD predictor.

In some embodiments, the indication of resolution may be absent and not signaled for the BVD or MVD in certain modes. For example, in a multi-hypothesis prediction (MHP) mode, an indication (e.g., flag or syntax element) is signaled by the encoder and parsed at the decoder indicating a merge mode. For example, the indication may be a flag (e.g., general_merge_flag) set to 1 indicating the inter-prediction parameters for the current coding unit are inferred from a neighboring inter-predicted partition. In this merge mode, the inter-prediction parameters may include indication(s) of resolution to be inferred and therefore not signaled. However, in the MHP mode, sometimes an MVD is still signaled. But, the resolution cannot be determined at parsing because it is not explicitly signaled. To address this issue, a probability model—that is different from those used when the indication of resolution is present—is selected from a plurality of probability models to code (e.g., encode or decode) one or more magnitude symbols of the BVD or MVD. These and other features of the present disclosure are described further below.

According to example embodiments described herein, syntax elements may be coded in a different order such that the resolution, precision, magnitude, and/or IMV flag value for an BVD or MVD may be used to select a context/probability model for predicting one or more bins/symbols of the BVD or MVD. An example of motion vector difference (MVD) coding is shown in Table 7 below. Table 4 illustrates an example of signaling an mvd_coding( ) syntax element, which may be performed when a PU is indicated to be predicted using IBC mode.

TABLE 7

| | Descriptor |
|---|---|
| coding_unit( x0, y0, cbWidth, cbHeight, cqtDepth, treeType, modeType ) { | |
| ... | |
| if( CuPredMode[ chType ][ x0 ][ y0 ] = = MODE_IBC ) { | |
| mvd_coding( x0, y0, 0, 0 ) | |
| ... | |
| } | |
| imv_flag( ) | ae(v) |
| ... | |
| if( CuPredMode[ chType ][ x0 ][ y0 ] = = MODE_IBC ) { | |
| mvd_coding_remainder( x0, y0, 0, 0 ) | |
| ... | |
| } | |

In the example illustrated by Table 7, the syntax element mvd_coding( ) may comprise the syntax elements that specify whether the absolute value of a motion vector component difference is greater than 0. If the abs_mvd_greater0_flag[0] or abs_mvd_greater0_flag[1] syntax elements are non-zero, the imv_flag( ) would be signaled in the bitstream.

Another example of MVD coding is shown in Table 8 below. Table 8 illustrates an example syntax for the element of mvd_coding(x0, y0, 0, 0), which includes the abs_mvd_greater0_flag[0] and abs_mvd_greater0_flag[1].

TABLE 8

| | Descriptor |
|---|---|
| mvd_coding(x0, y0, refList ,cpIdx) { | |
| abs_mvd_greater0_flag[ 0 ] | ae(v) |
| abs_mvd_greater0_flag[ 1 ] | ae(v) |

Another example of MVD coding is shown in Table 9 below. Table 9 illustrates an example syntax for the element of mvd_coding_remainder(x0, y0, 0, 0), which includes the abs_mvd_greater0_flag[0] and abs_mvd_greater0_flag[1].

TABLE 9

| | Descriptor |
|---|---|
| mvd_coding(x0, y0, refList ,cpIdx) { | |
| if( abs_mvd_greater0_flag[ 0 ] ) { | |
| abs_mvd_minus1[ 0 ] | ae(v) |
| mvd_sign_flag[ 0 ] | ae(v) |
| } | |
| if( abs_mvd_greater0_flag[ 1 ] ) { | |
| abs_mvd_minus1[ 1 ] | ae(v) |
| mvd_sign_flag[ 1 ] | ae(v) |
| } | |
| } | |

In the example illustrated by Table 9, when deriving context elements for bins of abs_mvd_minus1 [0] and abs_mvd_minus1 [1], a value of the IMV flag may be taken into account because it is indicated prior to the indication of the mvd_coding_remainder (x0, y0, 0, 0). Herein, the terms "abs_mvd_minus1 [1]" and "abs_bvd_ver_remainder" may be used interchangeably. Further, herein the terms "abs_mvd_minus1 [0]" and "abs_bvd_hor_remainder" may be used interchangeably.

Figure 22:
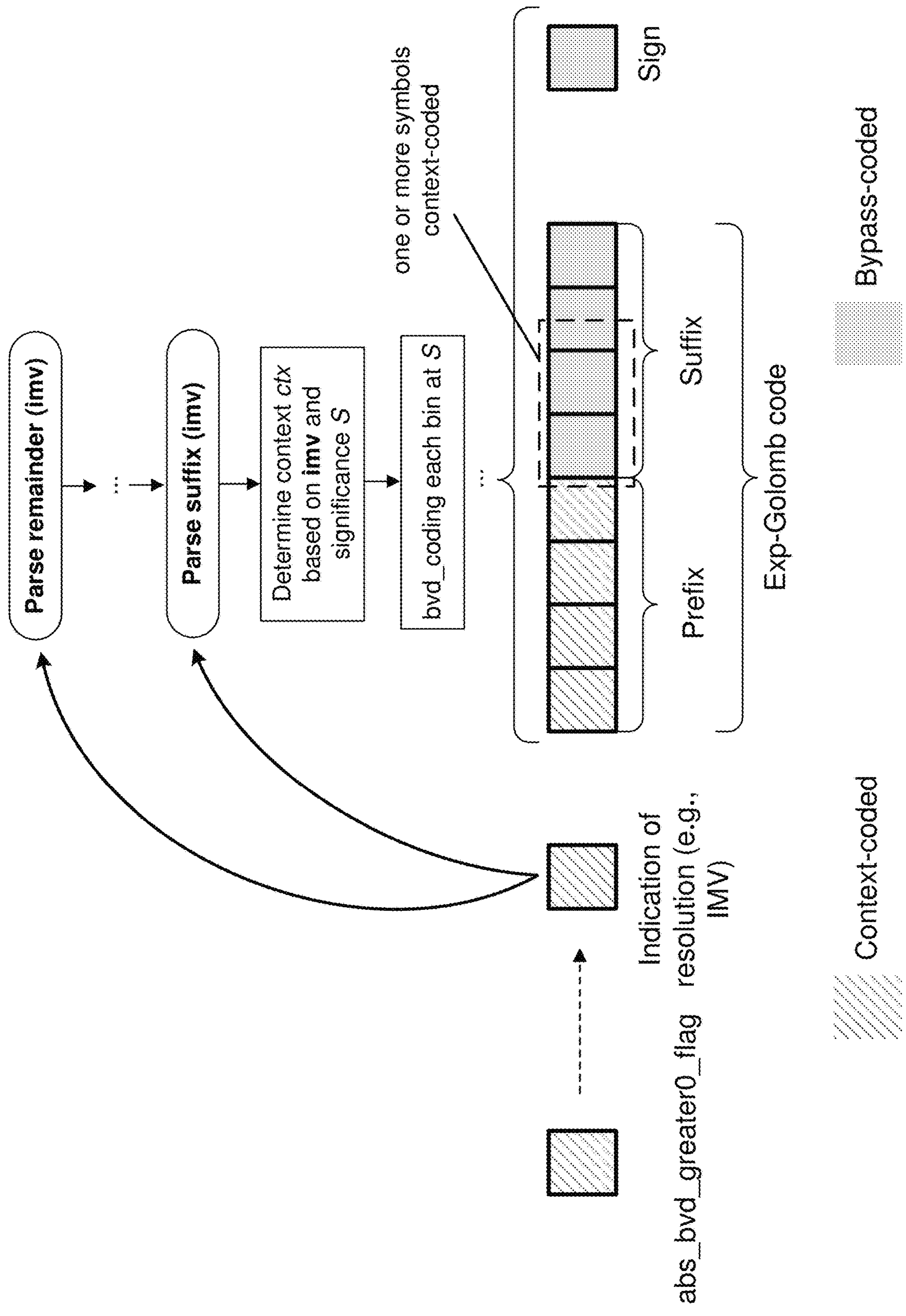
FIG. 22 illustrates an example of signaling bins, and corresponding syntax elements, of a BVD or MVD in accordance with embodiments of the present disclosure.

FIG. 22 illustrates an example of signaling bins, and corresponding syntax elements, of a BVD or MVD in accordance with embodiments of the present disclosure. In some examples, to enable improved selection of contexts (or probability models) of context coded symbols, the one or more indications of resolution for BVD or MVD is considered and therefore parsed before coding of magnitude symbols and sign of the BVD or MVD. For example, as illustrated by FIG. 22, a coding order of bins is specified for signaling of an bvd_coding( ) syntax element and an imv_flag( ) syntax element. The syntax element "imv_flag" may be signaled after the "abs_bvd_greater0_flag" syntax elements, and the "abs_bvd_minus1" syntax element (denoted as "Exp-Golomb code") may be signaled after the "imv_flag" syntax element. In an example, a value of the imv_flag may be considered during parsing the remainder of the BVD (see also FIG. 23, "Parse remainder (imv)"). Further, for example, the value of the imv_flag may be considered during parsing the suffix of the BVD (see also FIG. 23, "Parse suffix (imv)"). Similarly, for parsing MVDs, instead of the imv_flag, one or more indications of resolution such as amvr_flag and/or amvr_precision_index flag may be parsed to determine the resolution of the MVD, as described above.

Herein, context-coding refers to entropy coding an indication of whether a value of a magnitude symbol of a BVD or MVD matches (or is equal to) a value of the magnitude symbol of a BVD or MVD candidate used as a predictor of the BVD or MVD, as described above in FIGS. 18A-D. This context-coding may be further applied to multiple magnitude symbols of the BVD or MVD in prefix or suffix bins, sign symbols, or other related symbols as further described herein. Context-coding may also be referred to herein as prediction of bins based on performing hypothesis checking.

Figure 23:
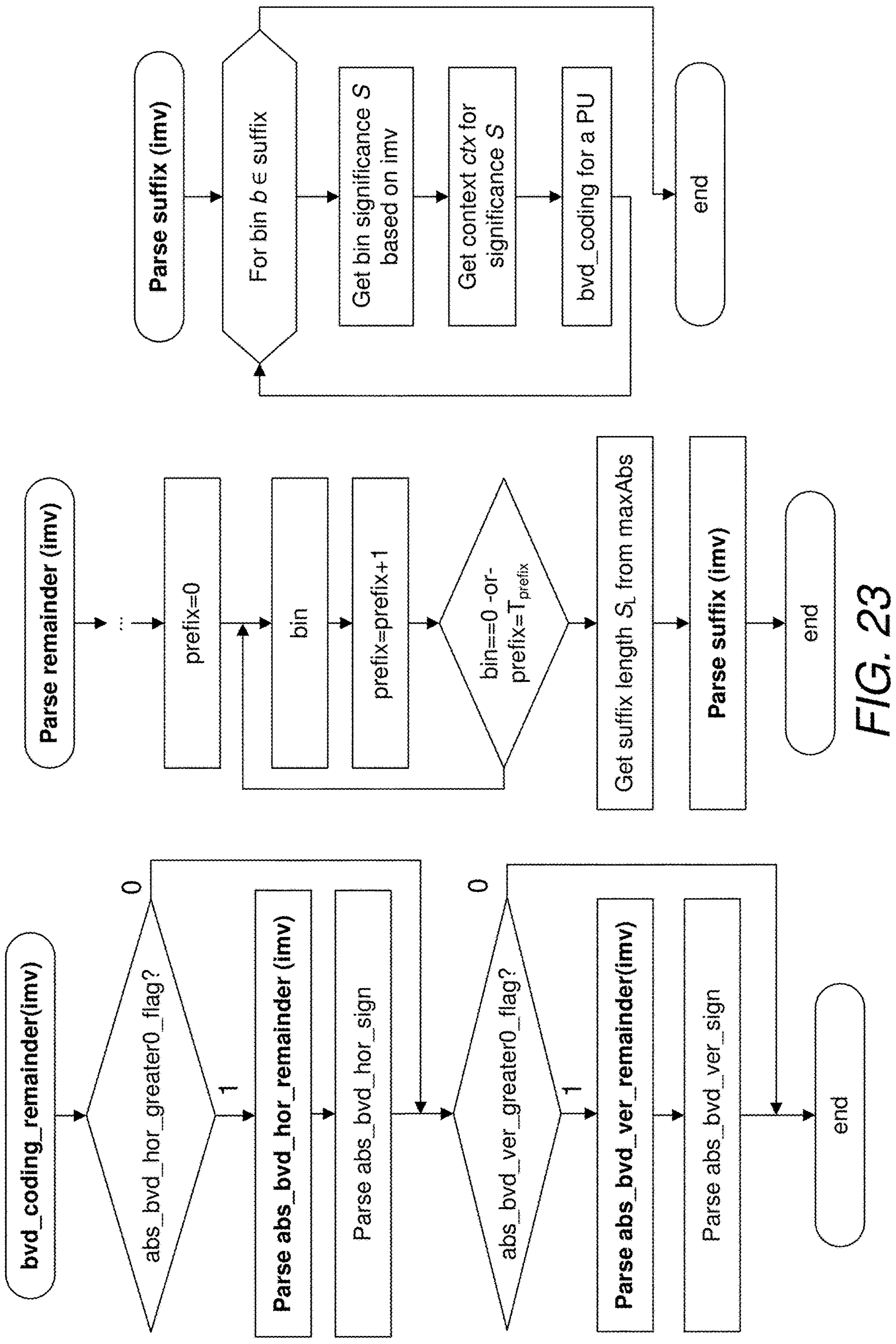
FIG. 23 illustrates an example of signaling bins, and corresponding syntax elements, of a BVD or MVD based on an IMV flag value in accordance with embodiments of the present disclosure.

FIG. 23 illustrates an example of signaling bins, and corresponding syntax elements, of a BVD or MVD based on an indication of resolution (e.g., an IMV flag value for BVD), in accordance with embodiments of the present disclosure. For ease of illustration, the following examples are described with respect to BVDs, in which case the indication of the resolution may be an IMV flag syntax element. However, it is to be understood that similar operations may be performed for coding symbols of MVDs, in which case the one or more indications of resolution may be, e.g., amvr_flag and/or amvr_precision_index. As illustrated in FIG. 23, a context of a suffix bin may be derived using an IMV flag value. More specifically, for a bin position at Bpos, the following condition may be checked per equation (26) below in order to determine a context/probability model:

$$2^{Bpos} < (T/F) \tag{26}$$

For example, when an IMV flag has a value of 0, Fis equal to 1; and when the IMV flag has a value of 1, F is equal to 4. In an example, F being equal to 1 corresponds to a 1-sample precision or resolution of the BVD or MVD, and F being equal to 4 corresponds to 4-sample precision or resolution of the BVD or MVD. Further, in FIG. 23, $T_{prefix}$ is defined as a predetermined threshold value for the maximum value of the prefix. Further, referring to equation (21), T is a predetermined threshold value to determine the context for a predicted suffix bin based on its position within a suffix. In a first example, T=16. In other examples, T could be equal to 4, 8, 32, 64, or other powers of 2. Referring back to equation (21), when the condition is true, a first context $Ctx_1$ may be specified for suffix bin coding. Otherwise, when the condition is false, a second context $Ctx_2$ may be specified for suffix bin coding. Further, in FIG. 23, the step of "Get bin significance S based on imv" corresponds to determining the value of Fin equation (21) above. Further, it should be noted that instead of a suffix bin, a prediction match for this bin could be signaled. This prediction match indicates whether the derived bin value is correct, or whether the derived suffix bin value should be negated.

FIG. 24 illustrates examples of deriving a context/probability model based on threshold and position values in accordance with embodiments of the present disclosure. As illustrated by FIG. 24, Example A, the equation of (21) may be used to determine a context/probability model (e.g., among $Ctx_1$ and $Ctx_2$), based on the example values of T and F per Example B, which is specified in more detail as Example C. In Example C, a threshold Tis adjusted by division by F, which is compared with a bin position based on Bpos (corresponding to a value of $2^{Bpos}$), which corresponds to Version A/equation (21). In another example, the equation of Version B may be used to determine a context/probability model (e.g., among $Ctx_1$ and $Ctx_2$) based on the values of T and F, which is specified in more detail as Example D. In Example D, a bin position based on Bpos (corresponding to a value of $2^{Bpos}$), is adjusted by multiplication by F, which is compared with a threshold T, which corresponds to equation Version B. Further, in Example C, a right bitwise/binary shift operation may be used instead of division. Further, in Example D, a left bit bitwise/binary shift operation may be used instead of multiplication. For example, a first $Ctx_1$ may be selected for relatively lower magnitudes/bin positions of the BVD or MVD, and a second $Ctx_2$ may be selected for relatively higher magnitudes/bin positions of the BVD or MVD, which may reflect that the probability of the prediction being accurate is higher for relatively higher magnitudes/bin positions of the BVD or MVD. In another example, an equation according to Version C may be used instead of Version A or Version B. Other example values of these variables may be applied similarly as described above with regard to FIG. 24. For example, as described above, for MVD, instead of the imv_flag, one or more indications such as amvr_flag and/or amvr_precision index may be signaled to indicate the resolution of the MVD value. In an example, this indicated resolution may be applied to the position of the symbol being coded and similarly compared to a threshold to select a context (or probability model) to entropy code the symbol. In another example, this indicated resolution may be applied to the threshold to determine an adjusted threshold and the position of the symbol being coded may be compared to the adjusted threshold to select a context (or probability model) to entropy code the symbol.

In some embodiments, to encode or decode video content, syntax elements of a video sequence are entropy encoded or decoded, respectively, as described above with respect to FIG. 17 and FIG. 18A-D. These syntax elements may be generated at a video encoder and may describe how a video signal may be reconstructed at a video decoder. For a coding unit (CU), the syntax elements may include an intra prediction mode based on the CU being intra predicted, motion data (e.g., MVD and MVP related data) based on the CU being inter predicted, or displacement data (e.g., BVD and BVP related data) based on the CU being predicted using IBC.

In some embodiments, to encode the syntax elements, the encoder (e.g., entropy coding unit 218) may include a binarizer first map a value of a syntax element to a sequence of binary symbols (also referred to as bins). The binarizer may define a unique mapping of values of syntax element to sequences of binary symbols. In other words, the binarizer may generate a binary representation of a non-binary valued syntax element. Binarization of syntax elements may help to improve probability modeling and implementation of arithmetic encoding. For example, the binarizer may implement one or more binarization processes, such as unary, truncated unary, k-th order truncated Rice, k-th order exponential-Golomb (EGk), fixed-length, or some combination of two or more of these binarization processes. As is well known to a skilled person, the bits of the binary string, to which the value of the syntax element has been binarized, is sometimes referred to as bins and a bin may refer to one of the bits of the binary string.

After the binarizer maps the value of a syntax element to a sequence of binary symbols, one or more of the binary symbols may be processed by an arithmetic encoder, which may process each of the one or more binary symbols in one of at least two modes: regular arithmetic encoding mode or bypass arithmetic encoding mode to further increase compression.

In some embodiments, to decode the binarized syntax elements, the decoder (e.g., entropy decoding unit 306) may include a debinarizer that reverses the operation of the binarizer and may map the sequence of binary symbols in a bitstream (including a video sequence) to the value of syntax element. Similarly, the decoder may include an arithmetic decoder to reverse (i.e., decode) the arithmetic encoding of the encoded syntax element in the bitstream before the debinarizer determines the value of the syntax element from the sequence of binary symbols.

In some embodiments, a BVD (e.g., in the IBC mode) may be encoded by binarizing the magnitude (e.g., horizontal and/or vertical component magnitude) of the BVD using a binarization scheme that includes a first part that indicates a range of values that the magnitude of the BVD falls within and a second part that indicates a precise value, within the range of values, of the magnitude of the BVD. For example, the BVD includes a horizontal component and a vertical component that may each be separately binarized using the binarization scheme or code. For ease of illustration, whenever the BVD is described as being coded, it is to be understood that each component (e.g., horizontal/x and vertical/y) of the BVD may be entropy coded separately, according to some embodiments.

In some embodiments, in addition to coding MVDs in inter prediction modes such as affine modes and translational modes, an MVD may also be coded in a multi-hypothesis prediction (MHP) mode (i.e., another example of an inter prediction mode). In this mode, one or more additional motion-compensated prediction signals (indicating candidate reference blocks) are signaled, in addition to the conventional bi-prediction signals in affine and translation modes. The resulting overall prediction signal for MHP may be obtained by sample-wise weighted superposition. With the bi-prediction signal $p_{bi}$ and the first additional inter prediction signal/hypothesis $h_3$, the resulting prediction signal $p_3$ is obtained as follows:

$$p_3 = (1-\alpha)p_{bi} + \alpha h_3$$

The weighting factor α is specified by the new syntax element add_hyp_weight_idx, according to the following mapping:

| add_hyp_weight_idx | α |
|---|---|
| 0 | 1/4 |
| 1 | −1/8 |

In some examples, more than one prediction signal (e.g., 2 or 3) may be used For example, a first prediction signal may be determined as a resulting overall prediction signal accumulated iteratively with each additional prediction signal.

$$p_{n+1} = (1-\alpha_{n+1})p_n + \alpha_{n+1}h_{n+1}$$

The resulting overall prediction signal is obtained as the last $p_n$ (i.e., the $p_n$ having the largest index n).

The motion parameters of each additional prediction hypothesis may be signaled either explicitly by specifying the reference index, the motion vector predictor (MVP) index, and the motion vector difference (MVD), or implicitly by specifying a merge index. A separate multi-hypothesis merge flag may indicate one of these two signaling modes for each prediction hypothesis of the MHP mode. In merge mode, similarly to that described above for IBC, instead of signaling the MVD, an index may be signaled to infer or derive a MV based on MVs of neighboring blocks, of the current block, that have been previously decoded.

In some embodiments, an indication for merge mode (e.g., general_merge_flag[x0][y0]) may be signaled for a current block to indicate whether the inter prediction parameters for the current coding unit (e.g., including the current block) are inferred or determined from a neighboring inter-predicted partition. The array indices x0, y0 specify the location (x0, y0) of the top-left luma sample of the considered coding block relative to the top-left luma sample of the picture. For the MHP mode, the indication for merge mode is set to 1 indicating the inter-prediction parameters are to be inferred. Further in the MHP mode, in some examples, although the indication for merge mode may be set, a separate indication (e.g., mh_merge_idx[i]) may be signaled for each prediction hypothesis whether a merge mode is used to encode parameters of the specific hypothesis with index i. This separate indication enables flexibility in coding the prediction hypothesis in the MHP mode as a merge index or as an MVD with an MVP index. Therefore, in some examples, in the MHP mode, an MVD and MVP index (similar to indication of BVP for coding BVDs) may be signaled even when the merge mode (e.g., general_merge_flag syntax element) is indicated. In these examples, because the merge mode is indicated or enabled, no resolution information of the MVD will be signaled.

As described above, when indication of resolution for a vector difference (e.g., BVD or MVD) is not available before parsing and entropy coding magnitude and sign symbols of the vector difference, the embodiments described above for selecting context for entropy coding a magnitude symbol of the vector difference cannot be performed. For example, when an MVD is coded in an MHP mode, an indication of the merge mode is signaled indicating that no resolution information of the MVD is explicitly signaled. Therefore, in some examples, when the indication of resolution for the vector difference is absent, a separate context (also referred to as a probability model) is selected to context code one or more symbols (e.g., a sign symbol or one or more magnitude symbols as described in FIG. 21 and FIG. 22) of the vector difference. In some examples, this separate context is different from the possible contexts that may be selected based on the indication of resolution (when available) such that the contexts based on the indication of resolution are not erroneously updated while coding symbols of the vector difference when no indication of resolution is available.

It should be further noted that the approach discussed above with respect to FIGS. 17-24 and below with respect to FIGS. 25-27 may be further applied to one or more magnitude symbols of an MVD used in inter prediction (e.g., affine model/mode, translational model/mode, or MHP mode) in addition or alternatively to one or more magnitude symbols of a BVD used in IBC. For inter prediction, the terms BV, BVP, BVD, and BVD candidate may be replaced by the terms MV, MVP, MVD, and MVD candidate as would be appreciated by a person of ordinary skill in the art based on the present disclosure. It should be further noted that the approach discussed above may be applied to IBC and inter prediction based on a translational motion model for the prediction block. In other examples, the approach discussed above may be applied to IBC and inter prediction based on an affine motion model for the prediction block. Herein, the term "bins" may refer to the bits, or binary symbols, used to encode and decode symbols of BVDs or MVDs.

Herein, context-coding of a sign symbol or of a magnitude symbol of a suffix may refer to entropy coding an indication of whether a value of the symbol (e.g., magnitude symbol or sign symbol) of a BVD or MVD is equal to (i.e., matches)

a value of the corresponding symbol of a BVD or MVD candidate used as a predictor of the BVD or MVD. This context-coding may be further applied to multiple magnitude symbols of the BVD or MVD in prefix or suffix bins, sign symbols, or other related symbols as further described herein. Context-coding may also be referred to herein as prediction of bins based on performing hypothesis checking.

It should be further noted that the coding order of sign bins, prefix bins, and suffix bins may be different from the order of prediction of bins when performing hypothesis checking. Prediction of bins may be performed in the order from highest significance to lowest significance of bins, wherein a sign bin may be considered to have higher significance than the most significant predicted bin of suffix. At the encoder side, a binary string of predicted bins may be signaled in the different order, i.e., from lower significant bins to higher significant bins. Correspondingly, at the decoder side, the binary string is restored during parsing process in the same order it is coded at the encoder side. Further, context selection for encoding or decoding of a bin may utilize previously coded bins. Hence, coding order for predicted bin signaling determines whether contexts are derived from bins of lower significance or bins of higher significance.

Figure 25:
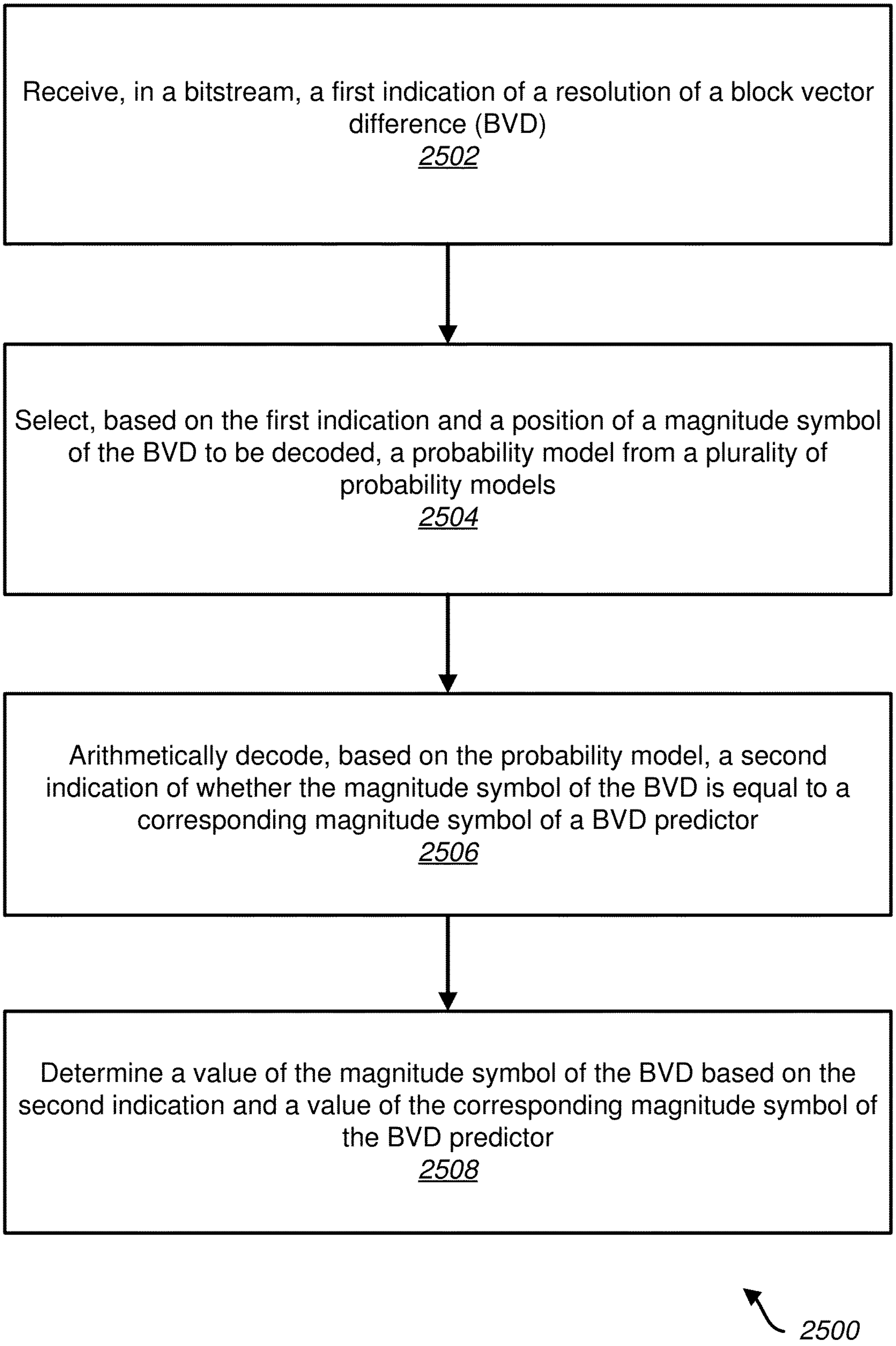
FIG. 25 illustrates a flowchart of a method for selecting a probability model based on a first indication of a resolution of a block vector difference (BVD) and a position of a magnitude symbol of the BVD to be decoded in accordance with embodiments of the present disclosure.

FIG. 25 illustrates a flowchart 2500 of a method for selecting a probability model based on a first indication of a resolution of a block vector difference (BVD) and a position of a magnitude symbol of the BVD to be decoded in accordance with embodiments of the present disclosure. The method of flowchart 2500 may be implemented by a decoder, such as decoder 300 in FIG. 3.

The method of flowchart 2500 begins at 2502. At 2502, the decoder receives, in a bitstream, a first indication of a resolution of a block vector difference (BVD). In an example, the first indication of the resolution of the BVD may indicate an integer resolution or a fractional resolution for the BVD. In an example, the first indication of the resolution of the BVD may be based on an integer motion vector (IMV) value, syntax element, or flag.

At 2504, the decoder selects, based on the first indication and a position of a magnitude symbol of the BVD to be decoded, a probability model from a plurality of probability models. In an example, the position may be of the magnitude symbol in a suffix portion of a codeword corresponding to the BVD. At 2506, the decoder arithmetically decodes, based on the probability model, a second indication of whether the magnitude symbol of the BVD is equal to a corresponding magnitude symbol of a BVD predictor. And, at 2508, the decoder determines a value of the magnitude symbol of the BVD based on the second indication and a value of the corresponding magnitude symbol of the BVD predictor.

In an example, the decoder may further determine BVD candidates based on one or more magnitude symbols of the BVD to be predicted. In an example, the decoder may further determine template matching costs for the BVD candidates, wherein each template matching cost is between a current template of a current block (CB) and a reference template of a reference block (RB) candidate indicated by a respective BVD candidate of the BVD candidates. In an example, the decoder may further select one of the BVD candidates as the BVD predictor based on the template matching costs.

In an example, the decoder may further determine a value of the resolution based on the first indication of the resolution of the BVD, wherein the probability model is selected based on the value of the resolution and the position. In an example, the selecting the probability model may further include adjusting the position based on a value of the resolution indicated by the first indication, and comparing the adjusted position with a threshold. In an example, the value of the resolution may comprise a shift value. In an example, the adjusting the position may comprise shifting a value of the position in a same direction as a shift for the shift value. In an example, the value of the position may be a power of two of the position. In another example, the value of the resolution may comprise a shift value, and the adjusting the position may comprise adjusting the position in a same direction as a shift for the shift value. In another example, the value of the position may indicate a second position of a second magnitude symbol of the BVD.

In an example, the decoder may further, based on the adjusted position being less than the threshold, select a first probability model. In another example, the decoder may further, based on the adjusted position being greater than or equal to the threshold, select a second probability model. In an example, the first probability model may comprise a first probability for the second indication indicating that the magnitude symbol of the BVD is equal to the corresponding magnitude symbol of the BVD predictor. In another example, the second probability model may comprise a second probability for the second indication indicating that the magnitude symbol of the BVD is equal to the corresponding magnitude symbol of the BVD predictor, wherein the second probability is greater than the first probability.

In another example, the selecting the probability model may further include adjusting a threshold based on a value of the resolution indicated by the first indication, and comparing the adjusted threshold with a value of the position. In an example, the value of the resolution may comprise a shift value. In an example, the adjusting the threshold may comprise shifting a value of the threshold in an opposite direction as a shift for the shift value. In an example, the value of the threshold may be based on a predetermined value. In an example, the predetermined value may be one of 1, 2, 4, 8, 16, 32, 64, 128, or 256. In an example, the value of the position may be a power of two of the position. In another example, the value of the resolution may comprise a shift value, and a value of the threshold may indicate a second position of a second magnitude symbol of the BVD. In another example, the adjusting the threshold may comprise adjusting the second position in an opposite direction as a shift for the shift value.

In an example, the decoder may further, based on the adjusted threshold being greater than or equal to the value of the position, select a first probability model. In another example, the decoder may further, based on the adjusted threshold being less than the value of the position, select a second probability model. In an example, the first probability model may comprise a first probability for the second indication indicating that the magnitude symbol of the BVD is equal to the corresponding magnitude symbol of the BVD predictor. In another example, the second probability model may comprise a second probability for the second indication indicating that the magnitude symbol of the BVD is equal to the corresponding magnitude symbol of the BVD predictor, wherein the second probability is greater than the first probability.

In an example, the decoder may further receive, in the bitstream, a third indication of whether a component of the BVD is greater than zero. In an example, the decoder may further, based on the receiving the third indication, parse, from the bitstream, the first indication. In an example, the decoder may further determine the BVD based on a difference between a block vector (BV) and a block vector predictor (BVP). In an example, the resolution of the BVD may further be based on a resolution of the BV. In an example, the decoder may further determine a value of an IMV flag based on a maximum absolute value of a component of the BVD, and an indication of the resolution of the BV. In an example, a first value of the IMV flag may correspond to a 1-sample increment of the magnitude of the component of the BVD, and a second value of the IMV flag may correspond to a 4-sample increment of the magnitude of the component of the BVD.

As previously explained, the operations described in FIG. 25 may also apply to MVDs, in which case BVD may be replaced by MVD and BVP may be replaced by MVP. For example, a decoder may receive, in a bitstream, a first indication of a resolution of a motion vector difference (MVD). Based on the first indication and a position of a magnitude symbol of the MVD (e.g., an MVD component of the MVD) to be decoded, the decoder selects a probability model from a plurality of probability models. Based on the probability model, the decoder arithmetically decodes a second indication of whether the magnitude symbol of the MVD is equal to a corresponding magnitude symbol of a MVD predictor. The decoder determines a value of the magnitude symbol of the MVD based on the second indication and a value of the corresponding magnitude symbol of the MVD predictor.

Figure 26:
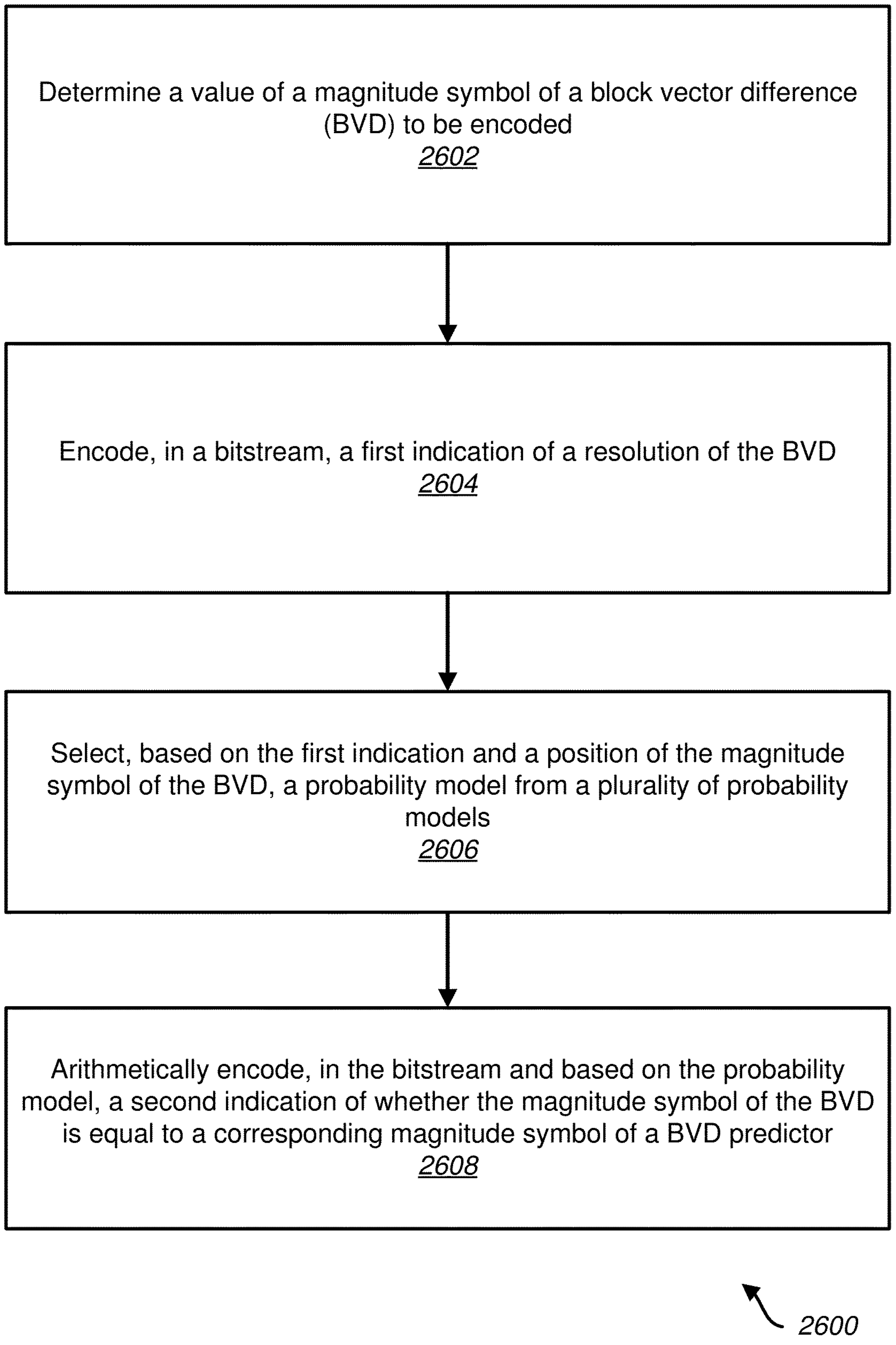
FIG. 26 illustrates a flowchart of a method for selecting a probability model based on a first indication of a resolution of a block vector difference (BVD) and a position of a magnitude symbol of the BVD to be encoded in accordance with embodiments of the present disclosure.

FIG. 26 illustrates a flowchart 2600 of a method for selecting a probability model based on a first indication of a resolution of a block vector difference (BVD) and a position of a magnitude symbol of the BVD to be encoded in accordance with embodiments of the present disclosure. The method of flowchart 2600 may be implemented by an encoder, such as encoder 200 in FIG. 2.

The method of flowchart 2600 begins at 2602. At 2602, the encoder determines a value of a magnitude symbol of a block vector difference (BVD) to be encoded. At 2604, the encoder encodes, in a bitstream, a first indication of a resolution of the BVD. In an example, the first indication of the resolution of the BVD may indicate an integer resolution or a fractional resolution for the BVD. In an example, the first indication of the resolution of the BVD may be based on an integer motion vector (IMV) value, syntax element, or flag.

At 2606, the encoder selects, based on the first indication and a position of the magnitude symbol of the BVD, a probability model from a plurality of probability models. In an example, the position may be of the magnitude symbol in a suffix portion of a codeword corresponding to the BVD. And, at 2608, the encoder arithmetically encodes, in the bitstream and based on the probability model, a second indication of whether the magnitude symbol of the BVD is equal to a corresponding magnitude symbol of a BVD predictor.

In an example, the encoder may further determine BVD candidates based on one or more magnitude symbols of the BVD to be predicted. In an example, the encoder may further determine template matching costs for the BVD candidates, wherein each template matching cost is between a current template of a current block (CB) and a reference template of a reference block (RB) candidate indicated by a respective BVD candidate of the BVD candidates. In an example, the encoder may further select one of the BVD candidates as the BVD predictor based on the template matching costs.

In an example, the encoder may further determine a value of the resolution based on the first indication of the resolution of the BVD, wherein the probability model is selected based on the value of the resolution and the position. In an example, the selecting the probability model may further include adjusting the position based on a value of the resolution indicated by the first indication, and comparing the adjusted position with a threshold. In an example, the value of the resolution may comprise a shift value. In an example, the adjusting the position may comprise shifting a value of the position in a same direction as a shift for the shift value. In an example, the value of the position may be a power of two of the position. In another example, the value of the resolution may comprise a shift value, and the adjusting the position may comprise adjusting the position in a same direction as a shift for the shift value. In another example, the value of the position may indicate a second position of a second magnitude symbol of the BVD.

In an example, the encoder may further, based on the adjusted position being less than the threshold, select a first probability model. In another example, the encoder may further, based on the adjusted position being greater than or equal to the threshold, select a second probability model. In an example, the first probability model may comprise a first probability for the second indication indicating that the magnitude symbol of the BVD is equal to the corresponding magnitude symbol of the BVD predictor. In another example, the second probability model may comprise a second probability for the second indication indicating that the magnitude symbol of the BVD is equal to the corresponding magnitude symbol of the BVD predictor, wherein the second probability is greater than the first probability.

In another example, the selecting the probability model may further include adjusting a threshold based on a value of the resolution indicated by the first indication, and comparing the adjusted threshold with a value of the position. In an example, the value of the resolution may comprise a shift value. In an example, the adjusting the threshold may comprise shifting a value of the threshold in an opposite direction as a shift for the shift value. In an example, the value of the threshold may be based on a predetermined value. In an example, the predetermined value may be one of 1, 2, 4, 8, 16, 32, 64, 128, or 256. In an example, the value of the position may be a power of two of the position. In another example, the value of the resolution may comprise a shift value, and a value of the threshold may indicate a second position of a second magnitude symbol of the BVD. In another example, the adjusting the threshold may comprise adjusting the second position in an opposite direction as a shift for the shift value.

In an example, the encoder may further, based on the adjusted threshold being greater than or equal to the value of the position, select a first probability model. In another example, the encoder may further, based on the adjusted threshold being less than the value of the position, select a second probability model. In an example, the first probability model may comprise a first probability for the second indication indicating that the magnitude symbol of the BVD is equal to the corresponding magnitude symbol of the BVD predictor. In another example, the second probability model may comprise a second probability for the second indication indicating that the magnitude symbol of the BVD is equal to the corresponding magnitude symbol of the BVD predictor, wherein the second probability is greater than the first probability.

In an example, the encoder may further encode, in the bitstream, a third indication of whether a component of the BVD is greater than zero. In an example, the encoder may further, based on the encoding the third indication, encode, in the bitstream, the first indication. In an example, the encoder may further determine the BVD based on a difference between a block vector (BV) and a block vector predictor (BVP). In an example, the resolution of the BVD may further be based on a resolution of the BV. In an example, the encoder may further determine a value of an IMV flag based on a maximum absolute value of a component of the BVD, and an indication of the resolution of the BV. In an example, a first value of the IMV flag may correspond to a 1-sample increment of the magnitude of the component of the BVD, and a second value of the IMV flag may correspond to a 4-sample increment of the magnitude of the component of the BVD.

As previously explained, the operations described in FIG. 26 may also apply to MVDs, in which case BVD may be replaced by MVD and BVP may be replaced by MVP. For example, an encoder may determine a value of a magnitude symbol of a block vector difference (BVD) to be encoded. The encoder encodes, in a bitstream, a first indication of a resolution of the BVD. The encoder selects, based on the first indication and a position of the magnitude symbol of the BVD, a probability model from a plurality of probability models. The encoder arithmetically encodes, in the bitstream and based on the probability model, a second indication of whether the magnitude symbol of the BVD is equal to a corresponding magnitude symbol of a BVD predictor.

Figure 27:
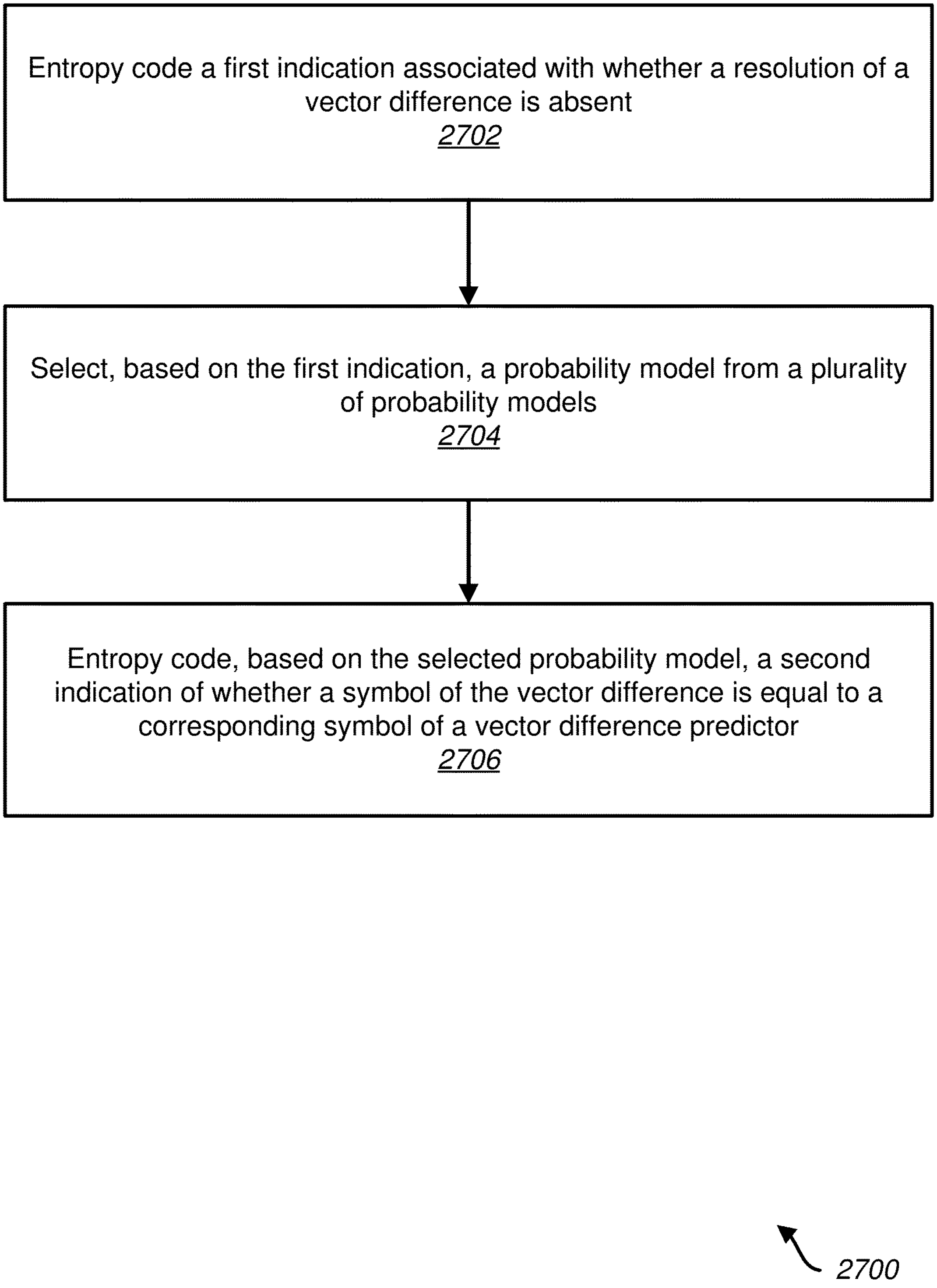
FIG. 27 illustrates a flowchart of a method for selecting a probability model based on an indication of a resolution of a vector difference being absent (e.g., not explicitly signaled) to entropy code a symbol of the vector difference in accordance with embodiments of the present disclosure.

FIG. 27 illustrates a flowchart of a method for selecting a probability model based on an indication of a resolution of a vector difference being absent (e.g., not explicitly signaled) to entropy code a symbol of the vector difference in accordance with embodiments of the present disclosure. The operations of FIG. 27 may be implemented reciprocally by an encoder, such as encoder 200 in FIG. 2, and a decoder, such as decoder 300 in FIG. 3.

At 2702, a first indication associated with whether a resolution of a vector difference is absent (e.g., being not explicitly signaled) is entropy coded. In some examples, the first indication may indicate whether the resolution is not being explicitly signaled. For example, the first indication may be a merge flag.

For example, the vector difference may be a BVD in IBC mode or an MVD in an inter-prediction mode such as affine mode, translational mode, or MHP mode, as described above. In some examples, when explicitly signaled for the BVD, the resolution may be indicated by an IMV flag. In some examples, when explicitly signaled for the MVD, the resolution may be indicated by one or more indications including the amvr_flag and/or the amvr_precision_index flags. In some embodiments, if the first indication indicates that the resolution for the vector difference is signaled, then the methods for context selection as described above with respect to FIGS. 25 and 26 for the decoder and encoder, respectively, may apply.

At 2704, based on the first indication indicating that the resolution is absent (or not explicitly signaled), a probability model from a plurality of probability models is selected. In some examples, this probability model (also referred to as context) is different from the possible probability models selectable for coding a symbol (e.g., a sign symbol or a magnitude symbol), as described above with respect to FIG. 24-26.

At 2706, based on the selected probability model, a second indication of whether a symbol of the vector difference is equal to a corresponding symbol of a vector difference predictor is entropy coded (e.g., arithmetically coded using a coder such as CABAC). Examples of how this second indication is entropy coded is described above with respect to FIGS. 17 and 18A-D.

For example, when performed by an encoder, the encoder may determine a vector difference (e.g., MVD or BVD) and signal (e.g., arithmetically encode) the first indication. For example, the first indication may be a merge flag for an MVD in an MHP mode, in which no resolution indications (e.g., amvr_flag and/or amvr_precision_index) are explicitly signaled for the MVD. Based on this first indication, the encoder may select the probability model, from the plurality of probability models, associated with no resolution indications. Then, when arithmetically encoding a symbol (e.g., a sign symbol or a magnitude symbol of a suffix of the MVD) of the vector difference that is context coded as a "hypothesis check" indication, the selected probability model may be used to arithmetically encode the second indication of whether the symbol of the vector difference is equal to the corresponding symbol of the vector difference predictor (e.g., BVD predictor for BVD or MVD predictor for MBVD), as described above with respect to FIGS. 18A-D.

For example, when performed by a decoder, the decoder may parse and arithmetically decode the first indication. For example, the first indication may be a merge flag for an MVD in an MHP mode, in which no resolution indications (e.g., amvr_flag and/or amvr_precision_index) are explicitly signaled for the MVD. Based on this first indication, the decoder may select the probability model, from the plurality of probability models, associated with no resolution indications. Then, when arithmetically decoding a symbol (e.g., a sign symbol or a magnitude symbol of a suffix of the MVD) of the vector difference that is context coded as a "hypothesis check" indication, the selected probability model may be use to arithmetically decode the second indication of whether the symbol of the vector difference is equal to the corresponding symbol of the vector difference predictor (e.g., BVD predictor for BVD or MVD predictor for MBVD), as described above with respect to FIGS. 18A-D. To determine a value of the symbol, the decoded second indication may be compared to a value of the corresponding symbol of the determined vector difference predictor. For example, if the second indication indicates the symbol being equal to that of the predictor, then the decoder determines the value of the symbol to be the same as that of the predictor. Relatedly, if the second indication indicates the symbol being not equal to that of the predictor, then the decoder determines the value of the symbol to be the opposite as that of the predictor.

Figure 28:
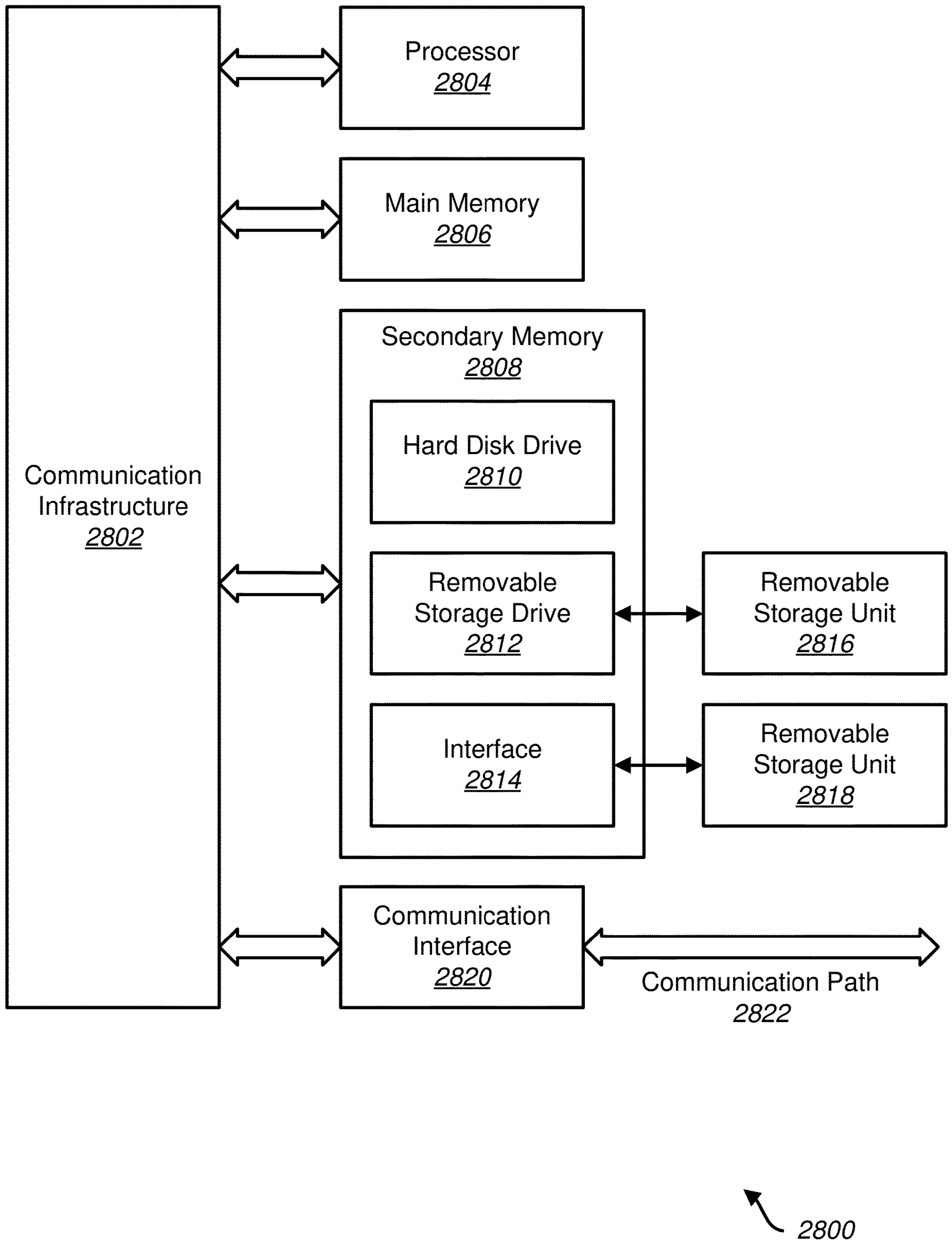
FIG. 28 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 2800 is shown in FIG. 28. Blocks depicted in the figures above, such as the blocks in FIGS. 1, 2, and 3, may execute on one or more computer systems 2800. Furthermore, each of the steps of the flowcharts depicted in this disclosure may be implemented on one or more computer systems 2800.

Computer system 2800 includes one or more processors, such as processor 2804. Processor 2804 may be, for example, a special purpose processor, general purpose processor, microprocessor, or digital signal processor. Processor 2804 may be connected to a communication infrastructure 2802 (for example, a bus or network). Computer system 2800 may also include a main memory 2806, such as random access memory (RAM), and may also include a secondary memory 2808.

Secondary memory 2808 may include, for example, a hard disk drive 2810 and/or a removable storage drive 2812, representing a magnetic tape drive, an optical disk drive, or the like. Removable storage drive 2812 may read from and/or write to a removable storage unit 2816 in a well-known manner. Removable storage unit 2816 represents a magnetic tape, optical disk, or the like, which is read by and written to by removable storage drive 2812. As will be appreciated by persons skilled in the relevant art(s), removable storage unit 2816 includes a computer usable storage medium having stored therein computer software and/or data.

In alternative implementations, secondary memory 2808 may include other similar means for allowing computer programs or other instructions to be loaded into computer system 2800. Such means may include, for example, a removable storage unit 2818 and an interface 2814. Examples of such means may include a program cartridge and cartridge interface (such as that found in video game devices), a removable memory chip (such as an EPROM or PROM) and associated socket, a thumb drive and USB port, and other removable storage units 2818 and interfaces 2814 which allow software and data to be transferred from removable storage unit 2818 to computer system 2800.

Computer system 2800 may also include a communications interface 2820. Communications interface 2820 allows software and data to be transferred between computer system 2800 and external devices. Examples of communications interface 2820 may include a modem, a network interface (such as an Ethernet card), a communications port, etc. Software and data transferred via communications interface 2820 are in the form of signals which may be electronic, electromagnetic, optical, or other signals capable of being received by communications interface 2820. These signals are provided to communications interface 2820 via a communications path 2822. Communications path 2822 carries signals and may be implemented using wire or cable, fiber optics, a phone line, a cellular phone link, an RF link, and other communications channels.

As used herein, the terms "computer program medium" and "computer readable medium" are used to refer to tangible storage media, such as removable storage units 2816 and 2818 or a hard disk installed in hard disk drive 2810. These computer program products are means for providing software to computer system 2800. Computer programs (also called computer control logic) may be stored in main memory 2806 and/or secondary memory 2808. Computer programs may also be received via communications interface 2820. Such computer programs, when executed, enable the computer system 2800 to implement the present disclosure as discussed herein. In particular, the computer programs, when executed, enable processor 2804 to implement the processes of the present disclosure, such as any of the methods described herein. Accordingly, such computer programs represent controllers of the computer system 2800.

In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the art.

What is claimed is:

1. A method comprising:

receiving, from a video bitstream, a first indication of a resolution of a vector difference for a current block;

selecting, based on the first indication and a position of a magnitude symbol in a suffix portion of a codeword representing the vector difference to be decoded, a probability model from a plurality of probability models to decode the magnitude symbol;

arithmetically decoding, from the video bitstream and based on the probability model, a second indication indicating whether the magnitude symbol of the vector difference is equal to a corresponding magnitude symbol of a vector difference predictor;

determining a value of the magnitude symbol of the vector difference based on the second indication and a value of the corresponding magnitude symbol of the vector difference predictor; and decoding the current block based on the vector difference represented by the codeword comprising the magnitude symbol with the determined value.

2. The method of claim 1, wherein:

the vector difference is a block vector difference (BVD), and the vector difference predictor is a BVD predictor; or the vector difference is a motion vector difference (MVD), and the vector difference predictor is an MVD predictor.

3. The method of claim 1, wherein the selecting the probability model further comprises:

adjusting the position based on a value of the resolution indicated by the first indication; and comparing the adjusted position with a threshold to select the probability model as:

a first probability model based on the adjusted position being less than the threshold; and a second probability model based on the adjusted position being greater than or equal to the threshold.

4. The method of claim 1, wherein the selecting the probability model further comprises:

adjusting a threshold based on a value of the resolution indicated by the first indication; and comparing the adjusted threshold with a value of the position to select the probability model as:

a first probability model based on the position being less than the adjusted threshold; and a second probability model based on the position being greater than or equal to the adjusted threshold.

5. The method of claim 1, further comprising:

determining vector difference candidates based on one or more magnitude symbols, of the vector difference, to be predicted;

determining, for each vector difference candidate of the vector difference candidates, a template matching cost between a current template of the current block and a reference template of a reference block candidate indicated by the vector difference candidate; and selecting one of the vector difference candidates as the vector difference predictor based on the template matching costs.

6. The method of claim 1, further comprising:

receiving, from the video bitstream, a third indication of whether a component of the vector difference is greater than zero, wherein the first indication is received after the third indication and before magnitude symbols of the codeword representing the vector difference are decoded.

7. The method of claim 1, wherein the selected probability model comprises a probability for the magnitude symbol of the vector difference being equal to the corresponding magnitude symbol of the vector difference predictor.

8. A decoder comprising:

one or more processors; and memory storing instructions that, when executed by the one or more processors, cause the decoder to:

receive, from a video bitstream, a first indication of a resolution of a vector difference for a current block;

select, based on the first indication and a position of a magnitude symbol in a suffix portion of a codeword representing the vector difference to be decoded, a probability model from a plurality of probability models to decode the magnitude symbol;

arithmetically decode, from the video bitstream and based on the probability model, a second indication indicating whether the magnitude symbol of the vector difference is equal to a corresponding magnitude symbol of a vector difference predictor;

determine a value of the magnitude symbol of the vector difference based on the second indication and a value of the corresponding magnitude symbol of the vector difference predictor; and decode the current block based on the vector difference represented by the codeword comprising the magnitude symbol with the determined value.

9. The decoder of claim 8, wherein:

the vector difference is a block vector difference (BVD), and the vector difference predictor is a BVD predictor; or the vector difference is a motion vector difference (MVD), and the vector difference predictor is an MVD predictor.

10. The decoder of claim 8, wherein, to select the probability model, the instructions further cause the decoder to:

adjust the position based on a value of the resolution indicated by the first indication; and compare the adjusted position with a threshold to select the probability model as:

a first probability model based on the adjusted position being less than the threshold; and a second probability model based on the adjusted position being greater than or equal to the threshold.

11. The decoder of claim 8, wherein, to select the probability model, the instructions further cause the decoder to:

adjust a threshold based on a value of the resolution indicated by the first indication; and compare the adjusted threshold with a value of the position to select the probability model as:

a first probability model based on the position being less than the adjusted threshold; and a second probability model based on the position being greater than or equal to the adjusted threshold.

12. The decoder of claim 8, wherein the instructions further cause the decoder to:

determine vector difference candidates based on one or more magnitude symbols, of the vector difference, to be predicted;

determine, for each vector difference candidate of the vector difference candidates, a template matching cost between a current template of the current block and a reference template of a reference block candidate indicated by the vector difference candidate; and select one of the vector difference candidates as the vector difference predictor based on the template matching costs.

13. The decoder of claim 8, wherein the instructions further cause the decoder to:

receive, from the video bitstream, a third indication of whether a component of the vector difference is greater than zero, wherein the first indication is received after the third indication and before magnitude symbols of the codeword representing the vector difference are decoded.

14. The decoder of claim 8, wherein the selected probability model comprises a probability for the magnitude symbol of the vector difference being equal to the corresponding magnitude symbol of the vector difference predictor.

15. A non-transitory computer-readable medium comprising instructions that, when executed by one or more processors of a decoder, cause the decoder to:

receive, from a video bitstream, a first indication of a resolution of a vector difference for a current block;

select, based on the first indication and a position of a magnitude symbol in a suffix portion of a codeword representing the vector difference to be decoded, a probability model from a plurality of probability models to decode the magnitude symbol;

arithmetically decode, from the video bitstream and based on the probability model, a second indication indicating whether the magnitude symbol of the vector difference is equal to a corresponding magnitude symbol of a vector difference predictor;

determine a value of the magnitude symbol of the vector difference based on the second indication and a value of the corresponding magnitude symbol of the vector difference predictor; and decode the current block based on the vector difference represented by the codeword comprising the magnitude symbol with the determined value.

16. The non-transitory computer-readable medium of claim 15, wherein:

the vector difference is a block vector difference (BVD), and the vector difference predictor is a BVD predictor; or the vector difference is a motion vector difference (MVD), and the vector difference predictor is an MVD predictor.

17. The non-transitory computer-readable medium of claim 15, wherein, to select the probability model, the instructions further cause the decoder to:

adjust the position based on a value of the resolution indicated by the first indication; and compare the adjusted position with a threshold to select the probability model as:

a first probability model based on the adjusted position being less than the threshold; and a second probability model based on the adjusted position being greater than or equal to the threshold.

18. The non-transitory computer-readable medium of claim 15, wherein, to select the probability model, the instructions further cause the decoder to:

adjust a threshold based on a value of the resolution indicated by the first indication; and compare the adjusted threshold with a value of the position to select the probability model as:

a first probability model based on the position being less than the adjusted threshold; and a second probability model based on the position being greater than or equal to the adjusted threshold.

19. The non-transitory computer-readable medium of claim 15, wherein the instructions further cause the decoder to:

determine vector difference candidates based on one or more magnitude symbols, of the vector difference, to be predicted;

determine, for each vector difference candidate of the vector difference candidates, a template matching cost between a current template of the current block and a reference template of a reference block candidate indicated by the vector difference candidate; and select one of the vector difference candidates as the vector difference predictor based on the template matching costs.

20. The non-transitory computer-readable medium of claim 15, wherein the instructions further cause the decoder to:

receive, from the video bitstream, a third indication of whether a component of the vector difference is greater than zero, wherein the first indication is received after the third indication and before magnitude symbols of the codeword representing the vector difference are decoded.

* * * * *